US008708804B2

(12) United States Patent
Caputo et al.

(10) Patent No.: US 8,708,804 B2
(45) Date of Patent: Apr. 29, 2014

(54) GAMING SYSTEM AND METHOD PROVIDING A COLLECTION GAME INCLUDING AT LEAST ONE CUSTOMIZABLE AWARD COLLECTOR

(75) Inventors: Scott A. Caputo, Santa Clara, CA (US); Gregory F. Frank, Walnut Creek, CA (US); Ernest M. Lafky, San Francisco, CA (US); Leandro Basallo, San Francisco, CA (US)

(73) Assignee: IGT, Las Vegas, NV (US)

( * ) Notice: Subject to any disclaimer, the term of this patent is extended or adjusted under 35 U.S.C. 154(b) by 18 days.

(21) Appl. No.: 13/530,554

(22) Filed: Jun. 22, 2012

(65) Prior Publication Data

US 2013/0344930 A1 Dec. 26, 2013

(51) Int. Cl.
*A63F 9/24* (2006.01)
*A63F 13/00* (2006.01)

(52) U.S. Cl.
USPC .................. 463/25; 463/16; 463/20; 463/31; 463/36

(58) Field of Classification Search
USPC ................................................ 463/16, 20, 31
See application file for complete search history.

(56) References Cited

U.S. PATENT DOCUMENTS

| | | | |
|---|---|---|---|
| 2,942,574 | A | 6/1960 | Golay |
| 3,167,313 | A | 1/1965 | Davenport et al. |
| 3,281,149 | A | 10/1966 | Miller |
| 3,618,019 | A | 11/1971 | Nemirovsky |
| 3,998,309 | A | 12/1976 | Mandas et al. |
| 4,003,578 | A | 1/1977 | Jones |
| 4,072,930 | A | 2/1978 | Lucero et al. |
| 4,103,895 | A | 8/1978 | Pressman et al. |
| 4,182,515 | A | 1/1980 | Nemeth |
| 4,238,127 | A | 12/1980 | Lucero et al. |
| 4,277,064 | A | 7/1981 | Newman |
| 4,277,067 | A | 7/1981 | Gettleman |
| 4,283,709 | A | 8/1981 | Lucero et al. |
| 4,323,242 | A | 4/1982 | Rosenfeld |
| 4,335,809 | A | 6/1982 | Wain |
| 4,339,798 | A | 7/1982 | Hedges et al. |
| 4,409,656 | A | 10/1983 | Andersen et al. |
| 4,448,419 | A | 5/1984 | Telnaes |
| 4,494,197 | A | 1/1985 | Troy et al. |

(Continued)

FOREIGN PATENT DOCUMENTS

| | | |
|---|---|---|
| EP | 0449433 | 10/1991 |
| EP | 0464935 | 1/1992 |

(Continued)

*Primary Examiner* — Steven J Hylinski
(74) *Attorney, Agent, or Firm* — Neal, Gerber & Eisenberg LLP

(57) ABSTRACT

Various embodiments of the present disclosure provide a gaming system and method providing a collection game including at least one customizable collector. The gaming system displays a field including a plurality of different obstacles and a plurality of awards, provides a player with a collector, and enables the player to associate an item with the collector. The item is associated with one of the obstacles such that the item enables the collector to overcome that obstacle. The gaming system enables the player to position the collector within the field, and displays the collector moving within the field. If the collector intersects with an award, the gaming system accumulates that award. If the collector intersects an obstacle, and if the item associated with the displayed collector does not enable the displayed collector to overcome that obstacle, the gaming system ends the play of the collection game with respect to the collector.

56 Claims, 22 Drawing Sheets

(56) References Cited

U.S. PATENT DOCUMENTS

| | | | |
|---|---|---|---|
| 4,511,143 | A | 4/1985 | Sankrithi |
| 4,573,681 | A | 3/1986 | Okada |
| 4,582,324 | A | 4/1986 | Koza et al. |
| 4,624,459 | A | 11/1986 | Kaufman |
| 4,636,951 | A | 1/1987 | Harlick |
| 4,652,998 | A | 3/1987 | Koza et al. |
| 4,657,256 | A | 4/1987 | Okada |
| 4,669,731 | A | 6/1987 | Clarke |
| 4,695,053 | A | 9/1987 | Vazquez, Jr. et al. |
| 4,721,307 | A | 1/1988 | Okada |
| 4,743,024 | A | 5/1988 | Helm et al. |
| 4,760,527 | A | 7/1988 | Sidley |
| 4,764,666 | A | 8/1988 | Bergeron |
| 4,772,023 | A | 9/1988 | Okada |
| 4,775,155 | A | 10/1988 | Lees |
| 4,805,907 | A | 2/1989 | Hagiwara |
| 4,836,546 | A | 6/1989 | DiRe et al. |
| 4,837,728 | A | 6/1989 | Barrie et al. |
| 4,842,278 | A | 6/1989 | Markowicz |
| 4,850,592 | A | 7/1989 | Winter |
| 4,856,787 | A | 8/1989 | Itkis |
| 4,871,171 | A | 10/1989 | Rivero |
| 4,880,237 | A | 11/1989 | Kishishita |
| 4,906,005 | A | 3/1990 | Manabe |
| 4,926,327 | A | 5/1990 | Sidley |
| 4,964,638 | A | 10/1990 | Ishida |
| 4,991,848 | A | 2/1991 | Greenwood et al. |
| 5,016,880 | A | 5/1991 | Berge |
| 5,038,022 | A | 8/1991 | Lucero |
| 5,048,833 | A | 9/1991 | Lamle |
| 5,074,559 | A | 12/1991 | Okada |
| 5,083,271 | A | 1/1992 | Thacher et al. |
| 5,083,800 | A | 1/1992 | Lockton |
| 5,092,598 | A | 3/1992 | Kamille |
| 5,116,055 | A | 5/1992 | Tracy |
| 5,123,649 | A | 6/1992 | Tiberio |
| 5,127,651 | A | 7/1992 | Okada |
| 5,152,529 | A | 10/1992 | Okada |
| 5,158,293 | A | 10/1992 | Mullins |
| 5,178,390 | A | 1/1993 | Okada |
| 5,178,395 | A | 1/1993 | Lovell |
| 5,186,460 | A | 2/1993 | Fongeallaz et al. |
| 5,205,555 | A | 4/1993 | Hamann |
| 5,209,479 | A | 5/1993 | Nagao |
| 5,217,224 | A | 6/1993 | Sincock |
| 5,242,163 | A | 9/1993 | Fulton |
| 5,249,800 | A | 10/1993 | Hilgendorf et al. |
| 5,259,616 | A | 11/1993 | Bergmann |
| 5,265,874 | A | 11/1993 | Dickinson et al. |
| 5,275,400 | A | 1/1994 | Weingardt |
| 5,276,312 | A | 1/1994 | McCarthy |
| 5,277,424 | A | 1/1994 | Wilms |
| 5,280,909 | A | 1/1994 | Tracy |
| 5,282,620 | A | 2/1994 | Keesee |
| 5,286,023 | A | 2/1994 | Wood |
| 5,292,127 | A | 3/1994 | Kelly et al. |
| 5,299,810 | A | 4/1994 | Pierce et al. |
| 5,321,241 | A | 6/1994 | Craine |
| 5,324,035 | A | 6/1994 | Morris et al. |
| 5,324,041 | A | 6/1994 | Boylan et al. |
| 5,326,104 | A | 7/1994 | Pease et al. |
| 5,332,219 | A | 7/1994 | Marnell, II et al. |
| 5,333,868 | A | 8/1994 | Goldfarb |
| 5,342,047 | A | 8/1994 | Heidel et al. |
| 5,342,049 | A | 8/1994 | Wichinsky et al. |
| 5,344,144 | A | 9/1994 | Canon |
| 5,351,970 | A | 10/1994 | Fioretti |
| 5,355,442 | A | 10/1994 | Paglieroni et al. |
| 5,377,993 | A | 1/1995 | Josephs |
| 5,380,008 | A | 1/1995 | Mathis et al. |
| 5,393,057 | A | 2/1995 | Marnell, II |
| 5,398,932 | A | 3/1995 | Eberhardt et al. |
| 5,401,024 | A | 3/1995 | Simunek |
| 5,411,271 | A | 5/1995 | Mirando |
| 5,417,430 | A | 5/1995 | Breeding |
| 5,423,539 | A | 6/1995 | Nagao |
| 5,429,361 | A | 7/1995 | Raven et al. |
| 5,449,173 | A | 9/1995 | Thomas et al. |
| 5,456,465 | A | 10/1995 | Durham |
| 5,470,079 | A | 11/1995 | LeStrange et al. |
| 5,472,194 | A | 12/1995 | Breeding et al. |
| 5,472,196 | A | 12/1995 | Rusnak |
| 5,476,259 | A | 12/1995 | Weingardt |
| 5,486,005 | A | 1/1996 | Neal |
| 5,489,101 | A | 2/1996 | Moody |
| 5,494,287 | A | 2/1996 | Manz |
| 5,507,489 | A | 4/1996 | Reibel et al. |
| 5,511,781 | A | 4/1996 | Wood |
| 5,524,888 | A | 6/1996 | Heidel |
| 5,536,016 | A | 7/1996 | Thompson |
| 5,544,893 | A | 8/1996 | Jones et al. |
| 5,547,192 | A | 8/1996 | Ishibashi |
| 5,560,603 | A | 10/1996 | Seeling et al. |
| 5,564,700 | A | 10/1996 | Celona |
| 5,564,701 | A | 10/1996 | Dettor |
| 5,566,337 | A | 10/1996 | Szymanski |
| 5,566,942 | A | 10/1996 | Elum |
| 5,569,083 | A | 10/1996 | Fioretti |
| 5,570,885 | A | 11/1996 | Ornstein |
| 5,580,053 | A | 12/1996 | Crouch |
| 5,580,309 | A | 12/1996 | Piechowiak et al. |
| 5,584,763 | A | 12/1996 | Kelly et al. |
| 5,586,937 | A | 12/1996 | Menashe |
| 5,601,487 | A | 2/1997 | Oshima |
| 5,605,506 | A | 2/1997 | Hoorn et al. |
| 5,611,535 | A | 3/1997 | Tiberio |
| 5,611,730 | A | 3/1997 | Weiss |
| 5,626,341 | A | 5/1997 | Jones |
| 5,630,753 | A | 5/1997 | Fuchs |
| 5,639,089 | A | 6/1997 | Matsumoto et al. |
| 5,641,050 | A | 6/1997 | Smith et al. |
| 5,645,486 | A | 7/1997 | Nagao et al. |
| 5,647,798 | A | 7/1997 | Falciglia |
| 5,655,961 | A | 8/1997 | Acres et al. |
| 5,664,998 | A | 9/1997 | Seelig et al. |
| 5,674,128 | A | 10/1997 | Holch et al. |
| 5,702,304 | A | 12/1997 | Acres et al. |
| 5,707,285 | A | 1/1998 | Place et al. |
| 5,707,286 | A | 1/1998 | Carlson |
| 5,722,891 | A | 3/1998 | Inoue |
| 5,732,948 | A | 3/1998 | Yoseloff |
| 5,741,183 | A | 4/1998 | Acres et al. |
| 5,743,798 | A | 4/1998 | Adams et al. |
| 5,743,800 | A | 4/1998 | Huard et al. |
| 5,752,882 | A | 5/1998 | Acres et al. |
| 5,755,619 | A | 5/1998 | Matsumoto et al. |
| 5,758,875 | A | 6/1998 | Giacalone, Jr. |
| 5,761,647 | A | 6/1998 | Boushy |
| 5,762,552 | A | 6/1998 | Vuong |
| 5,766,076 | A | 6/1998 | Pease et al. |
| 5,769,716 | A | 6/1998 | Saffari et al. |
| 5,772,509 | A | 6/1998 | Weiss |
| 5,772,511 | A | 6/1998 | Smeltzer |
| 5,775,692 | A | 7/1998 | Watts et al. |
| 5,779,242 | A | 7/1998 | Kaufmann |
| 5,779,544 | A | 7/1998 | Seelig et al. |
| 5,779,545 | A | 7/1998 | Berg et al. |
| 5,779,547 | A | 7/1998 | SoRelle et al. |
| 5,779,549 | A | 7/1998 | Walker et al. |
| 5,788,573 | A | 8/1998 | Baerlocher et al. |
| 5,796,716 | A | 8/1998 | Smith |
| 5,800,269 | A | 9/1998 | Holch et al. |
| 5,806,855 | A | 9/1998 | Cherry |
| 5,807,172 | A | 9/1998 | Piechowiak |
| 5,813,672 | A | 9/1998 | Loud, Jr. |
| 5,816,918 | A | 10/1998 | Kelly et al. |
| 5,820,459 | A | 10/1998 | Acres et al. |
| 5,823,874 | A | 10/1998 | Adams |
| 5,833,536 | A | 11/1998 | Davids et al. |
| 5,833,537 | A | 11/1998 | Barrie |
| 5,833,538 | A | 11/1998 | Weiss |
| 5,833,540 | A | 11/1998 | Miodunski et al. |
| 5,836,817 | A | 11/1998 | Acres et al. |
| 5,836,818 | A | 11/1998 | Jones et al. |

(56) References Cited

U.S. PATENT DOCUMENTS

| | | | |
|---|---|---|---|
| 5,848,932 | A | 12/1998 | Adams |
| 5,851,011 | A | 12/1998 | Lott |
| 5,851,148 | A | 12/1998 | Brune et al. |
| 5,851,149 | A | 12/1998 | Xidos et al. |
| 5,855,514 | A | 1/1999 | Kamille |
| 5,855,515 | A | 1/1999 | Pease et al. |
| 5,873,781 | A | 2/1999 | Keane |
| 5,876,284 | A | 3/1999 | Acres et al. |
| 5,882,261 | A | 3/1999 | Adams |
| 5,885,158 | A | 3/1999 | Torango et al. |
| 5,902,184 | A | 5/1999 | Bennett |
| 5,902,983 | A | 5/1999 | Crevelt et al. |
| 5,909,875 | A | 6/1999 | Weingardt |
| 5,910,048 | A | 6/1999 | Feinberg |
| 5,911,418 | A | 6/1999 | Adams |
| 5,919,088 | A | 7/1999 | Weiss |
| 5,924,927 | A | 7/1999 | Matsuura et al. |
| 5,927,714 | A | 7/1999 | Kaplan |
| 5,931,467 | A | 8/1999 | Kamille |
| 5,934,999 | A | 8/1999 | Valdez |
| 5,935,002 | A | 8/1999 | Falciglia |
| 5,941,773 | A | 8/1999 | Harlick |
| 5,944,606 | A | 8/1999 | Gerow |
| 5,947,820 | A | 9/1999 | Morro et al. |
| 5,947,822 | A | 9/1999 | Weiss |
| 5,951,011 | A | 9/1999 | Potter et al. |
| 5,951,012 | A | 9/1999 | Feola |
| 5,951,397 | A | 9/1999 | Dickinson |
| 5,961,384 | A | 10/1999 | Robinson |
| 5,964,463 | A | 10/1999 | Moore, Jr. |
| 5,970,143 | A | 10/1999 | Schneier et al. |
| 5,976,015 | A | 11/1999 | Seelig et al. |
| 5,980,384 | A | 11/1999 | Barrie |
| 5,984,779 | A | 11/1999 | Bridgeman et al. |
| 5,984,781 | A | 11/1999 | Sunaga |
| 5,989,121 | A | 11/1999 | Sakamoto |
| 5,993,316 | A | 11/1999 | Coyle et al. |
| 5,997,400 | A | 12/1999 | Seelig et al. |
| 5,997,401 | A | 12/1999 | Crawford |
| 6,001,016 | A | 12/1999 | Walker et al. |
| 6,004,207 | A | 12/1999 | Wilson, Jr. et al. |
| 6,007,427 | A | 12/1999 | Wiener et al. |
| 6,012,982 | A | 1/2000 | Piechowiak et al. |
| 6,012,983 | A | 1/2000 | Walker et al. |
| 6,015,344 | A | 1/2000 | Kelly et al. |
| 6,015,346 | A | 1/2000 | Bennett |
| 6,019,369 | A | 2/2000 | Nakagawa et al. |
| 6,030,288 | A | 2/2000 | Davis et al. |
| 6,033,307 | A | 3/2000 | Vancura |
| 6,039,648 | A | 3/2000 | Guinn et al. |
| 6,039,649 | A | 3/2000 | Schulze |
| 6,048,269 | A | 4/2000 | Burns et al. |
| 6,050,895 | A | 4/2000 | Luciano et al. |
| 6,056,642 | A | 5/2000 | Bennett |
| 6,059,289 | A | 5/2000 | Vancura |
| 6,059,658 | A | 5/2000 | Mangano et al. |
| 6,059,659 | A | 5/2000 | Busch et al. |
| 6,068,553 | A | 5/2000 | Parker |
| 6,071,190 | A | 6/2000 | Weiss et al. |
| 6,077,162 | A | 6/2000 | Weiss |
| 6,080,062 | A | 6/2000 | Olson |
| 6,082,887 | A | 7/2000 | Feuer et al. |
| 6,089,976 | A | 7/2000 | Schneider et al. |
| 6,089,977 | A | 7/2000 | Bennett |
| 6,089,978 | A | 7/2000 | Adams |
| 6,089,980 | A | 7/2000 | Gauselmann |
| 6,093,102 | A | 7/2000 | Bennett |
| 6,099,408 | A | 8/2000 | Schneier et al. |
| 6,102,400 | A | 8/2000 | Scott et al. |
| 6,102,798 | A | 8/2000 | Bennett |
| 6,110,041 | A | 8/2000 | Walker et al. |
| 6,110,043 | A | 8/2000 | Olsen |
| 6,113,098 | A | 9/2000 | Adams |
| 6,117,009 | A | 9/2000 | Yoseloff |
| 6,117,011 | A | 9/2000 | Lvov |
| 6,117,013 | A | 9/2000 | Eiba |
| 6,120,031 | A | 9/2000 | Adams |
| 6,120,377 | A | 9/2000 | McGinnis, Sr. et al. |
| 6,123,335 | A | 9/2000 | Adkins |
| 6,126,542 | A | 10/2000 | Fier |
| 6,126,547 | A | 10/2000 | Ishimoto |
| 6,134,556 | A | 10/2000 | Shin |
| 6,135,884 | A | 10/2000 | Hedrick et al. |
| 6,135,885 | A | 10/2000 | Lermusiaux |
| 6,142,872 | A | 11/2000 | Walker et al. |
| 6,142,873 | A | 11/2000 | Weiss et al. |
| 6,146,270 | A | 11/2000 | Huard et al. |
| 6,146,273 | A | 11/2000 | Olsen |
| 6,149,521 | A | 11/2000 | Sanduski |
| 6,152,823 | A | 11/2000 | Lacoste et al. |
| 6,155,925 | A | 12/2000 | Giobbi et al. |
| 6,159,095 | A | 12/2000 | Frohm et al. |
| 6,159,097 | A | 12/2000 | Gura |
| 6,159,098 | A | 12/2000 | Slomiany et al. |
| 6,162,121 | A | 12/2000 | Morro et al. |
| 6,162,122 | A | 12/2000 | Acres et al. |
| 6,164,652 | A | 12/2000 | Lauretta et al. |
| 6,165,071 | A | 12/2000 | Weiss |
| 6,165,072 | A | 12/2000 | Davis et al. |
| 6,167,523 | A | 12/2000 | Strong |
| 6,168,520 | B1 | 1/2001 | Baerlocher et al. |
| 6,168,521 | B1 | 1/2001 | Luciano et al. |
| 6,168,523 | B1 | 1/2001 | Piechowiak et al. |
| 6,173,955 | B1 | 1/2001 | Perrie et al. |
| 6,174,235 | B1 | 1/2001 | Walker et al. |
| 6,179,711 | B1 | 1/2001 | Yoseloff |
| 6,183,366 | B1 | 2/2001 | Goldberg et al. |
| 6,186,894 | B1 | 2/2001 | Mayeroff |
| 6,190,255 | B1 | 2/2001 | Thomas et al. |
| 6,203,010 | B1 | 3/2001 | Jorasch et al. |
| 6,203,429 | B1 | 3/2001 | Demar et al. |
| 6,203,430 | B1 | 3/2001 | Walker et al. |
| 6,206,374 | B1 | 3/2001 | Jones |
| 6,206,782 | B1 | 3/2001 | Walker et al. |
| 6,210,275 | B1 | 4/2001 | Olsen |
| 6,210,277 | B1 | 4/2001 | Stefan |
| 6,213,876 | B1 | 4/2001 | Moore, Jr. |
| 6,217,448 | B1 | 4/2001 | Olsen |
| 6,220,961 | B1 | 4/2001 | Keane et al. |
| 6,224,482 | B1 | 5/2001 | Bennett |
| 6,224,483 | B1 | 5/2001 | Mayeroff |
| 6,224,484 | B1 | 5/2001 | Okuda et al. |
| 6,224,486 | B1 | 5/2001 | Walker et al. |
| 6,231,442 | B1 | 5/2001 | Mayeroff |
| 6,231,445 | B1 | 5/2001 | Acres |
| 6,234,896 | B1 | 5/2001 | Walker et al. |
| 6,238,288 | B1 | 5/2001 | Walker et al. |
| 6,241,608 | B1 | 6/2001 | Torango |
| 6,244,958 | B1 | 6/2001 | Acres |
| 6,254,481 | B1 | 7/2001 | Jaffe |
| 6,254,483 | B1 | 7/2001 | Acres |
| 6,257,981 | B1 | 7/2001 | Acres et al. |
| 6,261,177 | B1 | 7/2001 | Bennett |
| 6,264,557 | B1 | 7/2001 | Schneier et al. |
| 6,267,669 | B1 | 7/2001 | Luciano, Jr. et al. |
| 6,270,409 | B1 | 8/2001 | Shuster |
| 6,273,420 | B1 | 8/2001 | Brooks |
| 6,287,194 | B1 | 9/2001 | Okada et al. |
| 6,287,202 | B1 | 9/2001 | Pascal et al. |
| 6,290,600 | B1 | 9/2001 | Glasson |
| 6,293,866 | B1 | 9/2001 | Walker et al. |
| 6,299,165 | B1 | 10/2001 | Nagano |
| 6,302,790 | B1 | 10/2001 | Brossard |
| 6,302,793 | B1 | 10/2001 | Fertitta, III et al. |
| 6,302,794 | B1 | 10/2001 | Ogawa |
| 6,309,298 | B1 | 10/2001 | Gerow |
| 6,309,299 | B1 | 10/2001 | Weiss |
| 6,309,300 | B1 | 10/2001 | Glavich |
| 6,309,307 | B1 | 10/2001 | Krause et al. |
| 6,311,976 | B1 | 11/2001 | Yoseloff et al. |
| 6,312,330 | B1 | 11/2001 | Jones et al. |
| 6,312,332 | B1 | 11/2001 | Walker et al. |
| 6,312,333 | B1 | 11/2001 | Acres |
| 6,312,334 | B1 | 11/2001 | Yoseloff |

(56) References Cited

U.S. PATENT DOCUMENTS 6,315,660 B1 11/2001 DeMar et al.
6,315,662 B1 11/2001 Jorasch et al.
6,315,664 B1 11/2001 Baerlocher et al.
6,319,122 B1 11/2001 Packes, Jr. et al.
6,319,124 B1 11/2001 Baerlocher et al.
6,319,125 B1 11/2001 Acres
6,322,309 B1 11/2001 Thomas et al.
6,328,649 B1 12/2001 Randall et al.
6,334,814 B1 1/2002 Adams
6,336,857 B1 1/2002 McBride
6,338,678 B1 1/2002 Seelig et al.
6,340,158 B2 1/2002 Preice et al.
6,346,043 B1 2/2002 Colin et al.
6,347,738 B1 2/2002 Crevelt et al.
6,347,996 B1 2/2002 Gilmore et al.
6,358,147 B1 3/2002 Jaffe et al.
6,358,149 B1 3/2002 Schneider et al.
6,364,765 B1 4/2002 Walker et al.
6,364,766 B1 4/2002 Anderson et al.
6,364,767 B1 4/2002 Brossard et al.
6,364,768 B1 4/2002 Acres et al.
6,364,769 B1 4/2002 Weiss et al.
6,368,216 B1 4/2002 Hedrick et al.
6,371,852 B1 4/2002 Acres
6,375,187 B1 4/2002 Baerlocher
6,375,567 B1 4/2002 Acres
6,375,568 B1 4/2002 Roffman et al.
6,375,569 B1 4/2002 Acres
6,398,218 B1 6/2002 Vancura
6,398,644 B1 6/2002 Perrie et al.
6,406,369 B1 6/2002 Baerlocher et al.
6,413,160 B1 7/2002 Vancura
6,416,408 B2 7/2002 Tracy et al.
6,416,409 B1 7/2002 Jordan
6,419,579 B1 7/2002 Bennett
6,419,583 B1 7/2002 Crumby et al.
6,425,824 B1 7/2002 Baerlocher et al.
6,428,412 B1 8/2002 Anderson et al.
6,431,983 B2 8/2002 Acres
6,435,511 B1 8/2002 Vancura et al.
6,435,968 B1 8/2002 Torango
6,439,995 B1 8/2002 Hughs-Baird et al.
6,443,837 B1 9/2002 Jaffe et al.
6,450,883 B1 9/2002 O'Halloran
6,454,651 B1 9/2002 Yoseloff
6,461,241 B1 10/2002 Webb et al.
6,471,208 B2 10/2002 Yoseloff et al.
6,481,713 B2 11/2002 Perrie et al.
6,494,785 B1 12/2002 Gerrard et al.
6,506,118 B1 1/2003 Baerlocher et al.
6,508,709 B1 1/2003 Karmarkar
6,511,375 B1 1/2003 Kaminkow
6,511,376 B2 1/2003 Walker et al.
6,514,141 B1 2/2003 Kaminkow et al.
6,533,273 B2 3/2003 Cole et al.
6,533,664 B1 3/2003 Crumby
6,537,150 B1 3/2003 Luciano et al.
6,546,134 B1 4/2003 Shrairman et al.
6,546,374 B1 4/2003 Esposito et al.
6,547,131 B1 4/2003 Foodman et al.
6,554,705 B1 4/2003 Cumbers
6,558,253 B1 5/2003 DeSimone et al.
6,558,254 B2 5/2003 Baerlocher et al.
6,561,904 B2 5/2003 Locke et al.
6,565,434 B1 5/2003 Acres
6,569,015 B1 5/2003 Baerlocher et al.
6,572,469 B2 6/2003 Klitsner et al.
6,572,471 B1 6/2003 Bennett
6,572,473 B1 6/2003 Baerlocher
6,575,832 B1 6/2003 Manfredi et al.
6,582,307 B2 6/2003 Webb
6,589,115 B2 7/2003 Walker et al.
6,589,117 B1 7/2003 Moritome et al.
6,592,457 B1 7/2003 Frohm et al.
6,592,458 B1 7/2003 Ho
6,592,460 B2 7/2003 Torango
6,595,853 B1 7/2003 Osawa
6,595,854 B2 7/2003 Hughs-Baird et al.
6,599,185 B1 7/2003 Kaminkow et al.
6,599,190 B2 7/2003 Osawa
6,599,192 B1 7/2003 Baerlocher et al.
6,599,193 B2 7/2003 Baerlocher et al.
6,602,136 B1 8/2003 Baerlocher et al.
6,602,137 B2 8/2003 Kaminkow et al.
6,605,001 B1 8/2003 Tarantino
6,607,438 B2 8/2003 Baerlocher et al.
6,607,441 B1 8/2003 Acres
6,609,973 B1 8/2003 Weiss
6,612,574 B1 9/2003 Cole et al.
6,612,575 B1 9/2003 Cole et al.
6,620,046 B2 9/2003 Rowe
6,626,758 B1 9/2003 Parham et al.
6,632,139 B1 10/2003 Baerlocher
6,632,141 B2 10/2003 Webb et al.
6,634,944 B2 10/2003 Osawa
6,637,747 B1 10/2003 Garrod
6,638,164 B2 10/2003 Randall et al.
6,644,664 B2 11/2003 Muir et al.
6,645,071 B2 11/2003 Perrie et al.
6,645,074 B2 11/2003 Thomas et al.
6,645,077 B2 11/2003 Rowe
6,648,754 B2 11/2003 Baerlocher et al.
6,648,759 B2 11/2003 Vancura
6,648,762 B2 11/2003 Walker et al.
6,652,378 B2 11/2003 Cannon et al.
6,656,040 B1 12/2003 Brosnan et al.
6,656,047 B1 12/2003 Tarantino et al.
6,656,048 B2 12/2003 Olsen
6,656,052 B2 12/2003 Abramopoulos et al.
6,663,488 B1 12/2003 Adams
6,666,765 B2 12/2003 Vancura
6,666,766 B2 12/2003 Baerlocher
6,672,959 B2 1/2004 Moody et al.
6,675,152 B1 1/2004 Prasad et al.
6,676,516 B2 1/2004 Baerlocher et al.
6,676,521 B1 1/2004 La Mura et al.
6,682,073 B2 * 1/2004 Bryant et al. .............. 273/138.1
6,682,419 B2 1/2004 Webb et al.
6,682,420 B2 1/2004 Webb et al.
6,682,421 B1 1/2004 Rowe et al.
6,688,975 B2 2/2004 Baerlocher et al.
6,688,977 B1 2/2004 Baerlocher et al.
6,692,355 B2 2/2004 Baerlocher et al.
6,692,356 B2 2/2004 Baerlocher et al.
6,702,674 B1 3/2004 De Bruin et al.
6,712,695 B2 3/2004 Mothwurf et al.
6,712,697 B2 3/2004 Acres
6,719,630 B1 4/2004 Seelig et al.
6,719,632 B2 4/2004 Palmer et al.
6,722,976 B2 4/2004 Adams
6,722,981 B2 4/2004 Kaminkow et al.
6,722,982 B2 4/2004 Kaminkow et al.
6,722,983 B2 4/2004 Kaminkow et al.
6,726,565 B2 4/2004 Hughs-Baird
6,733,386 B2 5/2004 Cuddy et al.
6,733,389 B2 5/2004 Webb et al.
6,743,096 B2 6/2004 Allendorf et al.
6,746,016 B2 6/2004 Perrie et al.
6,746,328 B2 6/2004 Cannon et al.
6,749,504 B2 6/2004 Hughs-Baird
6,749,510 B2 6/2004 Giobbi
6,752,717 B2 6/2004 Vancura
6,754,346 B2 6/2004 Eiserling et al.
6,758,747 B2 7/2004 Baerlocher
6,758,750 B2 7/2004 Baerlocher et al.
6,761,632 B2 7/2004 Bansemer et al.
6,769,983 B2 8/2004 Slomiany
6,769,986 B2 8/2004 Vancura
6,776,714 B2 8/2004 Ungaro et al.
6,776,715 B2 8/2004 Price
6,780,103 B2 8/2004 Bansemer et al.
6,780,107 B2 8/2004 Baerlocher et al.
6,780,110 B2 8/2004 Baerlocher et al.
6,780,111 B2 8/2004 Cannon et al.

(56) References Cited

U.S. PATENT DOCUMENTS

| | | | |
|---|---|---|---|
| 6,783,457 | B2 | 8/2004 | Hughs-Baird et al. |
| 6,786,819 | B2 | 9/2004 | Baerlocher et al. |
| 6,786,820 | B2 | 9/2004 | Gerrard et al. |
| 6,790,141 | B2 | 9/2004 | Muir |
| 6,793,578 | B2 | 9/2004 | Luccesi et al. |
| 6,793,579 | B2 | 9/2004 | Baerlocher et al. |
| 6,796,899 | B2 | 9/2004 | Baerlocher et al. |
| 6,796,905 | B2 | 9/2004 | Baerlocher et al. |
| 6,800,026 | B2 | 10/2004 | Cannon |
| 6,800,030 | B2 | 10/2004 | Acres |
| 6,802,774 | B1 | 10/2004 | Carlson et al. |
| 6,805,352 | B2 | 10/2004 | Hunter |
| 6,805,634 | B1 | 10/2004 | Wells et al. |
| 6,808,454 | B2 | 10/2004 | Gerrard et al. |
| 6,811,483 | B1 | 11/2004 | Webb et al. |
| 6,814,664 | B2 | 11/2004 | Baerlocher et al. |
| 6,817,944 | B2 | 11/2004 | Kaminkow et al. |
| 6,832,956 | B1 | 12/2004 | Boyd et al. |
| 6,832,958 | B2 | 12/2004 | Acres et al. |
| 6,837,788 | B2 | 1/2005 | Cannon |
| 6,837,793 | B2 | 1/2005 | McClintic |
| 6,840,856 | B2 | 1/2005 | Stern |
| 6,843,722 | B2 | 1/2005 | Webb |
| 6,852,027 | B2 | 2/2005 | Kaminkow et al. |
| 6,852,030 | B2 | 2/2005 | Baerlocher et al. |
| 6,857,958 | B2 | 2/2005 | Osawa |
| 6,863,606 | B1 | 3/2005 | Berg et al. |
| 6,866,584 | B2 | 3/2005 | Michaelson |
| 6,869,361 | B2 | 3/2005 | Sharpless et al. |
| 6,875,108 | B1 | 4/2005 | Hughs-Baird |
| 6,880,168 | B2 | 4/2005 | Maehiro |
| 6,887,154 | B1 | 5/2005 | Luciano, Jr. et al. |
| 6,889,849 | B2 | 5/2005 | Heidel et al. |
| 6,890,255 | B2 | 5/2005 | Jarvis et al. |
| 6,890,257 | B2 | 5/2005 | Baerlocher |
| 6,899,620 | B2 | 5/2005 | Kaminkow et al. |
| 6,899,623 | B2 | 5/2005 | Baerlocher |
| 6,899,625 | B2 | 5/2005 | Luciano, Jr. et al. |
| 6,902,478 | B2 | 6/2005 | McClintic |
| 6,905,406 | B2 | 6/2005 | Kaminkow et al. |
| 6,908,387 | B2 | 6/2005 | Hedrick et al. |
| 6,910,964 | B2 | 6/2005 | Acres |
| 6,913,533 | B2 | 7/2005 | Cuddy et al. |
| 6,916,245 | B1 | 7/2005 | Vancura et al. |
| 6,918,830 | B2 | 7/2005 | Baerlocher |
| 6,918,832 | B2 | 7/2005 | Baerlocher et al. |
| 6,918,834 | B2 | 7/2005 | Vancura |
| 6,932,701 | B2 | 8/2005 | Glavich et al. |
| 6,932,707 | B2 | 8/2005 | Duhamel |
| 6,935,951 | B2 | 8/2005 | Paulsen et al. |
| 6,935,958 | B2 | 8/2005 | Nelson |
| 6,939,224 | B2 | 9/2005 | Palmer et al. |
| 6,939,234 | B2 | 9/2005 | Beatty |
| 6,942,566 | B2 | 9/2005 | Baerlocher et al. |
| 6,942,567 | B2 | 9/2005 | Baerlocher et al. |
| 6,942,568 | B2 | 9/2005 | Baerlocher |
| 6,942,574 | B1 | 9/2005 | LeMay et al. |
| 6,958,013 | B2 | 10/2005 | Miereau et al. |
| 6,960,132 | B2 | 11/2005 | Baerlocher et al. |
| 6,966,833 | B2 | 11/2005 | Kaminkow et al. |
| 6,966,834 | B1 | 11/2005 | Johnson |
| 6,971,953 | B2 | 12/2005 | Gerrard et al. |
| 6,971,954 | B2 | 12/2005 | Randall et al. |
| 6,981,917 | B2 | 1/2006 | Webb et al. |
| 6,984,173 | B1 | 1/2006 | Piechowiak et al. |
| 6,984,174 | B2 | 1/2006 | Cannon et al. |
| 6,988,732 | B2 | 1/2006 | Vancura |
| 6,988,946 | B2 | 1/2006 | Michaelson |
| 6,988,948 | B2 | 1/2006 | Perrie et al. |
| 6,995,751 | B2 | 2/2006 | Falvo |
| 6,996,833 | B1 | 2/2006 | Olson et al. |
| 7,001,273 | B2 | 2/2006 | Baerlocher |
| 7,011,581 | B2 | 3/2006 | Cole et al. |
| 7,029,395 | B1 | 4/2006 | Baerlocher |
| 7,037,191 | B2 | 5/2006 | Rodgers et al. |
| 7,037,192 | B2 | 5/2006 | Baerlocher et al. |
| 7,040,984 | B2 | 5/2006 | Mead |
| 7,052,395 | B2 | 5/2006 | Glavich et al. |
| 7,056,210 | B2 | 6/2006 | Bansemer et al. |
| 7,056,214 | B2 | 6/2006 | Miereau et al. |
| 7,056,215 | B1 | 6/2006 | Olive |
| 7,073,793 | B2 | 7/2006 | Vancura |
| 7,077,744 | B2 | 7/2006 | Cannon |
| 7,081,050 | B2 | 7/2006 | Tarantino |
| 7,104,888 | B2 | 9/2006 | Miereau et al. |
| 7,108,603 | B2 | 9/2006 | Olive |
| 7,112,137 | B2 | 9/2006 | Baerlocher et al. |
| 7,121,942 | B2 | 10/2006 | Baerlocher |
| 7,156,741 | B2 | 1/2007 | Hornick et al. |
| 7,158,798 | B2 | 1/2007 | Lee et al. |
| 7,160,186 | B2 | 1/2007 | Cuddy et al. |
| 7,160,188 | B2 | 1/2007 | Kaminkow et al. |
| 7,160,190 | B2 | 1/2007 | Baerlocher et al. |
| 7,169,041 | B2 | 1/2007 | Tessmer et al. |
| 7,169,042 | B2 | 1/2007 | Muir et al. |
| 7,169,044 | B2 | 1/2007 | Baerlocher et al. |
| 7,172,506 | B2 | 2/2007 | Baerlocher et al. |
| 7,175,521 | B2 | 2/2007 | McClintic |
| 7,175,523 | B2 | 2/2007 | Gilmore et al. |
| 7,175,524 | B2 | 2/2007 | Bansemer et al. |
| 7,182,689 | B2 | 2/2007 | Hughs-Baird et al. |
| 7,192,348 | B2 | 3/2007 | Brosnan |
| 7,192,349 | B2 | 3/2007 | Baerlocher et al. |
| 7,198,570 | B2 | 4/2007 | Rodgers et al. |
| 7,201,657 | B2 | 4/2007 | Baerlocher et al. |
| 7,217,187 | B2 | 5/2007 | Vancura |
| 7,223,172 | B2 | 5/2007 | Baerlocher et al. |
| 7,226,358 | B2 | 6/2007 | Miller et al. |
| 7,234,700 | B2 | 6/2007 | Vancura |
| 7,235,010 | B2 | 6/2007 | Baerlocher |
| 7,235,011 | B2 | 6/2007 | Randall et al. |
| 7,240,093 | B1 | 7/2007 | Danieli et al. |
| 7,250,001 | B2 | 7/2007 | Baerlocher et al. |
| 7,257,714 | B1 | 8/2007 | Shen |
| 7,264,545 | B2 | 9/2007 | Maya et al. |
| 7,270,604 | B2 | 9/2007 | Gerrard et al. |
| 7,291,069 | B2 | 11/2007 | Michaelson et al. |
| 7,300,348 | B2 | 11/2007 | Kaminkow et al. |
| 7,303,469 | B2 | 12/2007 | Kaminkow et al. |
| 7,311,598 | B2 | 12/2007 | Kaminkow et al. |
| 7,311,604 | B2 | 12/2007 | Kaminkow et al. |
| 7,311,608 | B1 | 12/2007 | Danieli et al. |
| 7,314,408 | B2 | 1/2008 | Cannon |
| 7,314,409 | B2 | 1/2008 | Maya et al. |
| 7,314,410 | B2 | 1/2008 | Baerlocher et al. |
| 7,318,773 | B2 | 1/2008 | Baerlocher |
| 7,326,114 | B2 | 2/2008 | Webb et al. |
| 7,326,115 | B2 | 2/2008 | Baerlocher |
| 7,331,865 | B2 | 2/2008 | Baerlocher et al. |
| 7,331,868 | B2 | 2/2008 | Beaulieu et al. |
| 7,338,367 | B2 | 3/2008 | Kaminkow et al. |
| 7,338,369 | B2 | 3/2008 | Mierau et al. |
| 7,351,140 | B2 | 4/2008 | Wolf et al. |
| 7,361,087 | B2 | 4/2008 | Baerlocher et al. |
| 7,364,507 | B2 | 4/2008 | Baerlocher et al. |
| 7,393,280 | B2 | 7/2008 | Cannon |
| 7,407,435 | B2 | 8/2008 | Baerlocher et al. |
| 7,416,484 | B1 | 8/2008 | Nelson et al. |
| 7,422,213 | B2 | 9/2008 | Katz et al. |
| 7,427,236 | B2 | 9/2008 | Kaminkow et al. |
| 7,448,949 | B2 | 11/2008 | Kaminkow et al. |
| 7,470,184 | B2 | 12/2008 | Baerlocher et al. |
| 7,500,915 | B2 | 3/2009 | Wolf et al. |
| 7,566,272 | B2 | 7/2009 | Gerrard et al. |
| 7,572,182 | B2 | 8/2009 | Vancura |
| 7,572,184 | B2 | 8/2009 | Baerlocher et al. |
| 7,601,057 | B2 | 10/2009 | Kaminkow |
| 7,617,151 | B2 | 11/2009 | Rowe |
| 7,625,282 | B2 | 12/2009 | Baerlocher et al. |
| 7,658,673 | B2 | 2/2010 | Baerlocher et al. |
| 7,666,094 | B2 | 2/2010 | Baerlocher et al. |
| 7,674,178 | B2 | 3/2010 | Baerlocher et al. |
| 7,674,179 | B2 | 3/2010 | Baerlocher et al. |
| 7,677,971 | B2 | 3/2010 | Baerlocher et al. |

(56) References Cited

U.S. PATENT DOCUMENTS 7,677,972 B2 3/2010 Baerlocher et al.
7,682,248 B2 3/2010 Baerlocher et al.
7,686,303 B2 3/2010 Kaminkow et al.
7,722,451 B2 5/2010 Hughs-Baird et al.
7,722,463 B2 5/2010 Maya et al.
7,731,582 B2 6/2010 Randall et al.
7,749,068 B2 7/2010 Cuddy et al.
7,753,789 B2 7/2010 Walker et al.
7,785,195 B2 8/2010 Palmer et al.
7,789,749 B2 9/2010 Bansemer et al.
7,794,316 B2 9/2010 Palmer et al.
7,846,015 B2 12/2010 Bansemer et al.
7,862,419 B2 1/2011 Baerlocher et al.
7,901,287 B2 3/2011 Simms et al.
7,905,772 B2 3/2011 Baerlocher et al.
7,914,372 B2 3/2011 Tessmer et al.
7,963,842 B2 6/2011 Ruymann
7,967,674 B2 6/2011 Baerlocher
8,210,935 B2 * 7/2012 Caputo et al. .................. 463/26
8,216,065 B2 * 7/2012 Kaminkow et al. ............. 463/30
2001/0003709 A1 6/2001 Adams
2001/0004607 A1 6/2001 Olsen
2001/0016513 A1 8/2001 Muir et al.
2001/0024971 A1 9/2001 Brossard
2001/0049303 A1 12/2001 Found
2001/0055990 A1 12/2001 Acres
2002/0002674 A1 1/2002 Grimes et al.
2002/0010018 A1 1/2002 Lemay et al.
2002/0016200 A1 2/2002 Baerlocher et al.
2002/0039923 A1 4/2002 Cannon et al.
2002/0049909 A1 4/2002 Jackson et al.
2002/0052232 A1 5/2002 Kaminkow
2002/0055381 A1 5/2002 Tarantino
2002/0071557 A1 6/2002 Nguyen
2002/0116615 A1 8/2002 Nguyen et al.
2002/0128055 A1 9/2002 Adams
2002/0137560 A1 9/2002 DeMar et al.
2002/0138594 A1 9/2002 Rowe
2002/0152120 A1 10/2002 Howington
2002/0165023 A1 11/2002 Brosnan et al.
2002/0177483 A1 11/2002 Cannon
2002/0187834 A1 12/2002 Rowe et al.
2003/0013514 A1 1/2003 Cregan et al.
2003/0027625 A1 2/2003 Rowe
2003/0027630 A1 2/2003 Kelly et al.
2003/0032485 A1 2/2003 Cockerille et al.
2003/0036422 A1 2/2003 Baerlocher et al.
2003/0036424 A1 2/2003 Baerlocher
2003/0040358 A1 2/2003 Rothkranz et al.
2003/0045350 A1 3/2003 Baerlocher et al.
2003/0045353 A1 3/2003 Paulsen et al.
2003/0050111 A1 3/2003 Saffari
2003/0054871 A1 3/2003 Baerlocher
2003/0054878 A1 3/2003 Benoy et al.
2003/0060259 A1 3/2003 Mierau et al.
2003/0060264 A1 3/2003 Chilton et al.
2003/0060266 A1 3/2003 Baerlocher
2003/0060269 A1 3/2003 Paulsen et al.
2003/0060279 A1 3/2003 Torango
2003/0064773 A1 4/2003 Baerlocher et al.
2003/0064779 A1 4/2003 Suda
2003/0064796 A1 4/2003 Glavich et al.
2003/0069057 A1 4/2003 DeFrees-Parrott
2003/0078091 A1 4/2003 Brandstetter et al.
2003/0078096 A1 4/2003 Kaminkow et al.
2003/0083943 A1 5/2003 Adams et al.
2003/0092477 A1 5/2003 Luciano, Jr. et al.
2003/0092484 A1 5/2003 Schneider et al.
2003/0100361 A1 5/2003 Sharpless et al.
2003/0104853 A1 6/2003 Tessmer et al.
2003/0114220 A1 6/2003 McClintic
2003/0119576 A1 6/2003 McClintic et al.
2003/0119580 A1 * 6/2003 McClintic et al. .............. 463/25
2003/0119581 A1 6/2003 Cannon et al.
2003/0125107 A1 7/2003 Cannon
2003/0125109 A1 7/2003 Green
2003/0127793 A1 7/2003 Adams
2003/0144965 A1 7/2003 Prasad et al.
2003/0153378 A1 8/2003 Schlegel et al.
2003/0157982 A1 8/2003 Gerrard et al.
2003/0162578 A1 8/2003 Baerlocher et al.
2003/0181231 A1 9/2003 Vancura et al.
2003/0182574 A1 9/2003 Whitten et al.
2003/0199321 A1 10/2003 Williams
2003/0211879 A1 11/2003 Englman
2003/0222402 A1 12/2003 Olive
2003/0223803 A1 12/2003 De Schrijver
2003/0228904 A1 12/2003 Acres et al.
2003/0228912 A1 12/2003 Wells et al.
2003/0232647 A1 12/2003 Moser
2004/0009807 A1 1/2004 Miller et al.
2004/0009811 A1 1/2004 Torango
2004/0033831 A1 2/2004 Tarantino
2004/0048644 A1 3/2004 Gerrard et al.
2004/0048649 A1 3/2004 Peterson et al.
2004/0053665 A1 3/2004 Baerlocher
2004/0072615 A1 4/2004 Maya et al.
2004/0082373 A1 4/2004 Cole et al.
2004/0087368 A1 5/2004 Gavselmann
2004/0111358 A1 6/2004 Lange et al.
2004/0152520 A1 8/2004 Shinoda
2004/0166923 A1 8/2004 Michaelson et al.
2004/0219962 A1 11/2004 Vancura
2004/0224770 A1 11/2004 Wolf et al.
2004/0229671 A1 11/2004 Stronach et al.
2004/0242297 A1 12/2004 Walker et al.
2004/0242315 A1 12/2004 Paulsen et al.
2004/0248639 A1 12/2004 Slomiany
2005/0012818 A1 1/2005 Kiely et al.
2005/0020340 A1 1/2005 Cannon
2005/0020351 A1 1/2005 Baerlocher et al.
2005/0020352 A1 1/2005 Chilton et al.
2005/0026679 A1 2/2005 Lucchesi et al.
2005/0026687 A1 2/2005 Watanabe
2005/0026694 A1 2/2005 Kelly et al.
2005/0032573 A1 2/2005 Acres et al.
2005/0033461 A1 2/2005 Gerrard et al.
2005/0054404 A1 3/2005 Baerlocher
2005/0054405 A1 3/2005 Baerlocher et al.
2005/0054415 A1 3/2005 Kaminkow et al.
2005/0054416 A1 3/2005 Hostetler et al.
2005/0054430 A1 3/2005 Pitman et al.
2005/0054435 A1 3/2005 Rodgers et al.
2005/0059456 A1 3/2005 Mead et al.
2005/0059461 A1 3/2005 Ching et al.
2005/0059467 A1 3/2005 Saffari et al.
2005/0064928 A1 3/2005 Baerlocher et al.
2005/0070353 A1 3/2005 Webb et al.
2005/0070356 A1 3/2005 Mothwurf
2005/0079908 A1 4/2005 Pacey
2005/0079911 A1 4/2005 Nakatsu
2005/0086478 A1 4/2005 Pienado et al.
2005/0096123 A1 5/2005 Cregan et al.
2005/0096125 A1 5/2005 LeMay et al.
2005/0101372 A1 5/2005 Mierau et al.
2005/0101374 A1 5/2005 Acres
2005/0101375 A1 5/2005 Webb et al.
2005/0101384 A1 5/2005 Parham
2005/0119047 A1 6/2005 Olive
2005/0137014 A1 6/2005 Vetelainen
2005/0143168 A1 6/2005 Torango
2005/0143169 A1 6/2005 Nguyen et al.
2005/0159211 A1 7/2005 Englman
2005/0163377 A1 7/2005 Walch
2005/0176488 A1 8/2005 Olive
2005/0178716 A1 8/2005 Suri
2005/0181853 A1 8/2005 Baerlocher
2005/0181860 A1 8/2005 Nguyen et al.
2005/0192081 A1 9/2005 Marks et al.
2005/0192083 A1 9/2005 Iwamoto
2005/0192099 A1 9/2005 Nguyen et al.
2005/0197180 A1 9/2005 Kaminkow et al.
2005/0202875 A1 9/2005 Murphy et al.
2005/0209004 A1 9/2005 Torango

(56) References Cited

U.S. PATENT DOCUMENTS

2005/0218591 A1 10/2005 Torigian et al.
2005/0227754 A1 10/2005 Kaminkow et al.
2005/0239542 A1 10/2005 Olsen
2005/0267610 A1 12/2005 Shinoda
2005/0282626 A1 12/2005 Manfredi et al.
2005/0282629 A1 12/2005 Gagner
2006/0003829 A1 1/2006 Thomas
2006/0009285 A1 1/2006 Pryzby et al.
2006/0025195 A1 2/2006 Pennington et al.
2006/0025210 A1 2/2006 Johnson
2006/0026604 A1 2/2006 Tan et al.
2006/0030397 A1 2/2006 Chan
2006/0030401 A1 2/2006 Mead et al.
2006/0030403 A1 2/2006 Lafky et al.
2006/0030959 A1 2/2006 Duhamel
2006/0035694 A1 2/2006 Fuller
2006/0035696 A1 2/2006 Walker et al.
2006/0035705 A1 2/2006 Jordan et al.
2006/0035706 A1 2/2006 Thomas et al.
2006/0036552 A1 2/2006 Gunyakti et al.
2006/0040732 A1 2/2006 Baerlocher et al.
2006/0046821 A1 3/2006 Kaminkow et al.
2006/0046822 A1 3/2006 Kaminkow et al.
2006/0052159 A1 3/2006 Cahill et al.
2006/0052161 A1 3/2006 Soukup et al.
2006/0052162 A1 3/2006 Soukup et al.
2006/0068882 A1 3/2006 Baerlocher et al.
2006/0068893 A1 3/2006 Jaffe et al.
2006/0068897 A1 3/2006 Sanford et al.
2006/0073874 A1 4/2006 Cregan et al.
2006/0073887 A1 4/2006 Nguyen et al.
2006/0073889 A1 4/2006 Edidin et al.
2006/0073897 A1 4/2006 Englman et al.
2006/0079317 A1 4/2006 Flemming et al.
2006/0084500 A1 4/2006 Baerlocher et al.
2006/0089194 A1 4/2006 Joshi et al.
2006/0116201 A1 6/2006 Gauselmann
2006/0121971 A1 6/2006 Slomiany et al.
2006/0154718 A1 7/2006 Willyard et al.
2006/0157934 A1 7/2006 Yoseloff et al.
2006/0183528 A1 8/2006 Rodgers et al.
2006/0183537 A1 8/2006 Dickerson
2006/0183538 A1 8/2006 Michaelson et al.
2006/0199628 A1 9/2006 Rodgers et al.
2006/0217170 A1 9/2006 Roireau
2006/0217183 A1 9/2006 Mierau et al.
2006/0246977 A1 11/2006 Cannon
2006/0247011 A1 11/2006 Gagner
2006/0287057 A1 12/2006 Osawa
2006/0287077 A1 12/2006 Grav et al.
2007/0015566 A1 1/2007 Baerlocher et al.
2007/0015585 A1 1/2007 Sartini
2007/0032285 A1 2/2007 Wolf
2007/0054732 A1 3/2007 Baerlocher
2007/0054733 A1 3/2007 Baerlocher
2007/0060271 A1 3/2007 Cregan et al.
2007/0060300 A1 3/2007 Baerlocher
2007/0060316 A1 3/2007 O'Halloran
2007/0060319 A1 3/2007 Block et al.
2007/0077990 A1 4/2007 Cuddy et al.
2007/0077997 A1 4/2007 Johnson
2007/0087809 A1 4/2007 Baerlocher
2007/0105620 A1 5/2007 Cuddy et al.
2007/0111783 A1 5/2007 Cuddy et al.
2007/0117606 A1 5/2007 Baerlocher et al.
2007/0117608 A1 5/2007 Roper et al.
2007/0123353 A1 5/2007 Smith
2007/0129128 A1 6/2007 McClintic
2007/0129131 A1 6/2007 Kaminkow et al.
2007/0149269 A1 6/2007 Benbrahim
2007/0155485 A1 7/2007 Cuddy et al.
2007/0167211 A1 7/2007 Rodgers et al.
2007/0167217 A1 7/2007 Kaminkow et al.
2007/0173325 A1 7/2007 Shaw et al.
2007/0184896 A1 8/2007 Dickerson
2007/0202943 A1 8/2007 Thomas
2007/0218997 A1 9/2007 Cho
2007/0243936 A1 10/2007 Binenstock et al.
2007/0259713 A1 11/2007 Fiden et al.
2007/0265060 A1 11/2007 Hornik et al.
2007/0298858 A1 12/2007 Toneguzzo
2007/0298874 A1 12/2007 Baerlocher et al.
2007/0298875 A1 12/2007 Baerlocher et al.
2008/0004102 A1 1/2008 Kojima
2008/0020822 A1 1/2008 Cuddy et al.
2008/0020842 A1 1/2008 Kaminkow et al.
2008/0020846 A1 1/2008 Vasquez
2008/0058046 A1* 3/2008 Schwartz et al. ................ 463/9
2008/0064502 A1 3/2008 Schlottmann et al.
2008/0076514 A1 3/2008 Baerlocher et al.
2008/0076517 A1 3/2008 Baerlocher et al.
2008/0076552 A1 3/2008 Baerlocher et al.
2008/0102916 A1 5/2008 Kovacs et al.
2008/0108404 A1 5/2008 Iddings et al.
2008/0108429 A1 5/2008 Davis et al.
2008/0113735 A1 5/2008 Maya
2008/0146322 A1 6/2008 Hardy et al.
2008/0146323 A1 6/2008 Hardy et al.
2008/0146345 A1 6/2008 Hardy et al.
2008/0176650 A1 7/2008 Wolf et al.
2008/0182662 A1 7/2008 Yoshizawa
2008/0214263 A1 9/2008 Walker et al.
2008/0214310 A1 9/2008 Brunet De Courssou et al.
2008/0227549 A1 9/2008 Itskov et al.
2008/0227552 A1 9/2008 Shimomura et al.
2008/0280670 A1 11/2008 Sakuma
2008/0311980 A1 12/2008 Cannon
2008/0318668 A1 12/2008 Ching et al.
2009/0124327 A1 5/2009 Caputo et al.
2009/0253492 A1 10/2009 Caputo et al.
2010/0016065 A1 1/2010 Nicely et al.
2010/0029363 A1 2/2010 Hoffman et al.
2010/0048282 A1 2/2010 Nicely et al.
2010/0120505 A1 5/2010 Caputo et al.
2010/0120521 A1 5/2010 Caputo et al.
2010/0227664 A1 9/2010 Walker et al.
2011/0053676 A1 3/2011 Wolf et al.
2011/0111827 A1 5/2011 Nicely et al.
2011/0111841 A1 5/2011 Tessmer et al.
2011/0218024 A1 9/2011 Baerlocher
2013/0079088 A1 3/2013 Lafky et al.
2013/0079089 A1 3/2013 Lafky et al.
2013/0079108 A1 3/2013 Lafky et al.
2013/0079109 A1 3/2013 Lafky et al.

FOREIGN PATENT DOCUMENTS

EP 0688002 12/1995
EP 0874337 10/1998
EP 0926645 6/1999
EP 0944030 9/1999
EP 0945837 9/1999
EP 1063622 12/2000
EP 1199689 4/2002
EP 1298607 4/2003
EP 1531434 5/2005
EP 1764753 3/2007
EP 1779908 5/2007
GB 2066991 7/1981
GB 2072395 9/1981
GB 2084371 4/1982
GB 2096376 10/1982
GB 2137392 10/1984
GB 2144644 3/1985
GB 2161008 1/1986
GB 2170938 8/1986
GB 2182186 5/1987
GB 2191030 12/1987
GB 2201821 9/1988
GB 2202984 10/1988
GB 2222712 3/1990
GB 2226436 6/1990
GB 2242300 9/1991
GB 2322217 8/1998

(56) References Cited

FOREIGN PATENT DOCUMENTS

| | | |
|---|---|---|
| GB | 2328311 | 2/1999 |
| GB | 2333880 | 8/1999 |
| WO | WO9800210 | 1/1998 |
| WO | WO0012186 | 3/2000 |
| WO | WO0020082 | 4/2000 |
| WO | WO0043087 | 7/2000 |
| WO | WO02096528 | 12/2002 |
| WO | WO03010725 | 2/2003 |
| WO | WO03026757 | 4/2003 |
| WO | WO03049053 | 6/2003 |
| WO | WO03083796 | 10/2003 |
| WO | WO2005110570 | 11/2005 |
| WO | WO2006063054 | 6/2006 |
| WO | WO2007011502 | 1/2007 |
| WO | WO2007030641 | 3/2007 |
| WO | WO2007030733 | 3/2007 |
| WO | WO2007030801 | 3/2007 |
| WO | WO2007087078 | 8/2007 |
| WO | WO2008022323 | 2/2008 |
| WO | WO2008027062 | 3/2008 |
| WO | WO2008109987 | 9/2008 |

* cited by examiner

GAMING SYSTEM AND METHOD PROVIDING A COLLECTION GAME INCLUDING AT LEAST ONE CUSTOMIZABLE AWARD COLLECTOR

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines that provide players awards in primary or base games are well known. These gaming machines generally require a player to place a wager to activate a play of the primary game. For many of these gaming machines, any award provided to a player for a wagered-on play of a primary game is based on the player obtaining a winning symbol or a winning symbol combination and on an amount of the wager (e.g., the higher the amount of the wager, the higher the award). Winning symbols or winning symbol combinations that are less likely to occur typically result in higher awards being provided when they do occur.

For such known gaming machines, an amount of a wager placed on a primary game by a player may vary. For instance, a gaming machine may enable a player to wager a minimum quantity of credits, such as one credit (e.g., one cent, nickel, dime, quarter, or dollar), up to a maximum quantity of credits, such as five credits. The gaming machine may enable the player to place this wager a single time or multiple times for a single play of the primary game. For instance, a gaming machine configured to operate a slot game may have one or more paylines, and the gaming machine may enable a player to place a wager on each of the paylines for a single play of the slot game. Thus, it is known that a gaming machine, such as one configured to operate a slot game, may enable players to place wagers of substantially different amounts on each play of a primary game. For example, the amounts of the wagers may range from one credit up to 125 credits (e.g., five credits on each of twenty-five separate paylines). This is also true for other wagering games, such as video draw poker, in which players can place wagers of one or more credits on each hand, and in which multiple hands can be played simultaneously. Accordingly, it should be appreciated that different players play at substantially different wager amounts or levels and substantially different rates of play.

Bonus or secondary games are also known in gaming machines. Such gaming machines usually provide an award to a player for a play of one such bonus game in addition to any awards provided for any plays of any primary games. Bonus games usually do not require an additional wager to be placed by the player to be initiated. Bonus games are typically initiated or triggered upon an occurrence of a designated triggering symbol or designated triggering symbol combination in the primary game. For instance, a gaming machine may initiate or trigger a bonus game when a bonus symbol occurs on the payline on the third reel of a three reel slot machine. The gaming machine generally indicates when a bonus game is initiated or triggered through one or more visual and/or audio output devices, such as the reels, lights, speakers, display screens, etc. Part of the enjoyment and excitement of playing certain gaming machines is the initiation or triggering of a bonus game, even before the player knows an amount of a bonus award won via the bonus game.

Another part of the enjoyment and excitement of playing certain gaming machines is playing the bonus game. Many known bonus games, such as those offering free spins of slot machine reels or a free spin of an award wheel, include a limited amount of player interaction. Due to the limited amount of player interaction, a player may perceive these bonus games as being completely out of the player's control, meaning that the player is relying on pure luck to win a bonus award. Certain players do not enjoy playing these types of bonus games, and would rather play bonus games that include one or more player-controllable elements (or perceived player-controllable elements). Because they are directly controlling (or appear to be directly controlling) certain aspects of these types of bonus games, the players feel personally invested in, and enjoy playing, these bonus games. Accordingly, there is a continuing need to provide new bonus games that include a large amount of player interaction and involvement.

SUMMARY

Various embodiments of the present disclosure provide a gaming system and method providing a collection game including at least one customizable award collector. Generally, for a play of one embodiment of the collection game, the gaming system displays a field including a plurality of different obstacles and a plurality of award symbols. Each award symbol is associated with an award. The gaming system provides a player with one or more award collectors, and enables the player to associate one of a plurality of different items with each award collector. Each item is associated with a different one of the obstacles such that, when that item is associated with an award collector, that item enables the award collector to overcome the obstacle associated with that item. The gaming system enables the player to select one of the award collectors and a position within the field, and displays the selected award collector at the selected position within the field.

In this embodiment, the gaming system displays one or more moves of the displayed award collector within the field. For each move, if the displayed award collector intersects or collides with one of the award symbols, the gaming system accumulates the award associated with that award symbol. Additionally, for each move, if the displayed award collector intersects or collides with one of the obstacles, the gaming system determines whether the item associated with the displayed award collector enables the displayed award collector to overcome that obstacle (i.e., determines whether the item associated with the displayed award collector is associated with that obstacle). If the item associated with the displayed award collector does not enable the displayed award collector to overcome that obstacle, the gaming system ends the play of the collection game with respect to that award collector (such as by removing the displayed award collector from the field). The gaming system determines whether any award collectors remain (i.e., have not been positioned within the field). If any award collectors remain, the gaming system enables the player to select one of the remaining award collectors and a position within the field, displays the selected award collector at the selected position within the field, and displays the displayed award collector moving within the field and interacting with the obstacles and the award symbols, as generally described above. Once the gaming system has ended the play of the collection game with respect to each award collector (i.e., when no award collectors remain), the gaming system provides any accumulated awards and ends play of the collection game.

Thus, in various embodiments, the gaming system of the present disclosure is configured to provide a player with a game that includes a large amount of player interaction and involvement, and in certain embodiments rewards players who best survey the obstacles and the award symbols positioned within the field and make sound decisions regarding which items to associate with which collectors and regarding where to position the collectors within the field.

Additional features and advantages are described herein, and will be apparent from, the following Detailed Description and the Figures.

DETAILED DESCRIPTION

Figure 1:
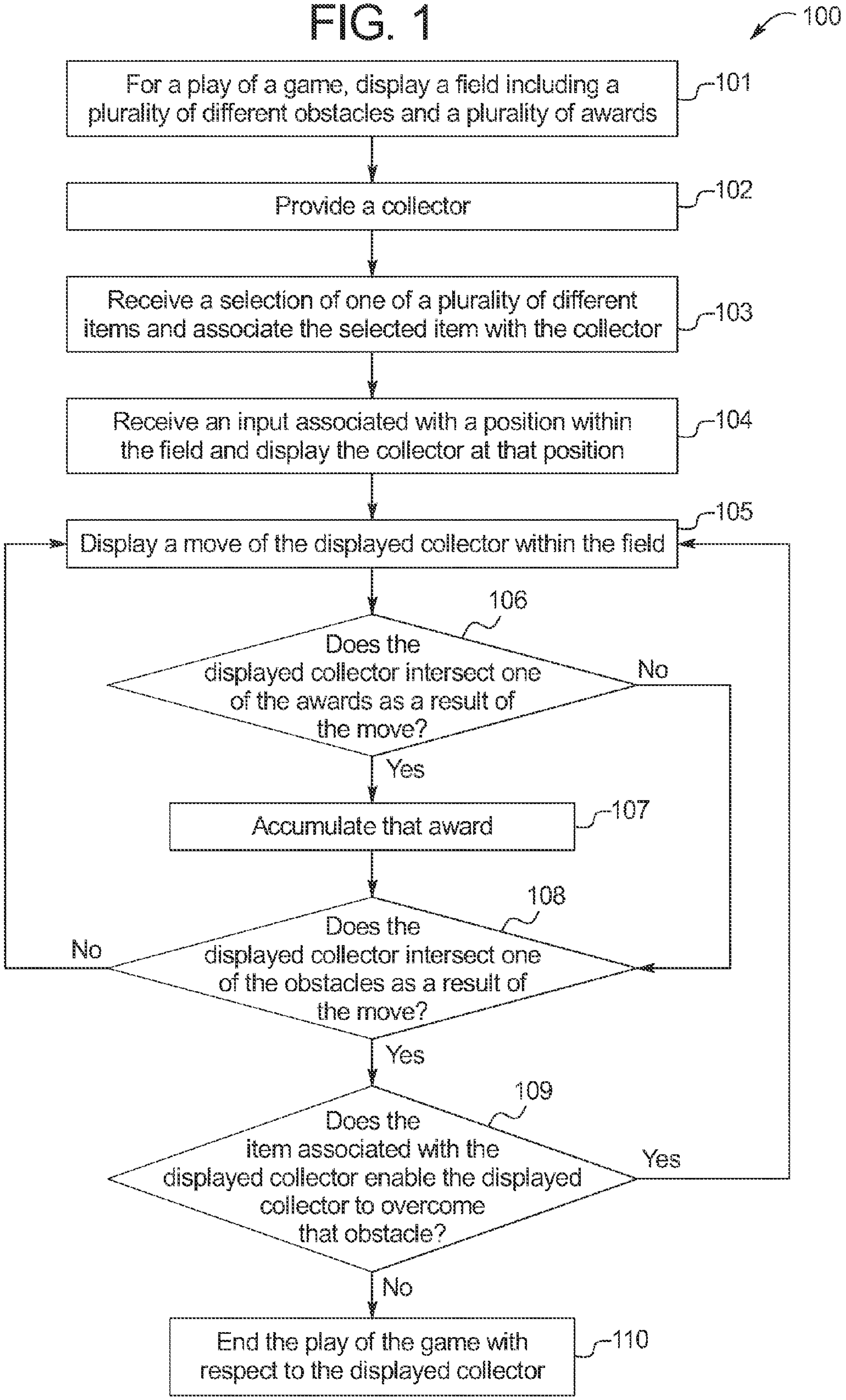
FIG. 1 is a flowchart illustrating an example method of operating an embodiment of the gaming system of the present disclosure.

Collection Game Including at Least One Customizable Award Collector

Various embodiments of the present disclosure provide a gaming system and method providing a collection game including at least one customizable award collector (referred to herein as a "collector" for brevity). Generally, for a play of one embodiment of the collection game, the gaming system displays a field including a plurality of different obstacles and a plurality of award symbols. Each award symbol is associated with an award. The gaming system provides a player with one or more collectors, and enables the player to associate one of a plurality of different items with each collector. Each item is associated with a different one of the obstacles such that, when that item is associated with a collector, that item enables the collector to overcome the obstacle associated with that item. The gaming system enables the player to select one of the collectors and a position within the field, and displays the selected collector at the selected position within the field. The gaming system displays at least one move of the displayed collector within the field. For each move, if the displayed collector intersects or collides with one of the award symbols, the gaming system accumulates the award associated with that award symbol. Additionally, for each move, if the displayed collector intersects or collides with one of the obstacles, the gaming system determines whether the item associated with the displayed collector enables the displayed collector to overcome that obstacle (i.e., determines whether the item associated with the displayed collector is associated with that obstacle). If the item associated with the displayed collector does not enable the displayed collector to overcome that obstacle, the gaming system ends the play of the collection game with respect to that collector (such as by removing the displayed collector from the field). The gaming system then determines whether any collectors remain (i.e., have not been positioned within the field). If any collectors remain, the gaming system enables the player to select one of the remaining collectors and a position within the field, displays the selected collector at the selected position within the field, and displays the displayed collector moving within the field and interacting with the obstacles and the award collectors, as generally described above. Once the gaming system has ended the play of the collection game with respect to each collector (i.e., when no collectors remain), the gaming system provides any accumulated awards and ends play of the collection game.

While the examples and embodiments of the collection game described herein generally describe the collection game as a bonus game, it should be appreciated that certain such embodiments of the collection game may be implemented as a primary game rather than a bonus game.

For a play of the collection game, the gaming system displays a field. The gaming system determines at least one of a plurality of different obstacles to position within the field and at least one of a plurality of award symbols to position within the field. Each award symbol is associated with an award, as further described below. In one embodiment, the gaming system randomly determines which of the obstacles to position within the field and/or which of the award symbols to position within the field. In another embodiment, which of the obstacles to position within the field and/or which of the award symbols to position within the field is predetermined. In further embodiments, the gaming system determines which of the obstacles to position within the field and/or which of the award symbols to position within the field based on one or more of: (a) any obstacles the gaming system has already determined to position within the field (or has already positioned within the field); (b) any award symbols the gaming system has already determined to position within the field (or has already positioned within the field); (c) a wager placed by the player; (d) an outcome of a play of a primary game or a bonus game; (e) an occurrence of a triggering event; (f) a player tracking status or level of the player; and (g) how often the player has played the collection game.

It should be appreciated that, in various embodiments, each of the obstacles may be any suitable obstacle, such as (but not limited to): (a) falling rocks, (b) pits, (c) flames, (d) cement walls, (e) locked doors, (f) rock piles, (g) waterfalls, or (h) monsters. In certain embodiments, the collection game has a theme, such as a zombie theme, an adventure theme, or an underwater theme, and the obstacles relate to that theme. For example, obstacles in a collection game having an underwater theme may be sharks, sea monsters, or other sea creatures. It should also be appreciated that, in various embodiments, each award associated with an award symbol may be any suitable award, such as (but not limited to): (a) a quantity of credits, (b) an amount of currency, (c) a quantity of non-monetary credits, (d) a quantity of player tracking points, (e) a quantity of free plays of one or more primary games or one or more bonus games, (f) a quantity of additional collectors for use in the play of the collection game, (g) a modifier such as a multiplier for use in the collection game or in a primary game or a bonus game, (h) a product such as a bike or a car, (i) a quantity of collection game credits (as described below), (j) one of a plurality of awards of a set of awards, (k) a retrigger feature that retriggers the initiation of the collection game, (l) a repopulation award that causes the gaming system to position additional awards within the field, (m) a conversion award that converts one or more obstacles positioned within the field into awards, (n) an additional item award that causes the gaming system to associate an item with the displayed collector and/or (o) a comp award such as a free night's stay at a hotel or show tickets.

In one embodiment, the award associated with at least one of the award symbols is a quantity of designated non-monetary credits that a player may accumulate over multiple plays of the collection game. In this embodiment, once the player accumulates at least a designated quantity of the designated non-monetary credits, the gaming system unlocks a certain awards and/or certain obstacles for use in future plays of the collection game that were not available in earlier plays of the collection game (i.e., prior to being unlocked). Thus, this embodiment of the collection game incentivizes players to play the collection game to accumulate designated non-monetary credits to unlock new features for subsequent plays of the collection game.

In one embodiment, such as the embodiment generally described above, for at least one of the obstacles, when a displayed collector moving within the field (as described in detail below) intersects that obstacle and the displayed collector is not associated with an item that enables the displayed collector to overcome that obstacle, the gaming system ends the play of the collection game with respect to that collector. In another embodiment, for at least one of the obstacles, when a displayed collector moving within the field intersects that obstacle and the displayed collector is not associated with an item that enables the displayed collector to overcome that obstacle, the gaming system assigns the displayed collector an amount of damage. In this embodiment, after the displayed collector has been assigned a designated amount of damage, the gaming system ends the play of the collection game with respect to that collector. In another embodiment, for at least one of the obstacles, when a displayed collector moving within the field intersects that obstacle and the displayed collector is not associated with an item that enables the displayed collector to overcome that obstacle, the gaming system ends the play of the collection game with respect to all collectors. In another embodiment, for at least one of the obstacles, when a displayed collector moving within the field intersects that obstacle and the displayed collector is not associated with an item that enables the displayed collector to overcome that obstacle, the gaming system reduces or increases a multiplier applicable to future accumulated awards for the play of the collection game. In another embodiment, for at least one of the obstacles, when a displayed collector moving within the field intersects that obstacle and the displayed collector is not associated with an item that enables the displayed collector to overcome that obstacle, the gaming system reduces or increases a multiplier applicable to all accumulated awards for the play of the collection game. In another embodiment, for at least one of the obstacles, when a displayed collector moving within the field intersects that obstacle and the displayed collector is not associated with an item that enables the displayed collector to overcome that obstacle, the gaming system reduces any accumulated awards for the play of the collection game. It should be appreciated that the accumulated awards may be reduced by a static amount or a dynamic amount based on an amount of the accumulated awards collected over a plurality of plays of the collection game, based on an amount of the accumulated awards collected for the current play of the collection game, or based on any other suitable factor. In another embodiment, for at least one of the obstacles, when a displayed collector moving within the field intersects that obstacle and the displayed collector is associated with an item that enables the displayed collector to overcome that obstacle, the displayed collector overcomes that obstacle, but the item is destroyed or removed.

The gaming system positions each determined obstacle and each determined award symbol within the field. In one embodiment, the gaming system randomly determines, for each determined obstacle and for each determined award symbol, where to position that obstacle or award symbol within the field. In another embodiment, where to position each determined obstacle and each determined award symbol within the field is predetermined. In further embodiments, the gaming system determines, for each determined obstacle and for each determined award symbol, where to position that obstacle or that award symbol within the field based on one or more of: (a) the positions of one or more obstacles already positioned within the field; (b) the positions of one or more award symbols already positioned within the field; (c) a wager placed by the player; (d) an outcome of a play of a primary game or a bonus game; (e) an occurrence of a triggering event; (f) a player tracking status or level of the player; and (g) how often the player has played the collection game.

In various embodiments, the gaming system positions each determined obstacle and each determined award symbol within the field such that no positioned obstacles overlap one another, no positioned award symbols overlap one another, and no positioned obstacles overlap any positioned award symbols. In other embodiments, the gaming system positions each determined obstacle and each determined award symbol within the field such that at least one of: (a) at least two positioned obstacles overlap one another, (b) at least two positioned award symbols overlap one another, and (c) at least one positioned obstacle overlaps at least one positioned award symbol.

In certain embodiments, the gaming system displays each positioned obstacle and each positioned award symbol, while in other embodiments the gaming system does not display at least one positioned obstacle and/or at least one positioned award symbol. It should be appreciated that, in the latter embodiment, at least one positioned obstacle and/or at least one positioned award symbol are not displayed (or are masked) and are thus not visible prior to the player positioning any of the collectors (as described below). In certain embodiments, each positioned obstacle and each positioned award symbol is stationary. That is, in such embodiments, none of the positioned obstacles or award symbols move after being positioned within the field. In other embodiments, at least one positioned obstacle and/or at least one positioned award symbol is not stationary. That is, in such embodiments, at least one of the positioned obstacles or award symbols moves after being positioned within the field.

In one embodiment, the gaming system positions one or more secondary field doors within the field. In this embodiment, when a displayed collector intersects or collides with one of the secondary field doors, the gaming system displays a second field including at least one of the obstacles and at least one of the awards, displays the displayed collector that intersected the secondary field door on the second field, and displays the displayed collector moving within the second field and interacting with the obstacles and awards as generally described above. In another embodiment, the gaming system positions one or more transporters within the field. In this embodiment, when a displayed collector intersects or collides with one of the transporters, the gaming system moves the displayed collector to another position within the field.

In various embodiments, the gaming system provides the player with a designated quantity of collectors for use in the play of the collection game. In one embodiment, the gaming system provides the player with the designated quantity of collectors before displaying the field and any obstacles and award symbols positioned within the field, while in another embodiment the gaming system provides the player with the designated quantity of collectors after displaying the field and any obstacles and award symbols positioned within the field. In various embodiments, the designated quantity of collectors is: (a) predetermined, (b) randomly determined, (c) based on a wager placed by the player; (d) based on an outcome of a play of a primary game or a bonus game; (e) based on an occurrence of a triggering event; (f) based on a player tracking status or level of the player; (g) based on how often the player has played the collection game; and/or (h) based on a level the player has achieved in the collection game. In one embodiment, the player receives a designated quantity of at least one collector and a quantity of collection game credits (described below) that the player may use to purchase additional collectors and/or items to associate with the collector(s).

The gaming system enables the player to customize the collectors by, for each of one or more of the collectors, associating one or more of a plurality of items with that collector. In one embodiment, the gaming system enables the player to customize the collectors before displaying the field and any obstacles and award symbols positioned within the field, while in another embodiment the gaming system enables the player to customize the collectors after displaying the field and any obstacles and award symbols positioned within the field. In another embodiment, the gaming system enables the player to customize the collectors after displaying the types of obstacles and award symbols that will be positioned within the field but before displaying the obstacles and award symbols positioned within the field. Each item is associated with a different one of the obstacles such that, when that item is associated with a collector, that item enables the collector to overcome the obstacle associated with that item. It should thus be appreciated that, in certain embodiments, each item is related in some way to the obstacle that a collector assigned with that item may overcome. For example: (a) a hard hat item is associated with an obstacle of falling rocks, and enables the collector to overcome the falling rocks; (b) a jet pack item is associated with an obstacle of a pit, and enables the collector to overcome (e.g., fly over) the pit; (c) a flame retardant suit item is associated with an obstacle of flames, and enables the collector to overcome the flames; (d) a pogo stick item is associated with an obstacle of a cement wall, and enables the collector to overcome (e.g., jump over) the cement wall; (e) a skeleton key item is associated with an obstacle of a locked door, and enables the collector to overcome (e.g., open) the locked door; and (f) a pick axe item is associated with an obstacle of a rock pile, and enables the collector to overcome (e.g., tunnel through) the rock pile.

In various embodiments, the items include certain rare items that are not regularly available. In one embodiment, such rare items are randomly made available to players. In another embodiment, such rare items are made available to players at predetermined times or upon an occurrence of one or more triggering conditions. In one embodiment, one rare item is a super item that is associated with a plurality of the obstacles such that, when that item is associated with a collector, that item enables the collector to overcome each of the obstacles associated with that item. In one such embodiment, such super items are more difficult to obtain or cost more than regular items (i.e., items that are associated with a single obstacle). In another such embodiment, such super items break or are destroyed following a single use to overcome an obstacle while regular items do not break or are not destroyed following a single use to overcome an obstacle. In another such embodiment, such super items may be used to overcome obstacles a greater quantity of times than regular items.

In certain embodiments, the gaming system enables the player to customize one of the collectors by associating a single one of the items with that collector. In other embodiments, the gaming system enables the player to customize one of the collectors by associating a plurality of, but less than all of, the items with that collector. In further embodiments, the gaming system enables the player to customize one of the collectors by associating all of the items with that collector. In various embodiments in which the gaming system enables the player to customize more than one of the collectors, the gaming system requires the player to customize all of those collectors in the same manner. That is, in such embodiments, the gaming system requires the player to associate the same item(s) with each collector that the player desires to customize. In other embodiments in which the gaming system enables the player to customize more than one of the collectors, the gaming system does not require the player to customize all of those collectors in the same manner. Put differently, in such embodiments, the gaming system enables the player to associate different items with at least two of the collectors that the player desires to customize. In various embodiments, the gaming system does not enable the player to customize a collector such that the collector is able to overcome all obstacles positioned within the field, while in other embodiments the gaming system does enable the player to do so.

In certain embodiments, the gaming system enables the player to customize one or more of the collectors by, for each of the one or more collectors, enabling the player to select which of the items to associate with that collector. Thus, in these embodiments, the gaming system enables the player to directly choose which of the items are associated with which of the collectors (i.e., enables the player to directly customize the collectors). In one embodiment, the gaming system enables the player to choose not to customize one or more of the collectors and save that ability to customize for use in a future play of the collection game. This thus enables the player to add additional customization to a collector in a future play of the collection game, thereby increasing the likelihood that that collector (in the future play) will collect more awards.

In other embodiments, the gaming system enables the player to instruct the gaming system to randomly determine which of the items to associate with which of the collectors rather than directly customizing the collectors. In this embodiment, when the player instructs the gaming system to randomly determine which of the items to associate with which of the collectors, the gaming system randomly determines one or more of the items to associate with one or more of the collectors. In further embodiments, the gaming system enables the player to select one of a plurality of pre-customized sets of collectors, each of which include collectors associated with one or more of the items, rather than directly customizing the collectors. In another embodiment, the gaming system enables the player to select a set of collectors previously customized by another player rather than directly customizing the collectors. In certain embodiments, the gaming system enables the player to post the player's customized collectors to a shared game server, which enables other players to view, select, and use the player's customized collectors during their own plays of the collection game. In one embodiment, players whose posted customized collectors are selected by other players receive compensation, such as non-monetary credits or a spot on a leader board showing which posted customized collectors have been the most popular during a designated time period (such as a day, week, or month). In another embodiment, posted customized collectors may be associated with certain rare items that are not normally regularly available. In one example, a rare Santa's sleigh item is normally only available on Christmas unless that rare item is associated with a posted customized collector, in which case it is available for as long as the customized collector remains posted.

In various embodiments, the gaming system enables the player to customize one or more of the collectors by, for each of the one or more collectors, using collection game credits to purchase items to associate with that collector. In such embodiments, each item is associated with a price of a quantity of collection game credits. In one embodiment, each item is associated with a same price, while in another embodiment at least two items are associated with different prices. The gaming system enables the player to purchase items to associate with the collectors until: (a) the player runs out of collection game credits, (b) the player does not have enough collection game credits remaining to purchase any items, (c) the player chooses not to purchase any more items, or (d) any combination thereof. In one such embodiment, the gaming system enables the player to purchase one of a plurality of pre-customized sets of collectors using collection game credits.

In such embodiments, the gaming system enables the player to accumulate collection game credits in one or more of a variety of manners. In one embodiment the gaming system provides the player with an amount of collection game credits upon initiation of the collection game. It should be appreciated that the amount of collection game credits may be: (a) predetermined, (b) randomly determined, (c) based on a wager placed by the player; (d) based on an outcome of a play of a primary game or a bonus game; (e) based on an occurrence of a triggering event; (f) based on a player tracking status or level of the player; and/or (g) based on how often the player has played the collection game. In other embodiments, the gaming system enables the player to accumulate collection game credits: (a) by selling previously purchased or earned items; (b) by satisfying certain conditions in a primary game (when the collection game is a bonus game) or in a bonus game (when the collection game is a primary game), such as by achieving a designated symbol combination or other designated outcome; (c) by directly purchasing collection game credits using currency (such as purchasing 100 collection game credits for $10.00); (d) by directly purchasing collection game credits using player tracking points; and/or (e) when another player selects or purchases the player's posted customized collector or collectors for use in a play of the collection game by that other player.

In certain embodiments in which the collection game is a bonus game, the prices of the items are determined based on the player's effective bonus bet. In one embodiment, the player's effective bonus bet is equal to the bet the player placed on the play of the primary game that triggered the collection game. In another embodiment, the player's effective bonus bet is equal to an average of the player's bets on plays of the primary game associated with the collection game (e.g., plays of the primary game that triggered the collection game and/or plays of the primary game that provided the player with one or more items, as described below). It should be appreciated that in certain embodiments the gaming system enables the player to purchase one or more items configured to raise or lower the player's effective bonus bet.

In certain embodiments in which the collection game is a bonus game, the gaming system enables the player to customize one or more of the collectors by earning items through play of the primary game and then associating those earned items with the collectors upon initiation of the collection game. For example, upon the occurrence of certain designated symbol combinations during play of the primary game, the gaming system provides the player one or more of the items for use in the collection game. In another example, when one or more designated sub-symbols are displayed during play of the primary game, the gaming system provides the player with one or more of the items for use in the collection game. In a further example, when a mystery triggering event occurs during play of the primary game, the gaming system provides the player with one or more of the items for use in the collection game. In one such embodiment, when the player sells an item earned via a play of the primary game, the gaming system provides the player with a number of collection game credits based on the size of the bet the player placed on the play of the primary game through which the gaming system provided that item.

After any items are associated with the collectors, in various embodiments, the gaming system enables the player to position the collectors within the field. Generally, for each collector, the gaming system enables the player to select a position within the field, and displays the collector at the selected position. In certain embodiments, the gaming system enables the player to place the collectors at designated positions within the field; that is, in such embodiments, the gaming system does not enable the player to place the collectors at positions within the field other than the designated positions. In one example, the gaming system does not enable the player to place any collectors on a position within the field that is already occupied by an award symbol(s) and/or an obstacle(s). In other embodiments, the gaming system enables the player to place the collectors at any position within the field. In one embodiment, the gaming system positions the collectors within the field (such as via a random position determination) rather than enabling the player to determine the positions at which to place the collectors.

In one embodiment, the gaming system enables the player to position all of the collectors within the field at once, at different positions or at the same position, such that the gaming system displays a plurality of displayed collectors moving at once. In another embodiment, the gaming system enables the player to position the collectors within the field one at a time. In one example, the gaming system enables the player to position a collector within the field when no other collectors are displayed within the field. That is, in this example, the gaming system is configured to display a single collector moving within the field at any given time. In other embodiments, the gaming system enables the player to position the collectors at a player-controlled rate. That is, in these embodiments, the gaming system enables the player to position the collectors into the field as fast or as slow as the player desires. In one such embodiment, if the player quickly positions the collectors in the field, multiple collectors may simultaneously be moving around the field. In another such embodiment, certain types of obstacles may only be overcome if the player positions several collectors in quick succession. For example, one obstacle is a collector-eating plant obstacle. In this example, a collector may only overcome that obstacle by sneaking by the plant as it is munching on another collector.

Once a collector is placed within the field, the gaming system displays at least one move of the displayed collector within the field. In various embodiments, for each move, if the displayed collector intersects or collides with one of the award symbols, the gaming system accumulates the award associated with that award symbol. Additionally, for each move, if the displayed collector intersects or collides with one of the obstacles, the gaming system determines whether the item associated with the displayed collector enables the displayed collector to overcome that obstacle (i.e., determines whether the item associated with the displayed collector is associated with that obstacle). If the item associated with the displayed collector does not enable the displayed collector to overcome that obstacle, in one embodiment, the gaming system ends the play of the collection game with respect to that displayed collector. Once the gaming system ends the play of the collection game for each collector, the gaming system provides any accumulated awards and ends play of the collection game.

It should be appreciated that the movement of the displayed collectors within the field may be determined in any suitable manner. In one embodiment, the collectors randomly move within the field. In another embodiment, the collectors move according to one of a plurality of predetermined paths within the field. In certain embodiments, at least one direction of movement of the displayed collectors is predetermined. It should be appreciated that, in various embodiments, the player has no influence over the displayed collector's movement within the field once the player positions the collector within the field.

In certain embodiments, for each move, if the displayed collector intersects or collides with one of the award symbols, the gaming system accumulates the award associated with that award symbol and determines whether a designated quantity of awards has been accumulated. In one such embodiment, if the designated quantity of awards has been accumulated, the gaming system ends the play of the collection game with respect to that collector. In another such embodiment, if the designated quantity of awards has been accumulated, the gaming system provides any accumulated awards and ends the play of the collection game with respect to all collectors. In one example, the gaming system ends the play of the collection game when a designated quantity of all of the awards associated with the award symbols positioned within the field has been accumulated.

In one embodiment, when a displayed collector intersects an award symbol, the gaming system accumulates the award associated with that award symbol and removes that award symbol from the field. In another embodiment, when a displayed collector intersects an award symbol, the gaming system accumulates the award associated with that award symbol and does not remove that award symbol from the field. In one embodiment, when a displayed collector intersects an obstacle and is not associated with an item that enables the displayed collector to overcome that obstacle, the gaming system removes that obstacle from the field. In another embodiment, when a displayed collector intersects an obstacle and is not associated with an item that enables the displayed collector to overcome that obstacle, the gaming system does not remove that obstacle from the field. In one embodiment, when a displayed collector intersects an obstacle and is associated with an item that enables the displayed collector to overcome that obstacle, the gaming system removes that obstacle from the field. In another embodiment, when a displayed collector intersects an obstacle and is associated with an item that enables the displayed collector to overcome that obstacle, the gaming system does not remove that obstacle from the field.

In certain embodiments in which the gaming system removes an award symbol and/or an obstacle from the field when a displayed collector intersects that award symbol and/or that obstacle, the gaming system repopulates the field with one or more additional obstacles and/or award symbols in certain instances (such as upon the occurrence of a triggering event). In one such embodiment, when a quantity of award symbols positioned within the field falls below a designated quantity, the gaming system determines one or more additional award symbols and positions the additional award symbols within the field. In another such embodiment, when a quantity of obstacles positioned within the field falls below a designated quantity, the gaming system determines one or more additional obstacles and positions the additional obstacles within the field. In another such embodiment, each time a collector is positioned within the field, the gaming system determines one or more additional award symbols and/or one or more additional obstacles and positions those additional award symbols and/or obstacles within the field. In another such embodiment, the number of awards and obstacles in the field is based on the number of active players. In this embodiment, the field is repopulated with awards and/or obstacles quickly if there are a relatively high number of players and relatively slowly when there are a relatively low number of players.

In various embodiments, the gaming system is configured to operate the collection game as a persistence game. In one such embodiment, the field and any obstacles and award symbols positioned within the field persist between plays of the collection game. For example, the player plays the collection game at a first point in time and accumulates the awards associated with five of the ten award symbols positioned within the field. The next time the player plays the collection game, the gaming system displays the same field including the remaining five award symbols positioned within the field. In another such embodiment, the gaming system stores data indicating a plurality of levels. In this embodiment, each level includes a field and a plurality of the positions of one or more award symbols and/or one or more obstacles are stored in association with a particular level. When the player first initiates the collection game, the gaming system displays a first level. When the player accumulates the awards associated with all of the award symbols in the first level, the gaming system displays the second level, and so on. It should be appreciated that in certain embodiments each of the plurality of levels is configured such that the levels become progressively more difficult and/or include progressively higher-valued awards as the player progresses through the levels.

In certain embodiments, either: (a) before play of the collection game begins, or (b) after play of the collection game is completed, the gaming system enables the player to choose whether to spin an award wheel. The award wheel includes a plurality of sections, each of which is associated with an award (such as any of the awards listed above) and one of which is indicated following a spin of the award wheel. In one embodiment in which the gaming system enables the player to choose whether to spin the award wheel before play of the collection game begins, if the player chooses to spin the award wheel, the player forfeits the play of the collection game and the gaming system provides the player with the award indicated following the spin of the award wheel. In another embodiment in which the gaming system enables the player to choose whether to spin the award wheel before play of the collection game begins, if the player chooses to spin the award wheel, the gaming system enables the player to play the collection game and enables the player to choose whether to keep: (a) the award indicated following the spin of the award wheel, or (b) any award accumulated during the play of the collection game. In another embodiment in which the gaming system enables the player to choose whether to spin the award wheel before play of the collection game begins, if the player chooses to spin the award wheel, the gaming system enables the player to play the collection game and enables the player to keep both: (a) the award indicated following the spin of the award wheel, and (b) any award accumulated during the play of the collection game.

In one embodiment in which the gaming system enables the player to choose whether to spin the award wheel after play of the collection game is completed, if the player chooses to spin the award wheel, the player forfeits the any award accumulated during play of the collection game and the gaming system provides the player with the award indicated following the spin of the award wheel. In another embodiment in which the gaming system enables the player to choose whether to spin the award wheel after play of the collection game is completed, if the player chooses to spin the award wheel, the gaming system enables the player to play the collection game and enables the player to choose whether to keep: (a) the award indicated following the spin of the award wheel, or (b) any award accumulated during the play of the collection game. In another embodiment in which the gaming system enables the player to choose whether to spin the award wheel after play of the collection game is completed, if the player chooses to spin the award wheel, the gaming system enables the player to play the collection game and enables the player to keep both: (a) the award indicated following the spin of the award wheel, and (b) any award accumulated during the play of the collection game.

In certain such embodiments, the volatility of the spin of the award wheel is relatively low such that, if the player chooses to spin the award wheel, the player typically receives a designated award amount. In this way, a low-skilled player may choose to spin the award wheel instead of playing the collector bonus, which requires some level or skill or perceived skill. The player will be guaranteed a bonus award if the player chooses to spin the award wheel. With more practice, the player may opt to play the collection game in which the player can win bigger awards more often than by spinning the award wheel. It should be appreciated that such embodiments may be employed using a slot game, a selection game, or any other suitable game rather than an award wheel.

In various embodiments, the collection game is a multi-player or community game configured to be played simultaneously by a plurality of players on a plurality of electronic gaming machines (EGMs) of the gaming system. In one such embodiment, the field is displayed on a community display device viewable by each of the players, while in another embodiment the field is displayed by each player's EGM. The gaming system provides each player with a designated quantity of collectors and enables each player to customize that player's collectors, as described above. In one such embodiment, the gaming system provides more collectors to players who wager higher amounts, on average, than other players. The gaming system enables each player to position one of the player's collectors within the field. When each player has positioned a collector within the field, the gaming system displays those collectors moving and intersecting with obstacles and award symbols, as described above. In one embodiment, collectors of different players do not do not interact with one another, while in another embodiment, collectors of different players may interact with one another. The process repeats until no collectors remain for any of the players. It should be appreciated that any of the above-described embodiments and examples may be employed in the multi-player embodiment.

EXAMPLES

FIG. 1 illustrates a flowchart of an example process or method 100 for operating a gaming system of the present disclosure. In various embodiments, process 100 is represented by a set of instructions stored in one or more memories and executed by one or more processors. Although process 100 is described with reference to the flowchart shown in FIG. 1, it should be appreciated that many other processes of performing the acts associated with this illustrated process may be employed. For example, the order of certain of the illustrated blocks and/or diamonds may be changed, certain of the illustrated blocks and/or diamonds may be optional, and/or certain of the illustrated blocks and/or diamonds may not be employed.

In this example, for a play of a game, the gaming system displays a field including a plurality of different obstacles and a plurality of award symbols (referred to in this example as "awards" for brevity), as indicated by block 101. The gaming system provides a collector, as indicated by block 102. The gaming system receives a selection of one of a plurality of different items and associates the selected item with the collector, as indicated by block 103. The gaming system receives an input associated with a position within the field, and displays the collector at that position, as indicated by block 104. The gaming system displays a move of the displayed collector within the field, as indicated by block 105. The gaming system determines whether the displayed collector intersects one of the awards as a result of the move, as indicated by diamond 106. If the displayed collector does not intersect one of the awards as a result of the move, process 100 proceeds to diamond 108 (described below).

If the displayed collector intersects one of the awards as a result of the move, the gaming system accumulates that award, as indicated by block 107. The gaming system determines whether the displayed collector intersects one of the obstacles as a result of the move, as indicated by diamond 108. If the displayed collector does not intersect one of the obstacles as a result of the move, process 100 returns to block 105. If the displayed collector intersects one of the obstacles as a result of the move, the gaming system determines whether the item associated with the displayed collector enables the displayed collector to overcome that obstacle, as indicated by diamond 109. If the item associated with the displayed collector enables the displayed collector to overcome that obstacle, process 100 returns to block 105. If the item associated with the displayed collector does not enable the displayed collector to overcome that obstacle, the gaming system ends the play of the game with respect to the displayed collector, as indicated by block 110.

Figure 2A:
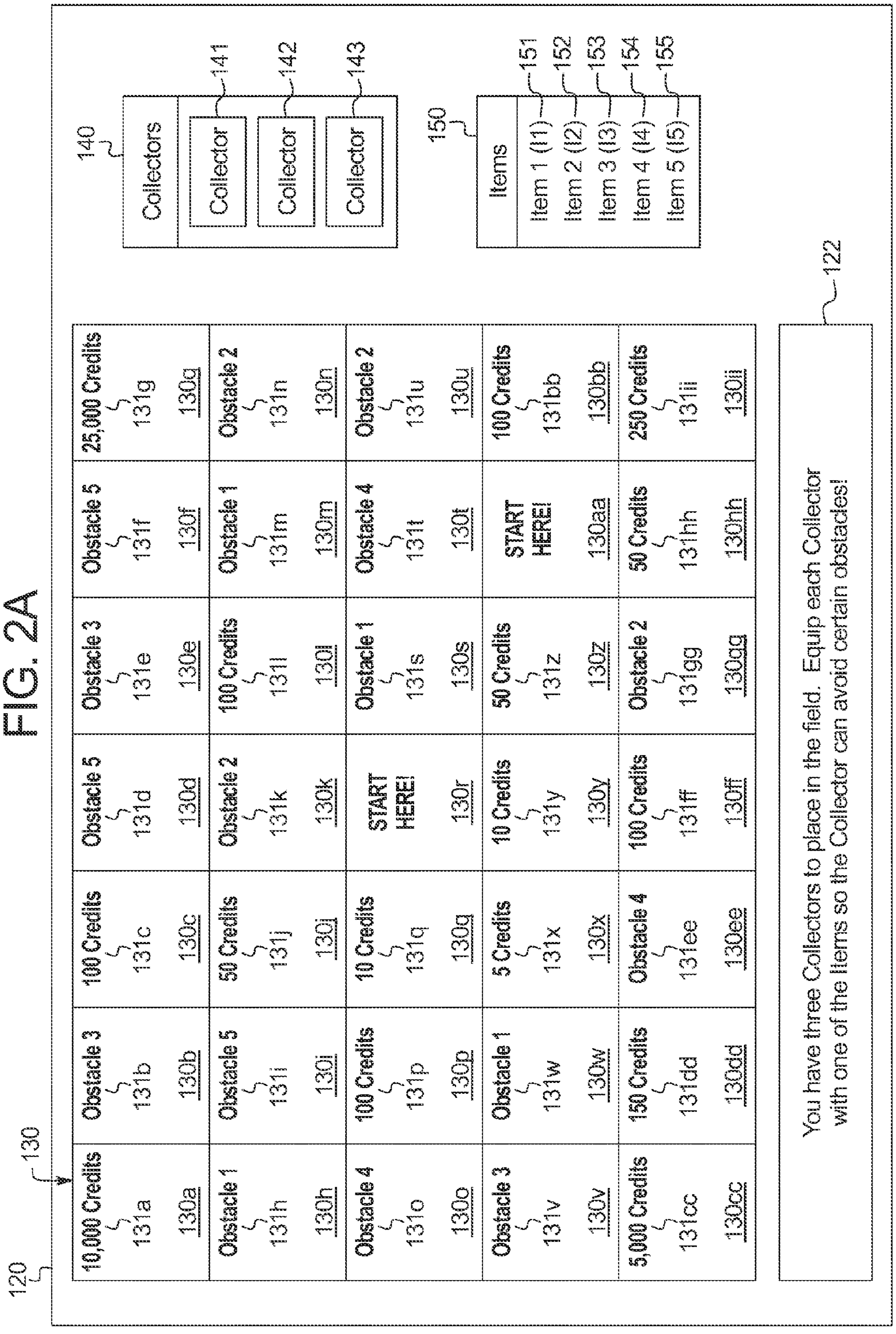
FIGS. 2A, 2B, 2C, 2D, 2E, 2F, 2G, 2H, 2I, 2J, 2K, 2L, 2M, 2N, 2O, 2P, and 2Q illustrate screen shots of an example gaming system of the present disclosure configured to operate one embodiment of the collection game.

FIGS. 2A, 2B, 2C, 2D, 2E, 2F, 2G, 2H, 2I, 2J, 2K, 2L, 2M, 2N, 2O, 2P, and 2Q illustrate screen shots of an example gaming system of the present disclosure configured to operate one embodiment of the collection game. As illustrated in FIG. 2A, upon initiation of a play of the collection game, the gaming machine displays (such as via a display device 120) a field 130 including a plurality of positions 130*a*, 130*b*, 130*c*, 130*d*, 130*e*, 130*f*, 130*g*, 130*h*, 130*i*, 130*j*, 130*k*, 130*l*, 130*m*, 130*n*, 130*o*, 130*p*, 130*q*, 130*r*, 130*s*, 130*t*, 130*u*, 130*v*, 130*w*, 130*x*, 130*y*, 130*z*, 130*aa*, 130*bb*, 130*cc*, 130*dd*, 130*ee*, 130*ff*, 130*gg*, 130*hh*, and 130*ii* arranged in a 5×7 matrix. It should be appreciated that the field may include any suitable quantity of positions arranged in any suitable manner.

As illustrated in FIG. 2A, in this example the gaming system designates positions 130*r* and 130*aa* as start positions at which the gaming system enables a collector to be positioned by a player, and also displays an indication that such positions are start positions. In this example, the gaming system determines a plurality of the following different obstacles to display at a plurality of the positions: Obstacle 1, Obstacle 2, Obstacle 3, Obstacle 4, and Obstacle 5. Additionally, in this example, the gaming system determines a plurality of the following awards to display at a plurality of the positions: a 5 credit award; a 10 credit award; a 25 credit award; a 50 credit award; a 75 credit award; a 100 credit award; a 150 credit award; a 200 credit award; a 250 credit award; a 500 credit award; a 1,000 credit award; a 5,000 credit award; a 10,000 credit award; and a 25,000 credit award. As shown in FIG. 2A, in this example the gaming system determines and displays: an award 131*a* of 10,000 credits at position 130*a*; Obstacle 3 131*b* at position 130*b*; an award 131*c* of 100 credits at position 130*c*; Obstacle 5 131*d* at position 130*d*; Obstacle 3 131*e* at position 130*e*; Obstacle 5 131*f* at position 130*f*; an award 131*g* of 25,000 credits at position 130*g*; Obstacle 1 131*h* at position 130*h*; Obstacle 5 131*i* at position 130*i*; an award 131*j* of 50 credits at position 130*j*; Obstacle 2 131*k* at position 130*k*; an award 131*l* of 100 credits at position 130*l*; Obstacle 1 131*m* at position 130*m*; Obstacle 2 131*n* at position 130*n*; Obstacle 4 131*o* at position 130*o*; an award 131*p* of 100 credits at position 130*p*; an award 131*q* of 10 credits at position 130*q*; Obstacle 1 131*s* at position 130*s*; Obstacle 4 131*t* at position 130*t*; Obstacle 2 131*u* at position 130*u*; Obstacle 3 131*v* at position 130*v*; Obstacle 1 131*w* at position 130*w*; an award 131*x* of 5 credits at position 130*x*; an award 131*y* of 10 credits at position 130*y*; an award 131*z* of 50 credits at position 130*z*; an award 131*bb* of 100 credits at position 130*bb*; an award 131*cc* of 5,000 credits at position 130*cc*; an award 131*dd* of 150 credits at position 130*dd*; Obstacle 4 131*ee* at position 130*ee*; an award 131*ff* of 100 credits at position 130*ff*; Obstacle 2 131*gg* at position 130*gg*; an award 131*hh* of 50 credits at position 130*hh*; and an award 131*ii* of 250 credits at position 130*ii*.

It should be appreciated that the gaming system may display an award at any suitable plurality of the positions, that the gaming system may display an obstacle at any suitable plurality of the positions, and that the gaming system may designate any suitable plurality of the positions as start positions. It should also be appreciated that the plurality of obstacles from which the gaming system determines the obstacles to position within the field may include any suitable quantity of obstacles, and that the plurality of awards from which the gaming system determines the awards to position within the field may include any suitable quantity of awards.

In this example, after displaying the obstacles and the awards within the field, the gaming system provides the player three collectors: Collectors 141, 142, and 143. The gaming system displays a representation of each of these collectors in collector display area 140. It should be appreciated that the gaming system may provide any suitable quantity of collectors to the player. The gaming system also displays an item display area 150 including a plurality of items that may be associated with the collectors: Item 1 (I1) 151, Item 2 (I2) 152, Item 3 (I3) 153, Item 4 (I4) 154, and Item 5 (I5) 155. In this example: (a) Item 1 151 is associated with Obstacle 1 such that when Item 151 is associated with a collector, Item 151 enables the collector to overcome Obstacle 1; (b) Item 2 152 is associated with Obstacle 2 such that when Item 152 is associated with a collector, Item 152 enables the collector to overcome Obstacle 2; (c) Item 3 153 is associated with Obstacle 3 such that when Item 153 is associated with a collector, Item 153 enables the collector to overcome Obstacle 3; (d) Item 4 154 is associated with Obstacle 4 such that when Item 154 is associated with a collector, Item 154 enables the collector to overcome Obstacle 4; and (e) Item 5 155 is associated with Obstacle 5 such that when Item 155 is associated with a collector, Item 155 enables the collector to overcome Obstacle 5. It should be appreciated that the gaming system may include any suitable quantity of items associated with the obstacles in any suitable manner. The gaming system displays the following message in message box 122: "You have three Collectors to place in the field. Equip each Collector with one of the Items so the Collector can overcome certain obstacles!"

Figure 2B:
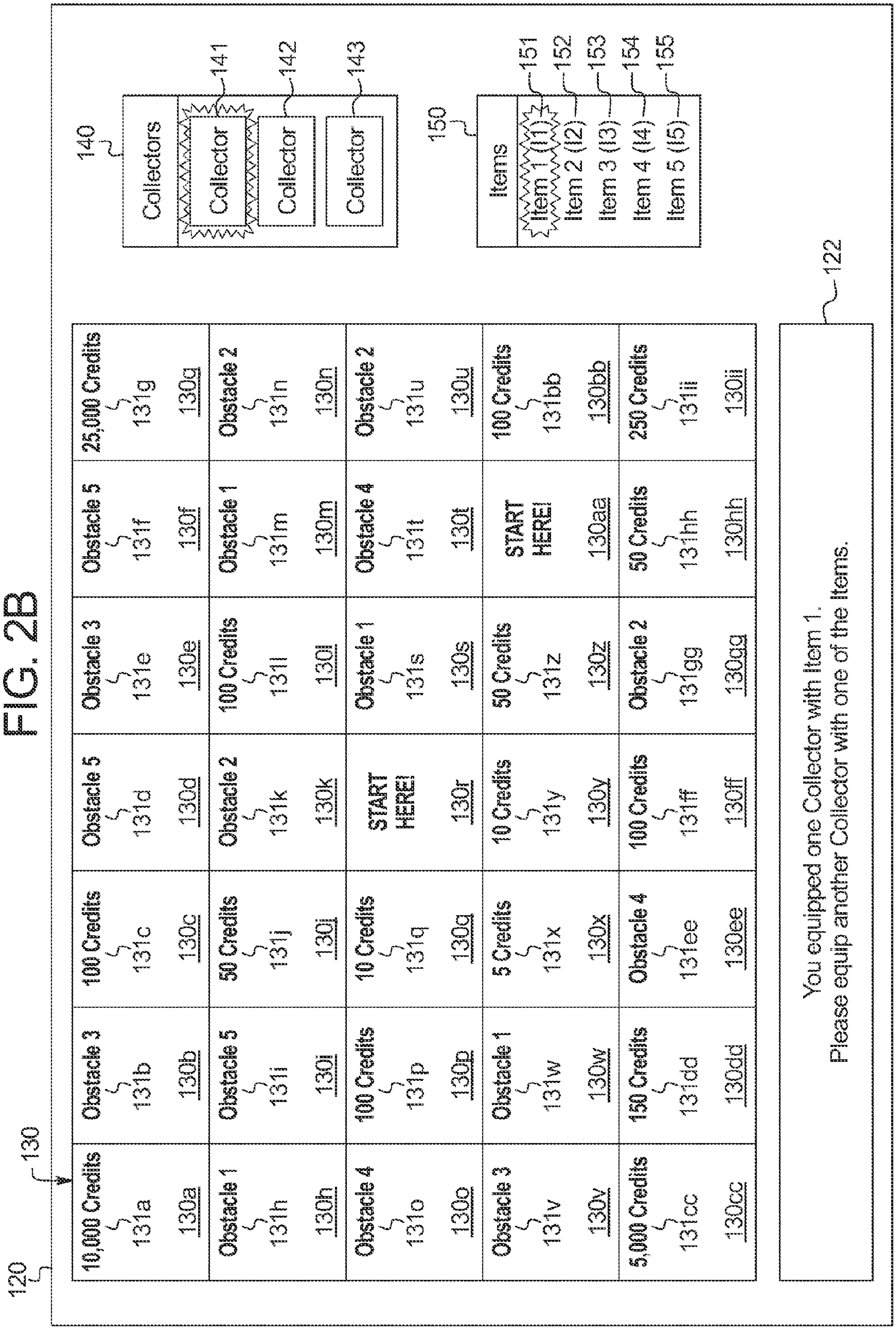

As illustrated in FIG. 2B, in this example the gaming system receives one or more inputs associating Collector 141 with Item 1 151. The gaming system displays the following message in message box 122: "You equipped one Collector with Protection Item 1. Please equip another Collector with one of the Items."

Figure 2C:
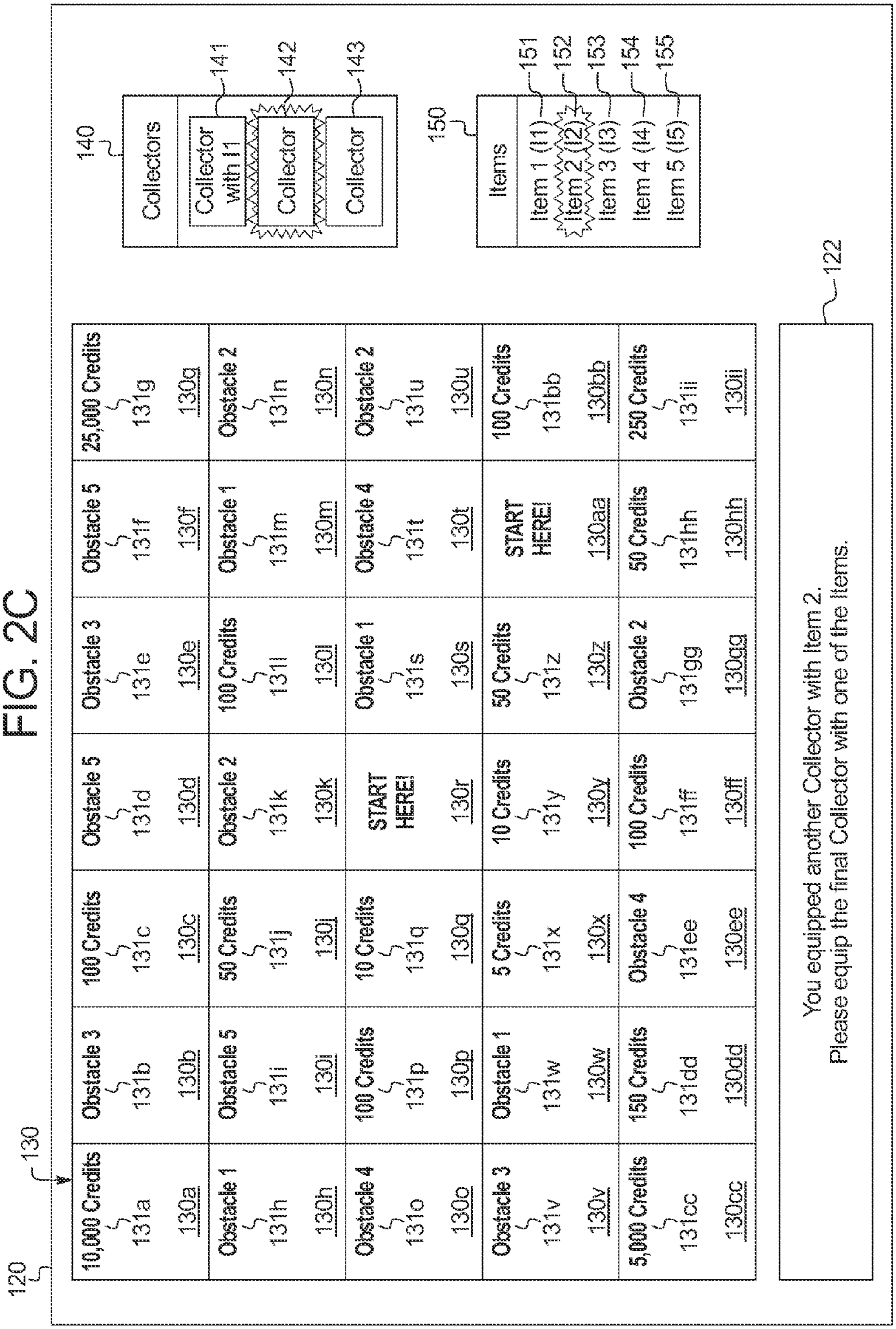

As illustrated in FIG. 2C, in this example the gaming system receives one or more inputs associating Collector 142 with Item 2 152. The gaming system displays the following message in message box 122: "You equipped another Collector with Protection Item 2. Please equip the final Collector with one of the Items."

Figure 2D:
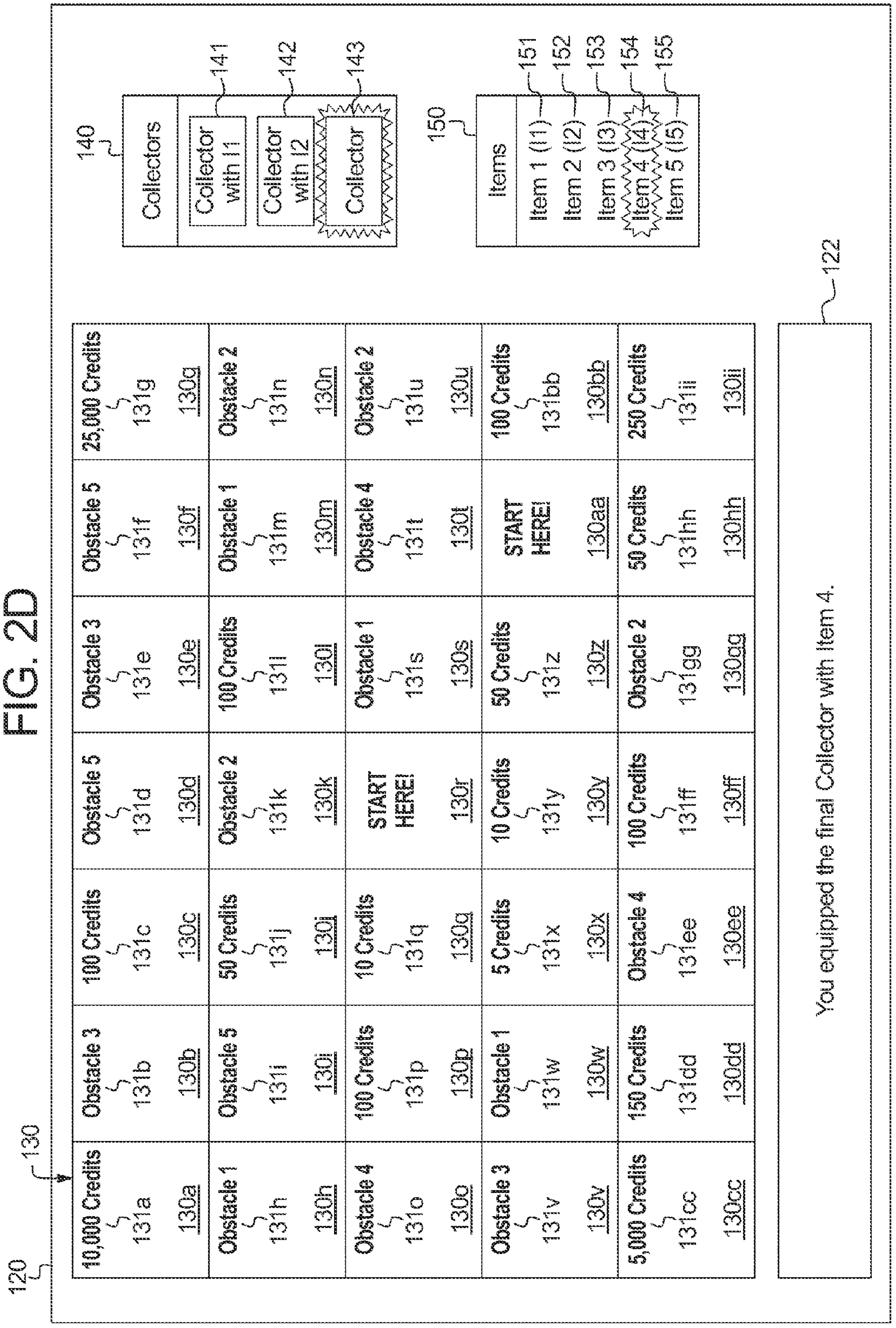

As illustrated in FIG. 2D, in this example the gaming system receives one or more inputs associating Collector 143 with Item 4 154. The gaming system displays the following message in message box 122: "You equipped the final Collector with Item 4."

Figure 2E:
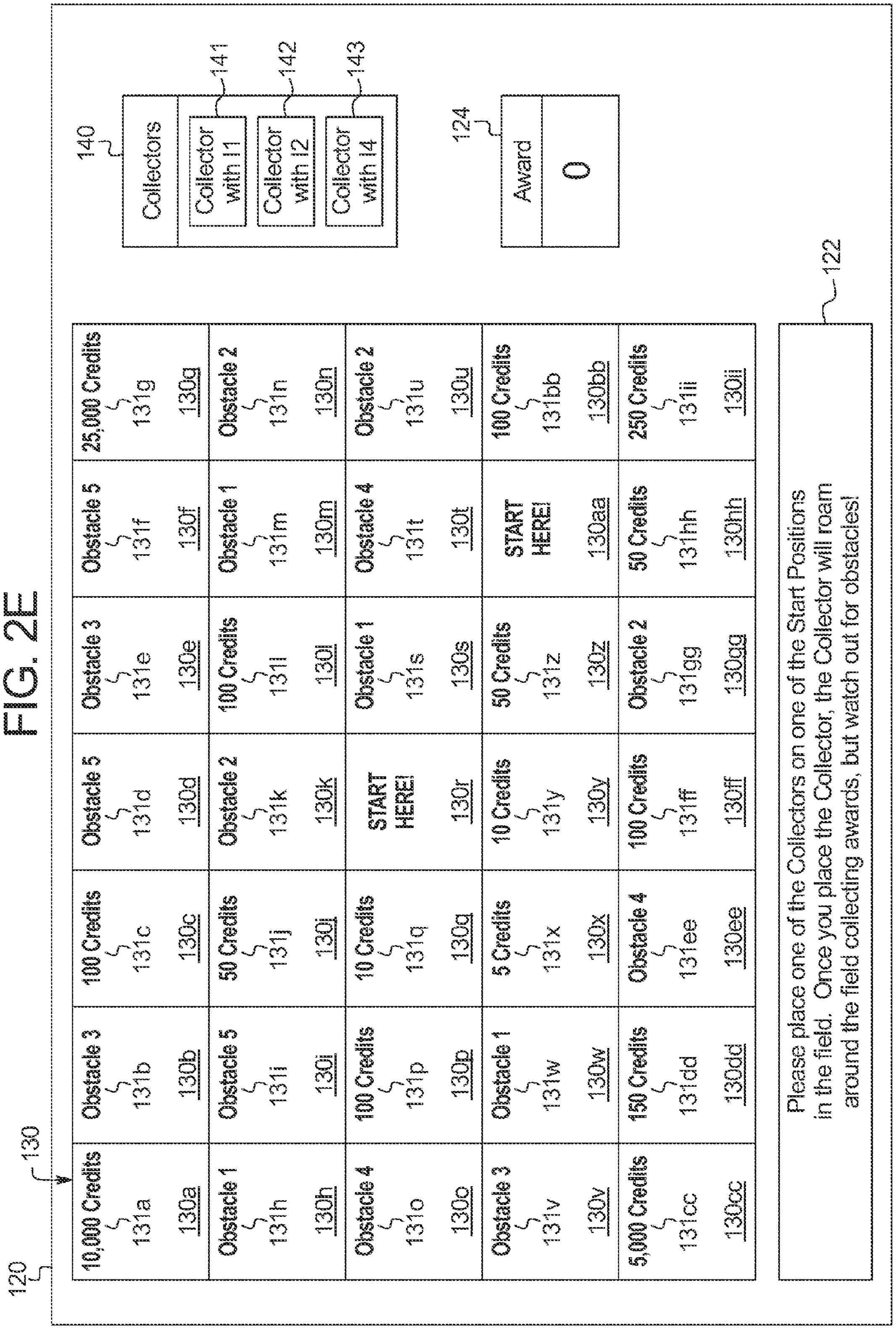

As illustrated in FIG. 2E, in this example once one of the items has been assigned to each of the collectors, the gaming system removes item display area 150 and displays award meter 124, which indicates any awards accumulated for the play of the collection game. Initially, since no awards have been accumulated, award meter 124 displays an award of 0 credits. In this example, the gaming system enables the player to position one of Collectors 141, 142, and 143 at one of start positions 130*r* and 130*aa*. The gaming system displays the following message in message box 122: "Please place one of the Collectors on one of the Start Positions in the field. Once you place the Collector, the Collector will roam around the field collecting awards, but watch out for obstacles!"

Figure 2F:
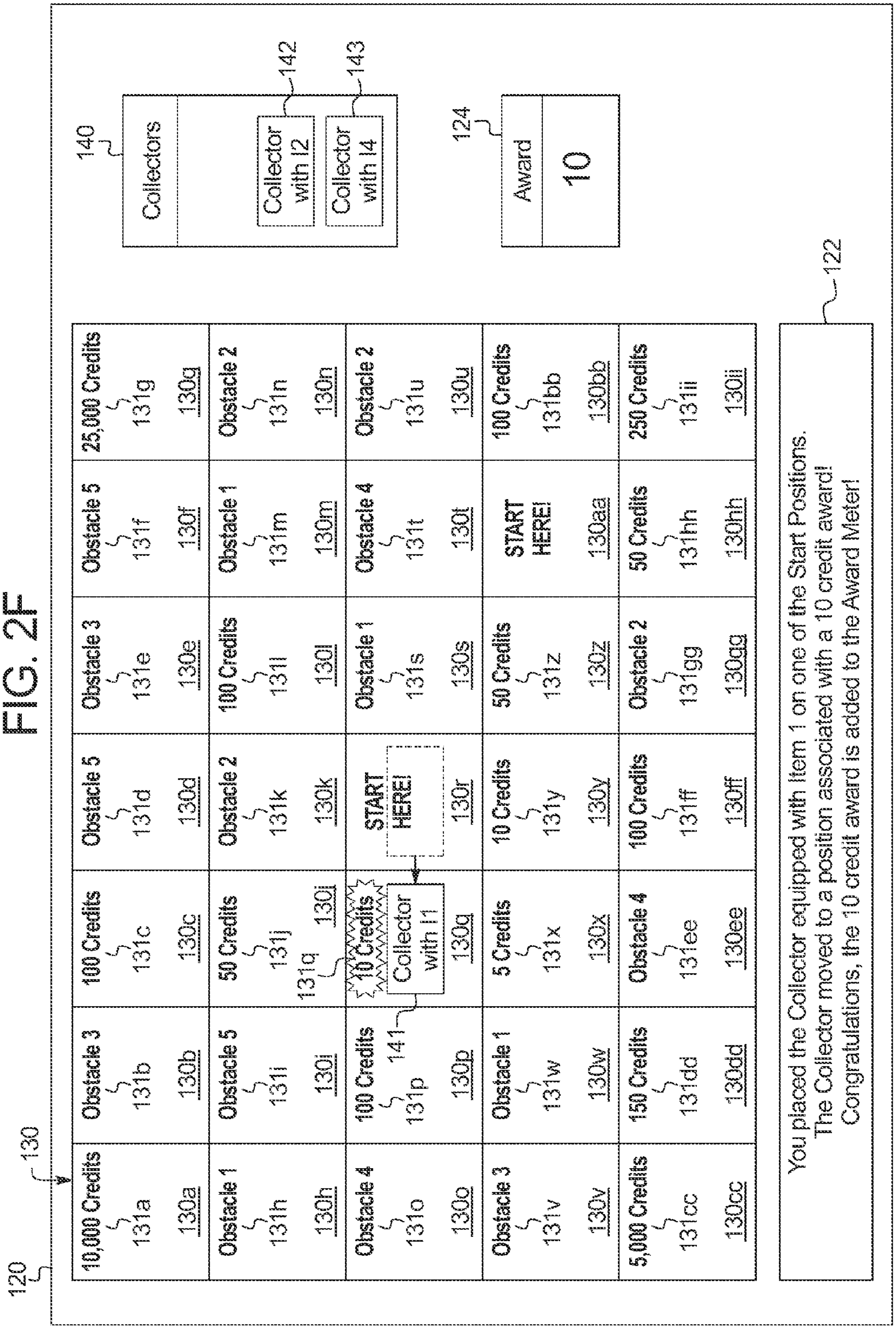

As illustrated in FIG. 2F, the player selected Collector 141 and positioned Collector 141 at start position 130*r*. The gaming system determined to move Collector 141 from start position 130*r* to position 130*q*, which is associated with award 131*q* of 10 credits. In this example, when a displayed collector intersects an award (i.e., moves into a position at which an award is displayed), the gaming system accumulates the award and determines whether all awards within the field have been accumulated. If all awards in the field have been accumulated, the gaming system ends the play of the collection game for all collectors, whether or not they have been positioned in the field, and provides any accumulated awards. Here, the gaming system accumulates award 131*q* by removing award 131*q* from position 130*q* and adding 10 credits to the previous accumulated award of 0 credits displayed by award meter 124, resulting in a total accumulated award of 10 credits. Additionally, the gaming system determines that not all of the awards within the field have been accumulated. Accordingly, the gaming system displays the following message in message box 122: "You placed the Collector equipped with Item 1 on one of the Start Positions. The Collector moved to a position associated with a 10 credit award! Congratulations, the 10 credit award is added to the Award Meter!"

Figure 2G:
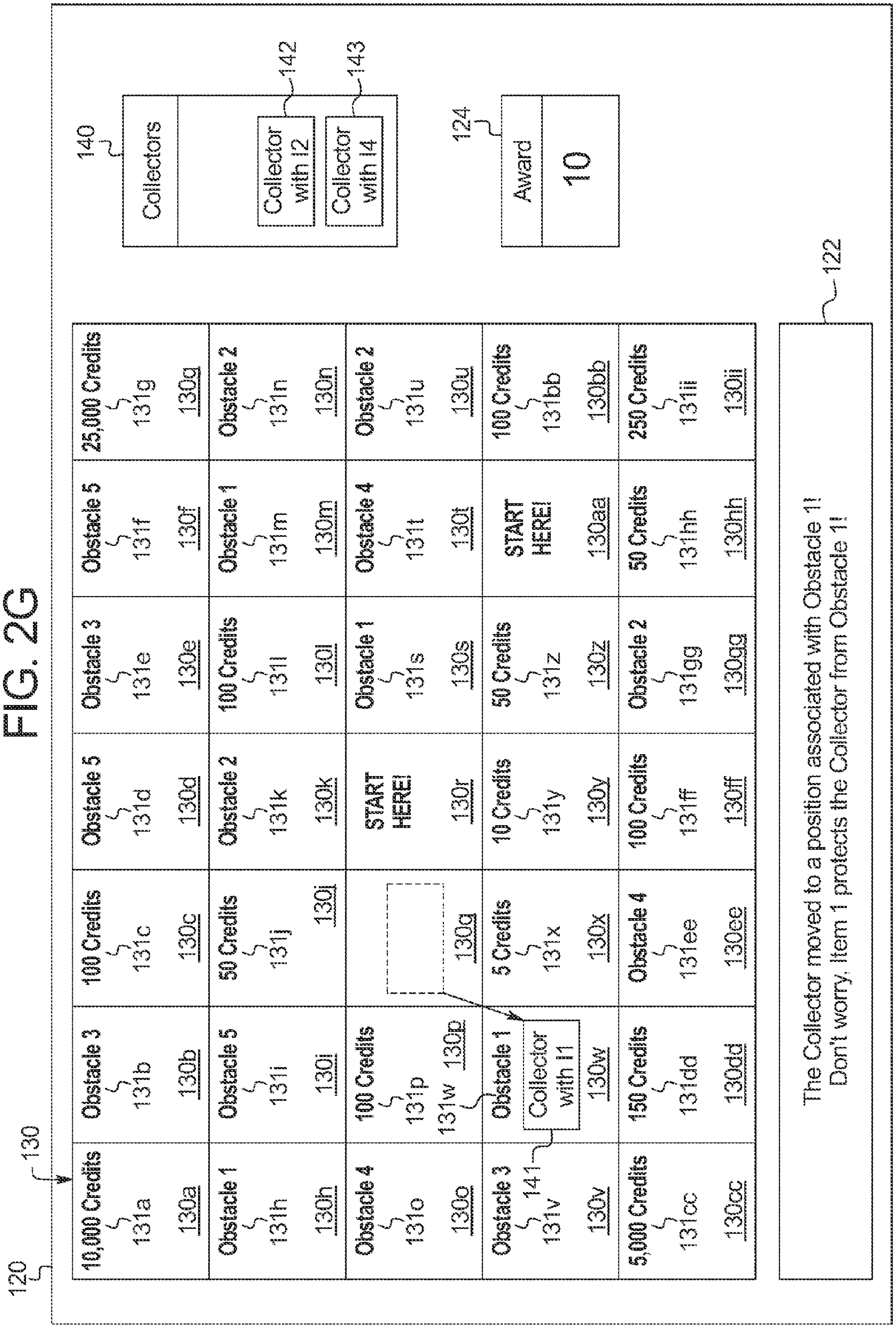

As illustrated in FIG. 2G, the gaming system determined to move Collector 141 from position 130*q* to position 130*w*, which is associated with Obstacle 1 131*w*. In this example, when a displayed collector intersects an obstacle (i.e., moves into a position at which an obstacle is displayed), the gaming system determines whether the displayed collector is associated with an item that enables the displayed collector to overcome that obstacle. If the gaming system determines that the displayed collector is associated with an item that enables the displayed collector to overcome that obstacle, the gaming system displays another move of the displayed collector. If not, the gaming system ends the play of the collection game with respect to the displayed collector. Specifically, in this example, the gaming system determines whether Collector 141 is associated with Item 1 151 such that Collector 141 is enabled to overcome Obstacle 1 131*w*. Here, the gaming system determines that Collector 141 is associated with Item 1 151 such that Collector 141 is enabled to overcome Obstacle 1 131*w*. Accordingly, the gaming system displays the following message in message box 122: "The Collector moved to a position associated with Obstacle 1! Don't worry, Item 1 protects the Collector from Obstacle 1!"

Figure 2H:
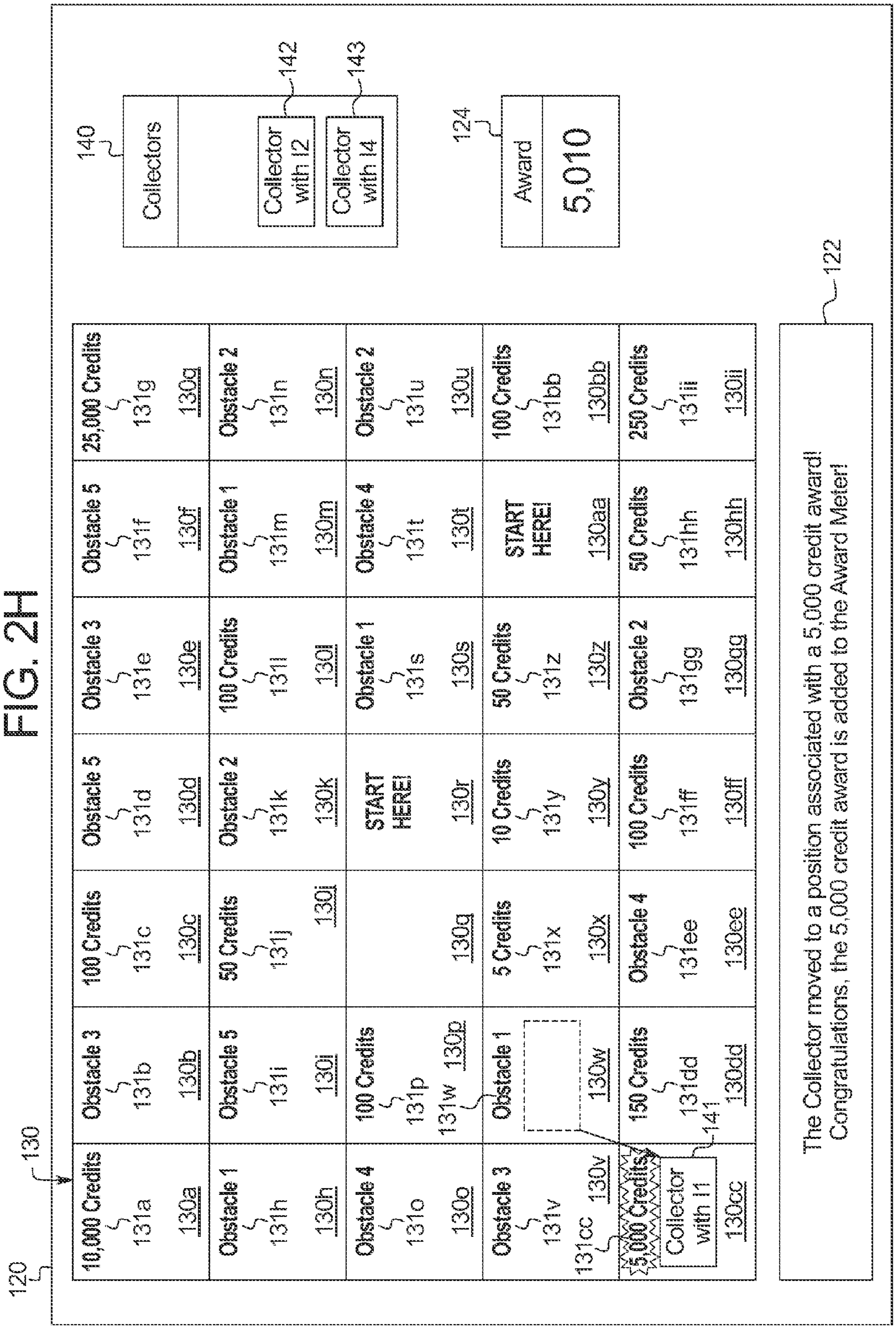

As illustrated in FIG. 2H, the gaming system determined to move Collector 141 from position 130*w* to position 130*cc*, which is associated with award 131*cc* of 5,000 credits. The gaming system accumulates award 131*cc* by removing award 131*cc* from position 130*cc* and adding 5,000 credits to the previous accumulated award of 10 credits displayed by award meter 124, resulting in a total accumulated award of 5,010 credits. Additionally, the gaming system determines that not all of the awards within the field have been accumulated. Accordingly, the gaming system displays the following message in message box 122: "The Collector moved to a position associated with a 5,000 credit award! Congratulations, the 5,000 credit award is added to the Award Meter!"

Figure 2I:
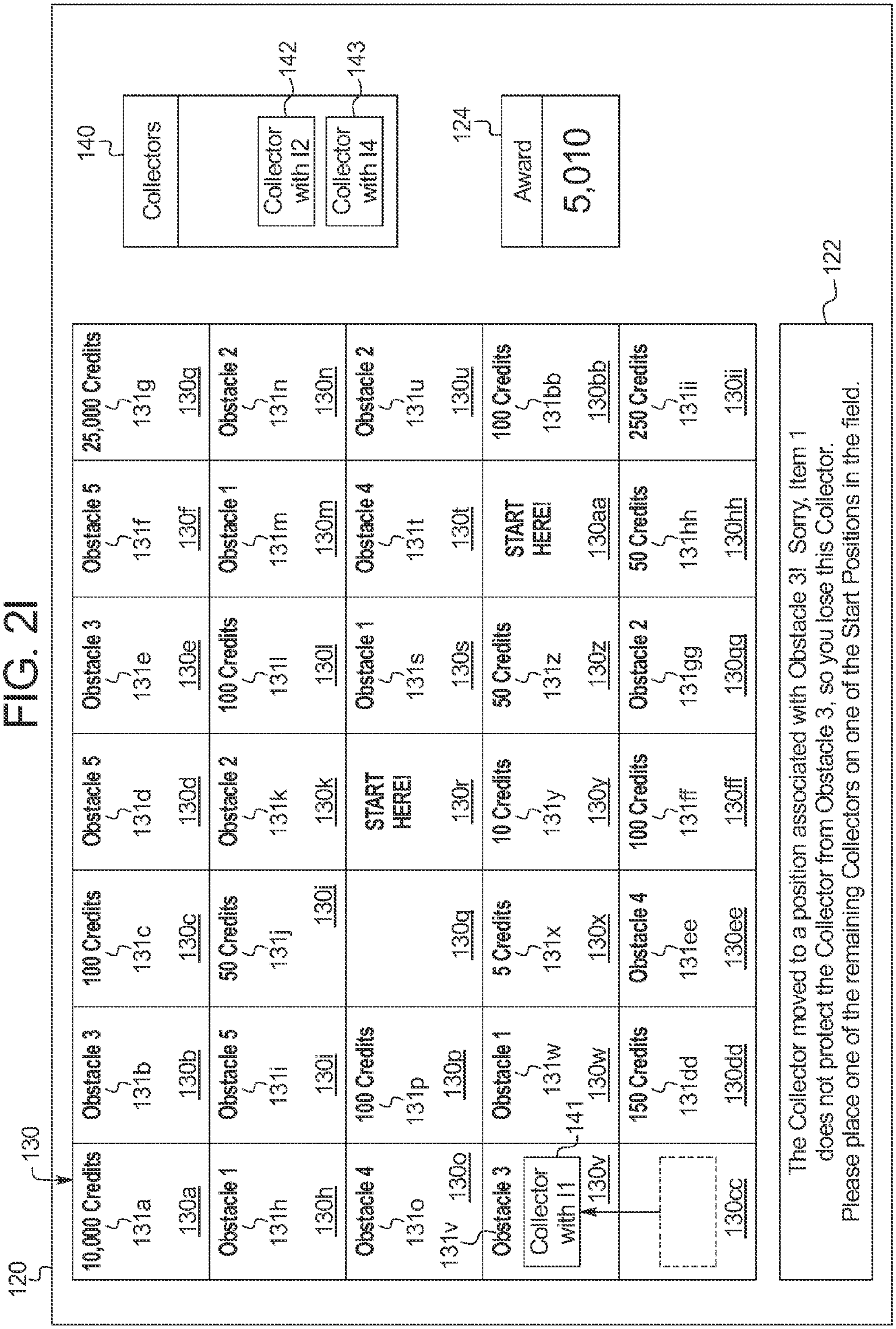

As illustrated in FIG. 2I, the gaming system determined to move Collector 141 from position 130*cc* to position 130*v*, which is associated with Obstacle 3 131*v*. The gaming system determines whether Collector 141 is associated with Item 3 153 such that Collector 141 is enabled to overcome Obstacle 3 131*v*. Here, the gaming system determines that Collector 141 is not associated with Item 3 153 such that Collector 141 is enabled to overcome Obstacle 3 131*v*. Thus, the gaming system ends the play of the collection game with respect to Collector 141, and enables the player to position one of Collectors 142 and 143 at one of start positions 130*r* and 130*aa*. The gaming system displays an "X" over the representation of Collector 141 displayed in collector display area 140, and displays the following message in message box 122: "The Collector moved to a position associated with Obstacle 3! Sorry, item 1 does not protect the Collector from Obstacle 3, so you lose this Collector. Please place one of the remaining Collectors on one of the Start Positions in the field."

Figure 2J:
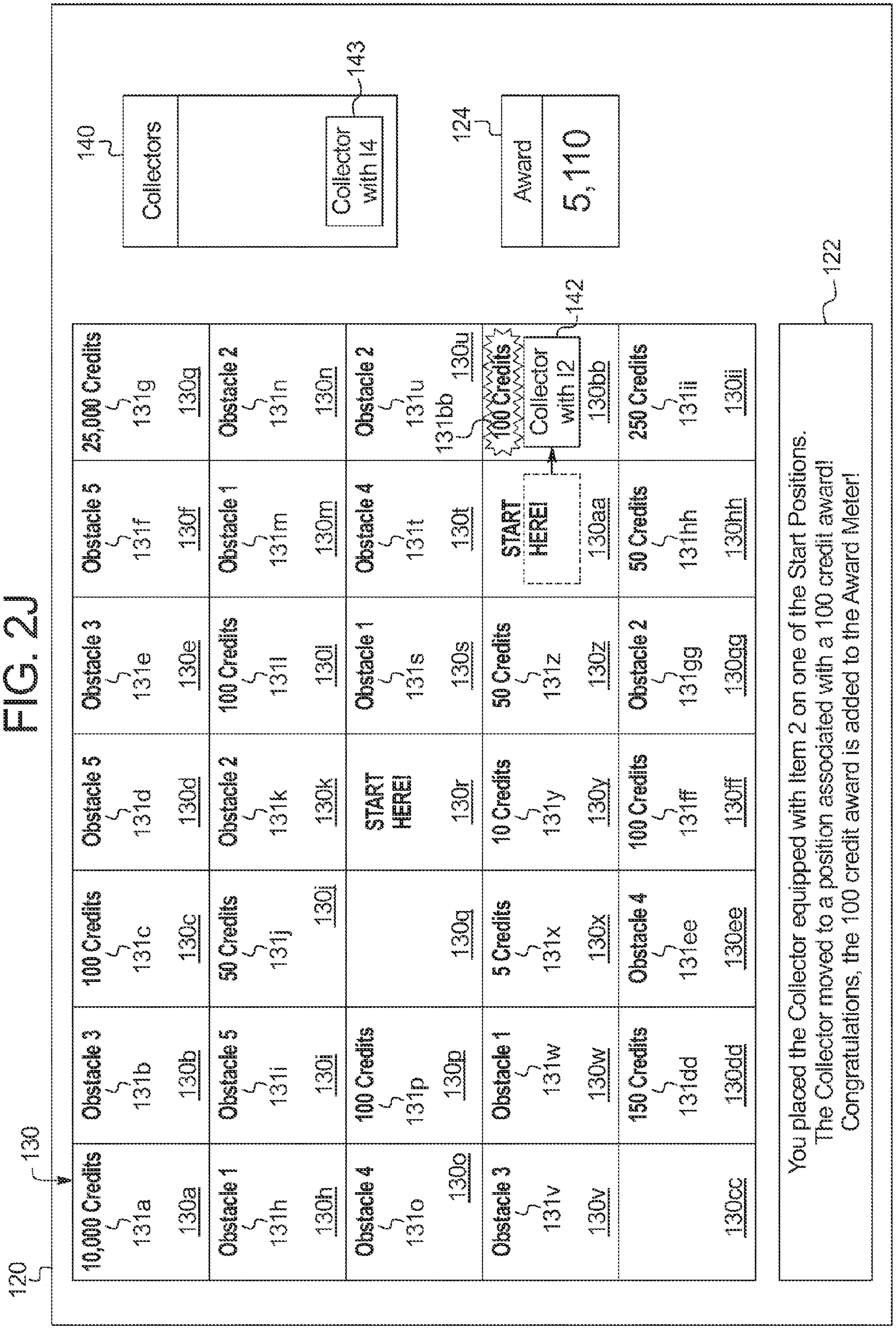

As illustrated in FIG. 2J, the player selected Collector 142 and positioned Collector 142 at start position 130*aa*. The gaming system determined to move Collector 142 from start position 130*aa* to position 130*bb*, which is associated with award 131*bb* of 100 credits. The gaming system accumulates award 131*bb* by removing award 131*bb* from position 130*bb* and adding 100 credits to the previous accumulated award of 5,010 credits displayed by award meter 124, resulting in a total accumulated award of 5,110 credits. Additionally, the gaming system determines that not all of the awards within the field have been accumulated. Accordingly, the gaming system displays the following message in message box 122: "You placed the Collector equipped with Protection Item 2 on one of the Start Positions. The Collector moved to a position associated with a 100 credit award! Congratulations, the 100 credit award is added to the Award Meter!"

Figure 2K:
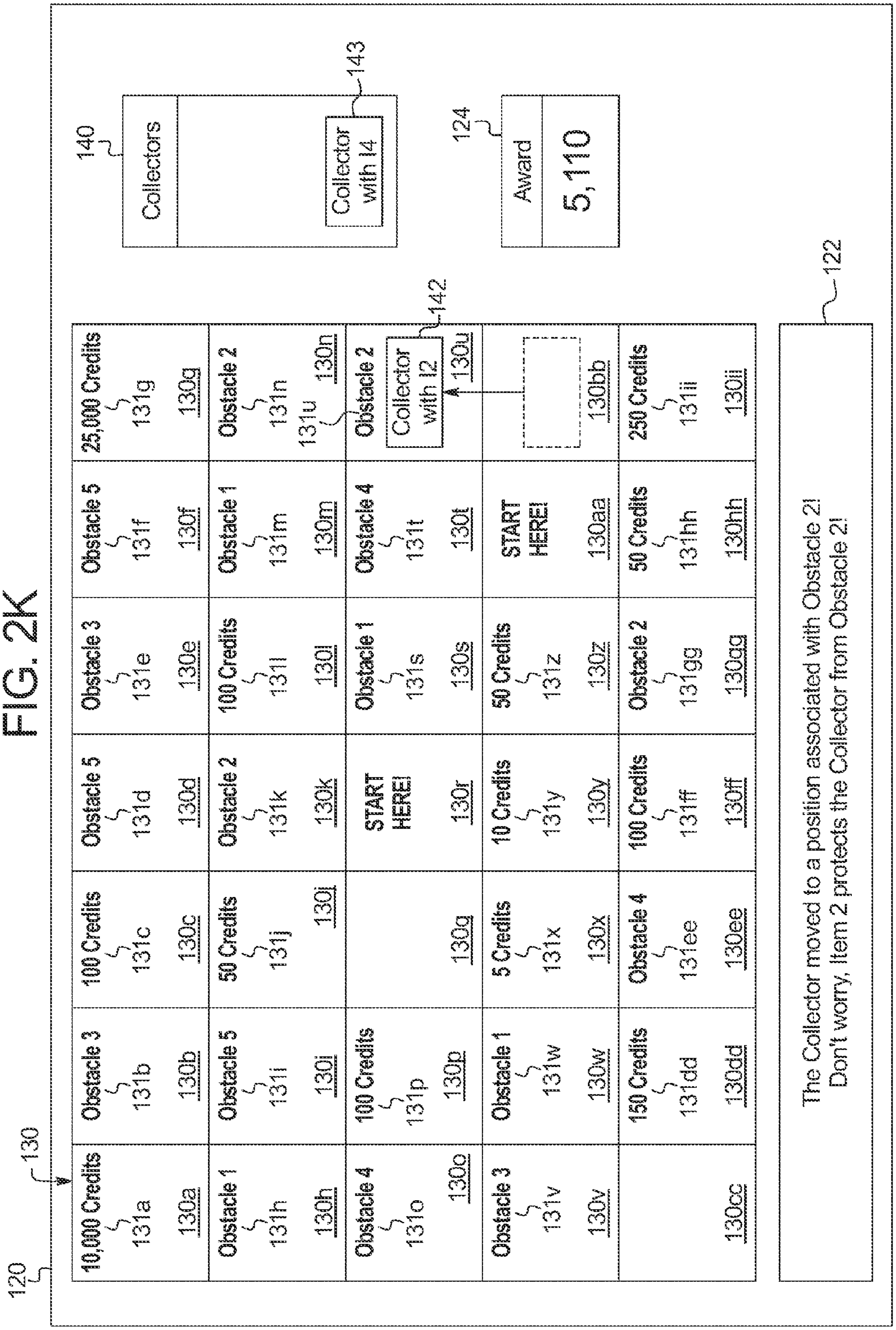

As illustrated in FIG. 2K, the gaming system determined to move Collector 142 from position 130*bb* to position 130*u*, which is associated with Obstacle 2 131*u*. The gaming system determines whether Collector 142 is associated with Item 2 152 such that Collector 142 is enabled to overcome Obstacle 2 131*u*. Here, the gaming system determines that Collector 142 is associated with Item 2 152 such that Collector 142 is enabled to overcome Obstacle 2 131*u*. Accordingly, the gaming system displays the following message in message box 122: "The Collector moved to a position associated with Obstacle 2! Don't worry, Item 2 protects the Collector from Obstacle 2!"

Figure 2L:
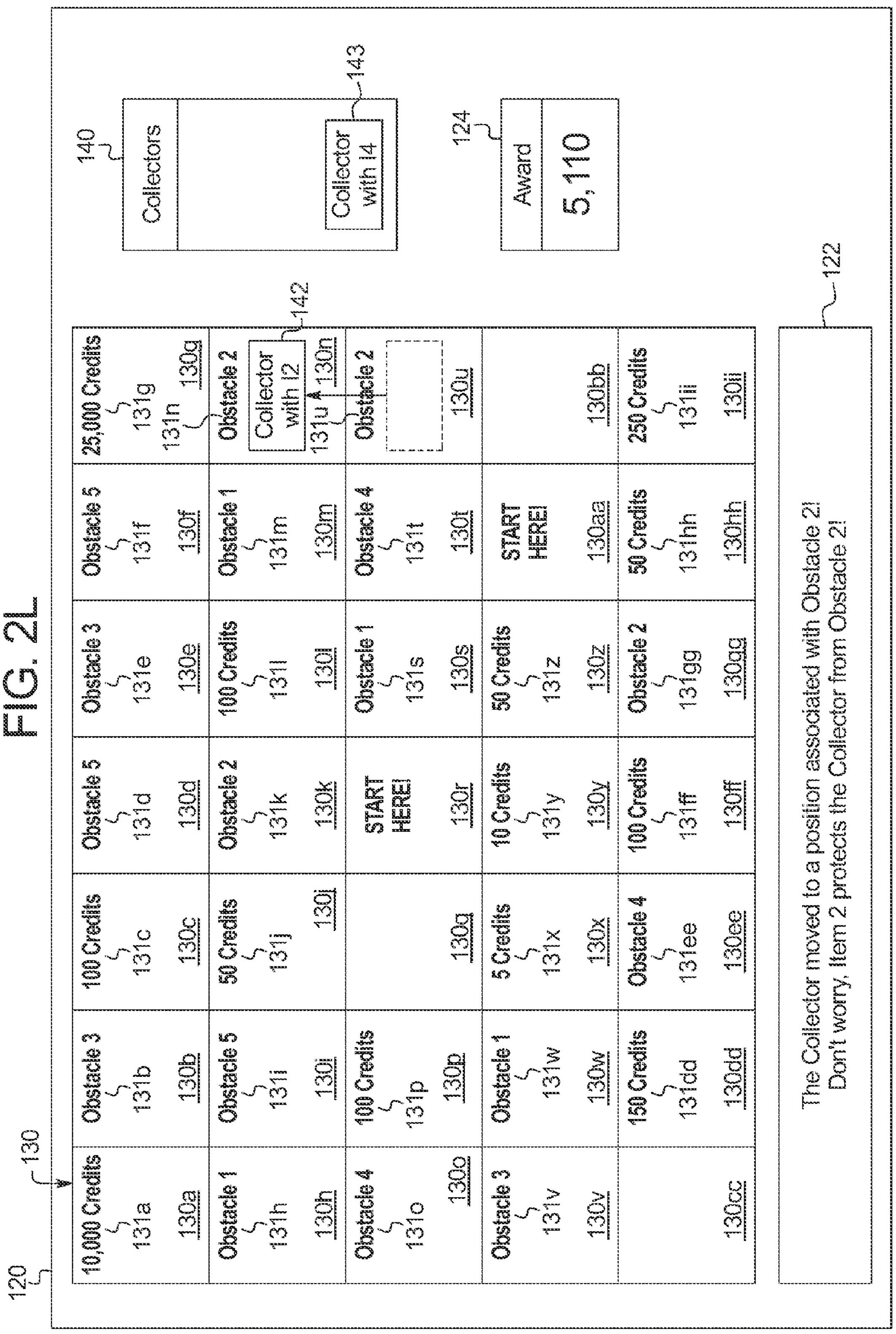

As illustrated in FIG. 2L, the gaming system determined to move Collector 142 from position 130*u* to position 130*n*, which is associated with Obstacle 2 131*n*. The gaming system determines whether Collector 142 is associated with item 2 152 such that Collector 142 is enabled to overcome Obstacle 2 131*n*. Here, the gaming system determines that Collector 142 is associated with Item 2 152 such that Collector 142 is enabled to overcome Obstacle 2 131*n*. Accordingly, the gaming system displays the following message in message box 122: "The Collector moved to a position associated with Obstacle 2! Don't worry, Item 2 protects the Collector from Obstacle 2!"

Figure 2M:
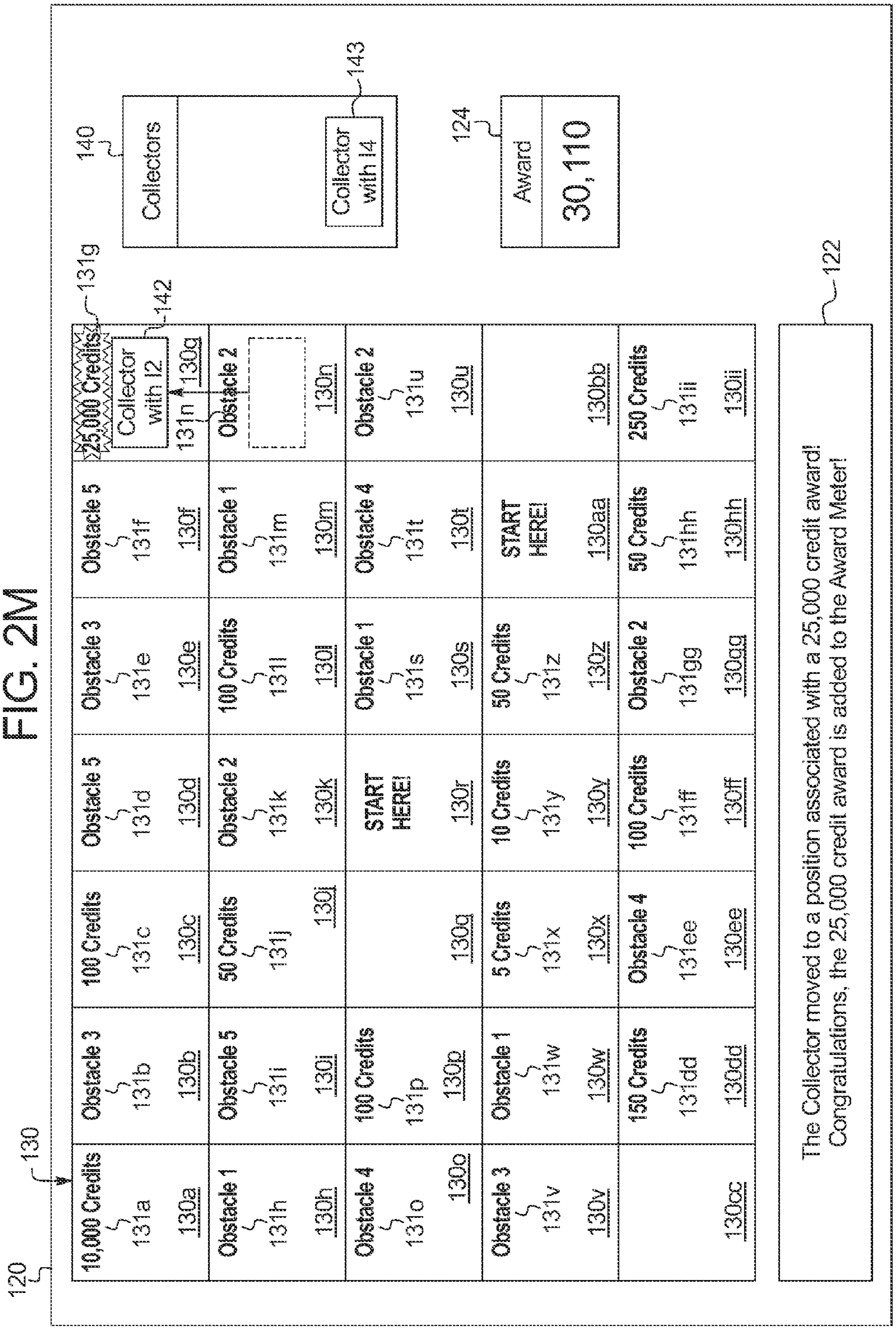

As illustrated in FIG. 2M, the gaming system determined to move Collector 142 from position 130*n* to position 130*g*, which is associated with award 131*g* of 25,000 credits. The gaming system accumulates award 131*g* by removing award 131*g* from position 130*g* and adding 25,000 credits to the previous accumulated award of 5,110 credits displayed by award meter 124, resulting in a total accumulated award of 30,110 credits. Additionally, the gaming system determines that not all of the awards within the field have been accumulated. Accordingly, the gaming system displays the following message in message box 122: "The Collector moved to a position associated with a 25,000 credit award! Congratulations, the 25,000 credit award is added to the Award Meter!"

Figure 2N:
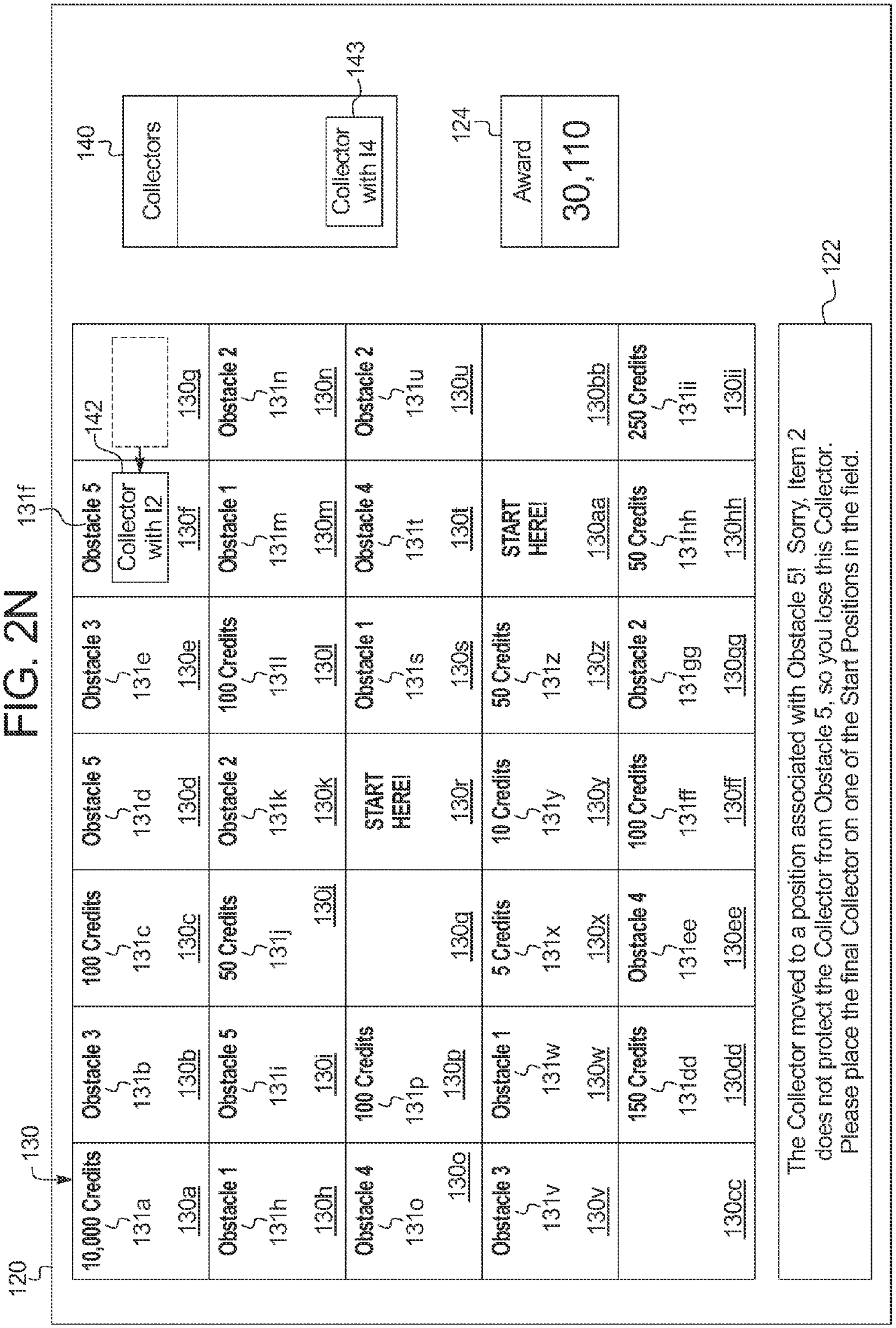

As illustrated in FIG. 2N, the gaming system determined to move Collector 142 from position 130*g* to position 130*f*, which is associated with Obstacle 5 131*f*. The gaming system determines whether Collector 142 is associated with Item 5 155 such that Collector 142 is enabled to overcome Obstacle 5 131*f*. Here, the gaming system determines that Collector 142 is not associated with Item 5 155 such that Collector 142 is enabled to overcome Obstacle 5 131*f*. Thus, the gaming system ends the play of the collection game with respect to Collector 142, and enables the player to position Collector 143 at one of start positions 130*r* and 130*aa*. The gaming system displays an "X" over the representation of Collector 142 displayed in collector display area 140, and displays the following message in message box 122: "The Collector moved to a position associated with Obstacle 5! Sorry, Item 2 does not protect the Collector from Obstacle 5, so you lose this Collector. Please place the final Collector on one of the Start Positions in the field."

Figure 2O:
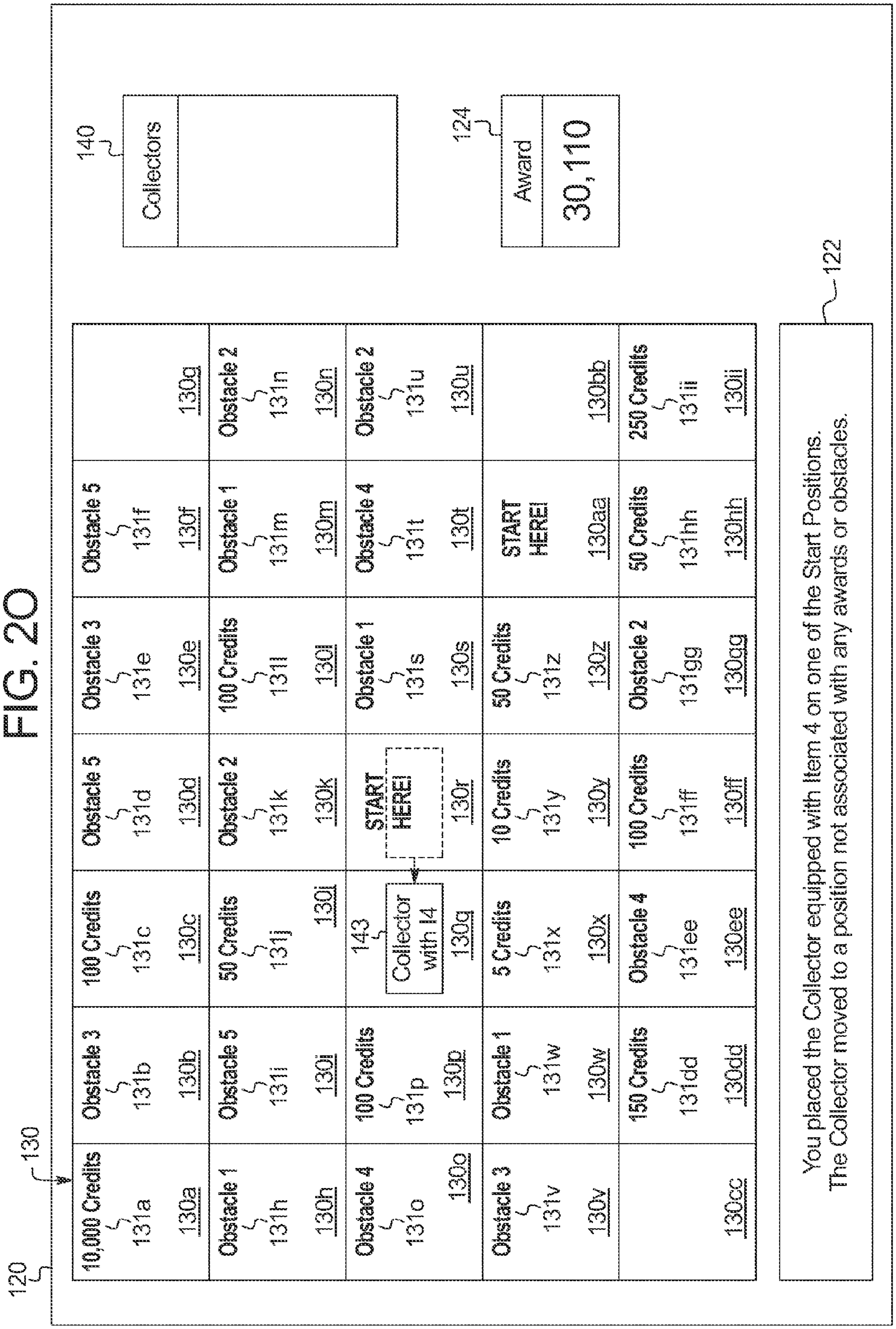

As illustrated in FIG. 2O, the player positioned Collector 143 at start position 130*r*. The gaming system determined to move Collector 143 from start position 130*r* to position 130*q*, which is not associated any awards or obstacles. Accordingly, the gaming system displays the following message in message box 122: "You placed the Collector equipped with Item 4 on one of the Start Positions. The Collector moved to a position not associated with any awards or obstacles."

Figure 2P:
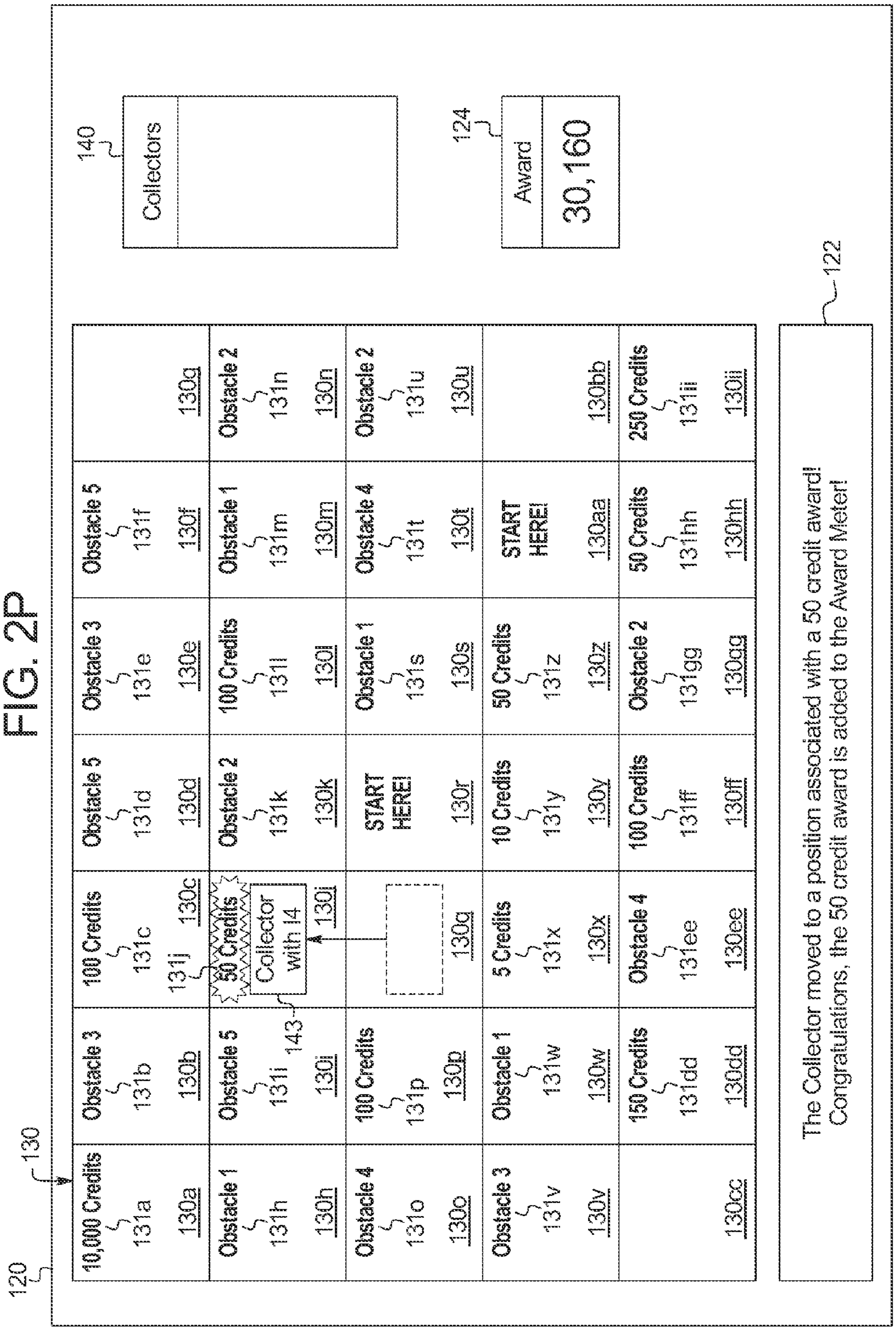

As illustrated in FIG. 2P, the gaming system determined to move Collector 143 from position 130*q* to position 130*j*, which is associated with award 131*j* of 50 credits. The gaming system accumulates award 131*j* by removing award 131*j* from position 130*j* and adding 50 credits to the previous accumulated award of 30,110 credits displayed by award meter 124, resulting in a total accumulated award of 30,160 credits. Additionally, the gaming system determines that not all of the awards within the field have been accumulated. Accordingly, the gaming system displays the following message in message box 122: "The Collector moved to a position associated with a 50 credit award! Congratulations, the 50 credit award is added to the Award Meter!"

Figure 2Q:
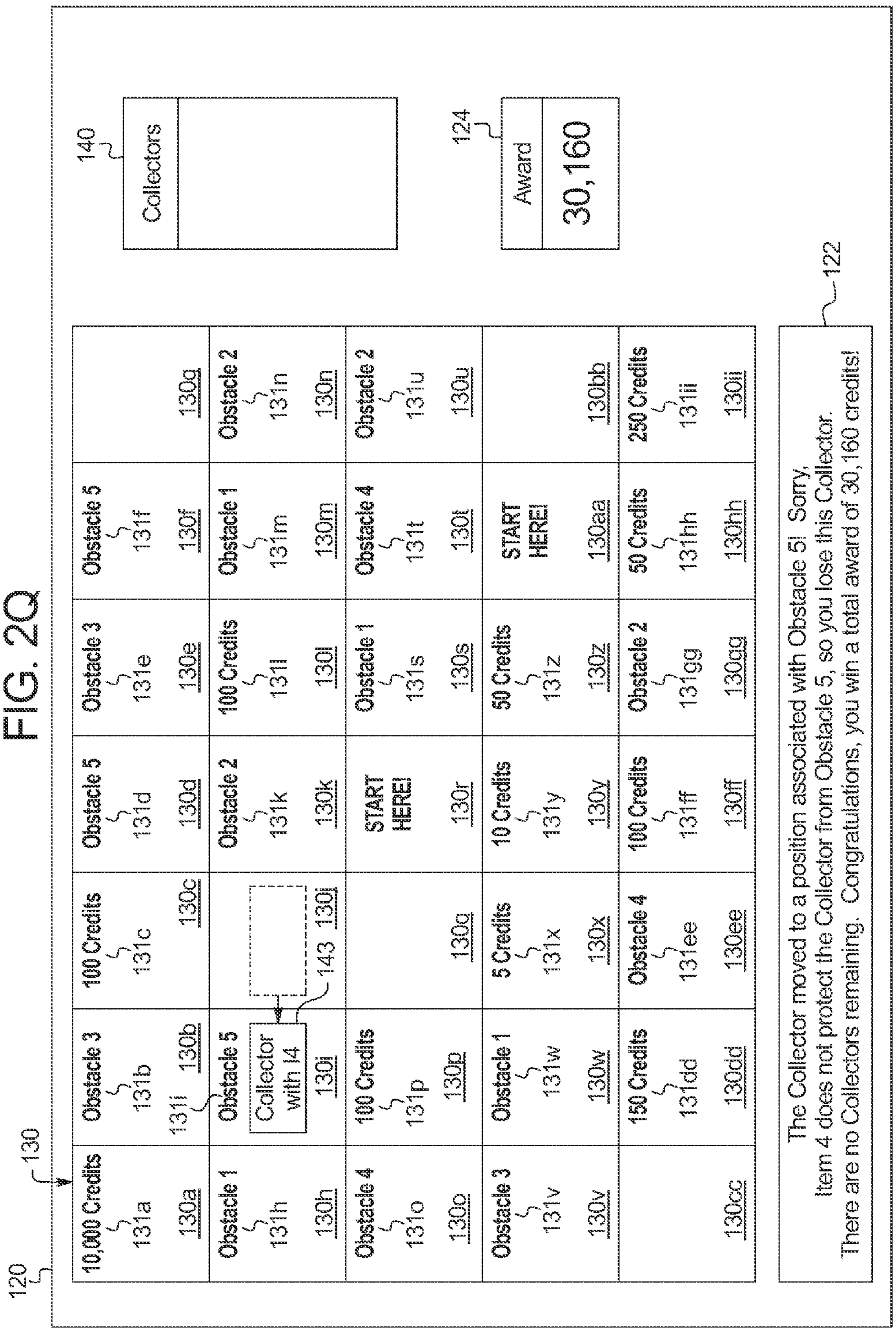

As illustrated in FIG. 2Q, the gaming system determined to move Collector 143 from position 130*j* to position 130*i*, which is associated with Obstacle 5 131*i*. The gaming system determines whether Collector 143 is associated with Item 5 155 such that Collector 143 is enabled to overcome Obstacle 5 131*i*. Here, the gaming system determines that Collector 143 is not associated with Item 5 155 such that Collector 143 is enabled to overcome Obstacle 5 131*i*. Thus, the gaming system ends the play of the collection game with respect to Collector 143, and displays an "X" over the representation of Collector 143 displayed in collector display area 140. Since the gaming system has ended the play of the collection game with respect to each of Collectors 141, 142, and 143, the gaming system provides the total accumulated award of 30,160 credits to the player and ends play of the collection game. Accordingly, the gaming system displays the following message in message box 122: "The Collector moved to a position associated with Obstacle 5! Sorry, Item 4 does not protect the Collector from Obstacle 5, so you lose this Collector. There are no Collectors remaining. Congratulations, you win a total award of 30,160 credits!"

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more electronic gaming machines (EGMs); and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred to herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Figure 3A:
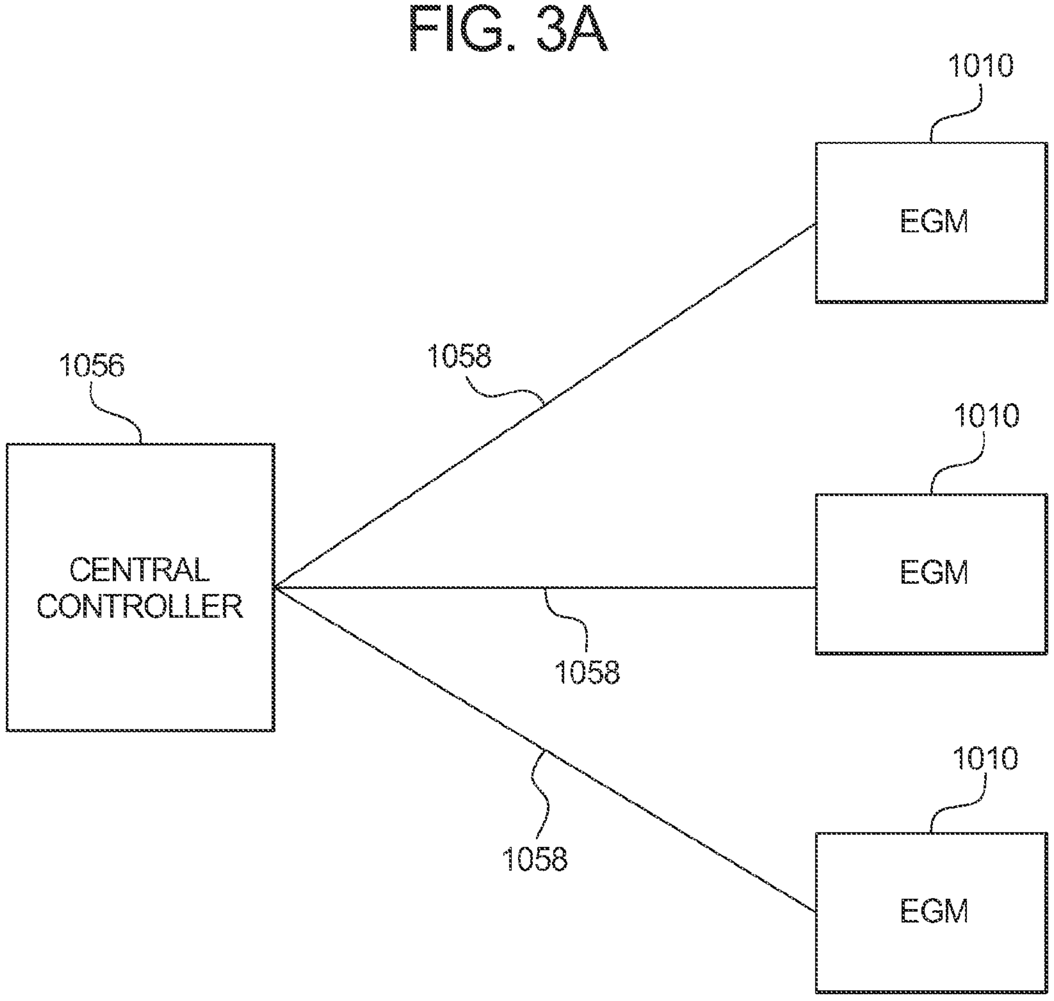
FIG. 3A is a schematic block diagram of an example of a network configuration of one embodiment of the gaming system of the present disclosure.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 3A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described below, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central server, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 3B:
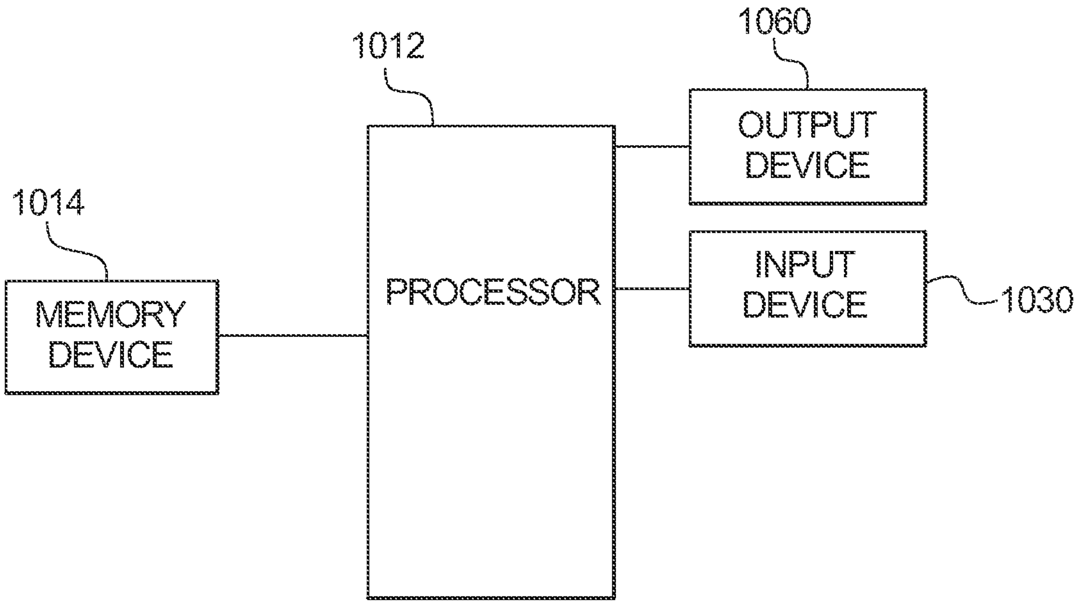
FIG. 3B is a schematic block diagram of an electronic configuration of one embodiment of the gaming system of the present disclosure.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 3B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 3B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 4A:
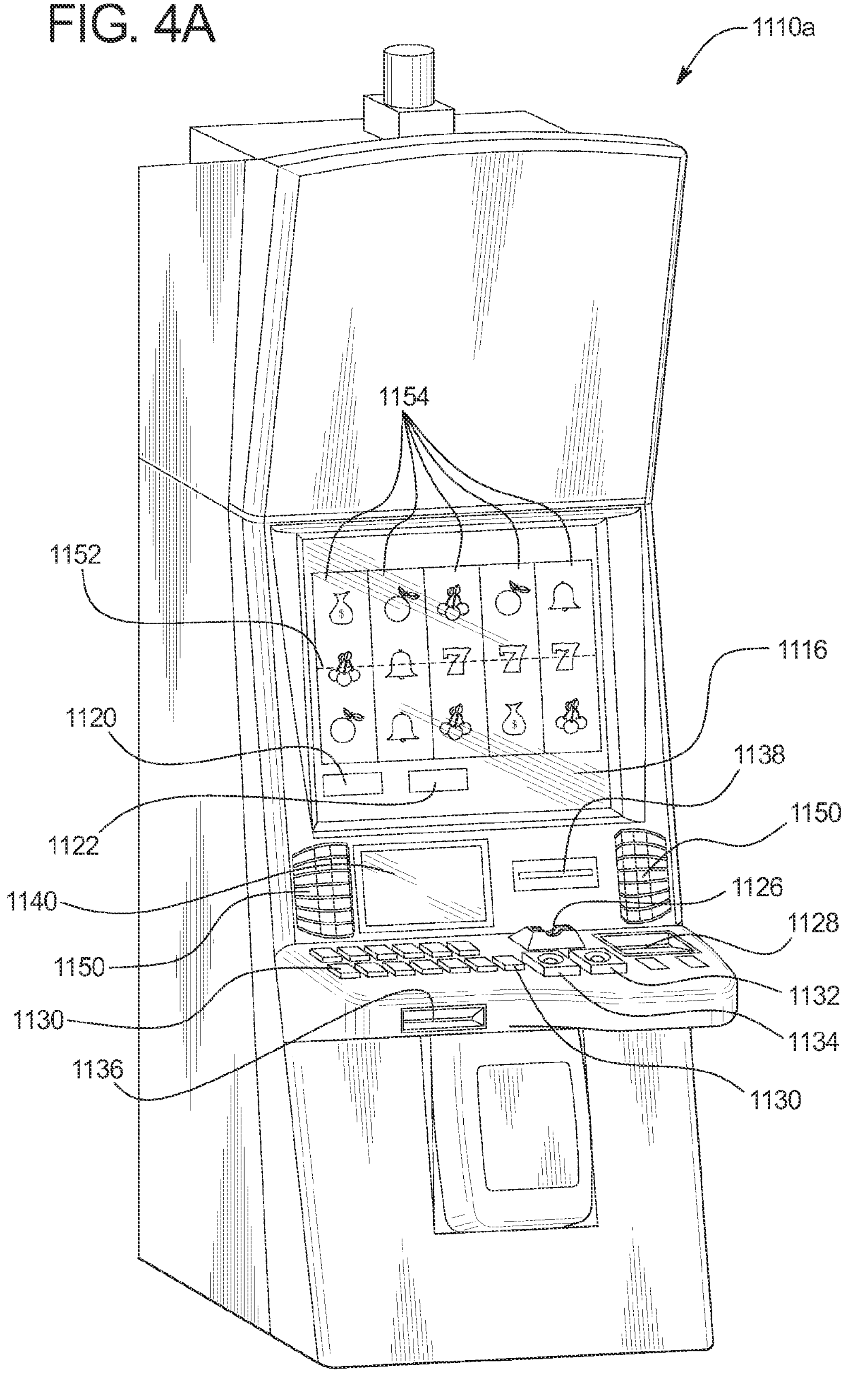
FIGS. 4A and 4B are perspective views of example alternative embodiments of the gaming system of the present disclosure.
Figure 4B:
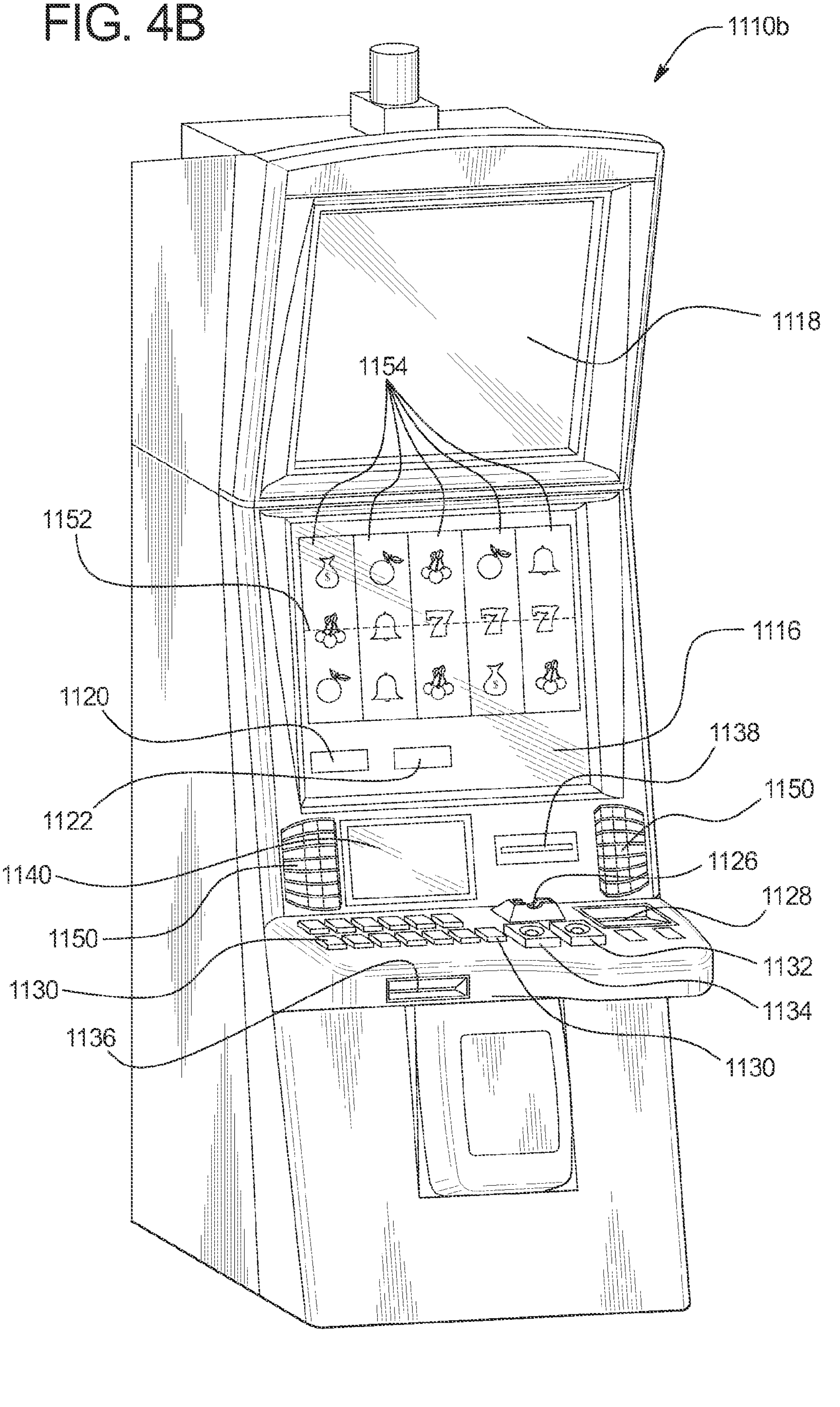

In various embodiments, the EGM includes one or more input devices. The input devices may include any suitable device that enables an input signal to be produced and received by the at least one processor of the EGM. The example EGM illustrated in FIG. 3B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 4A and 4B illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 4A and 4B each include a game play activation device in the form of a game play initiation button 32. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 4A and 4B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 4A and 4B each include a card reader 1138. The card reader is configured to read a player identification card inserted into the card reader.

In various embodiments, the EGM includes one or more output devices. The example EGM illustrated in FIG. 3B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 4A includes a central display device 1116, a player tracking display 1140, a credit display 1120, and a bet display 1122. The example EGM illustrated in FIG. 4B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 4A and 4B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 4A and 43 each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 4A and 4B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 4A and 4B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGMs shown in FIGS. 4A and 4B each include a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 200810070680, 200810176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

at least one processor;

at least one display device;

at least one input device; and at least one memory device storing a plurality of instructions which, when executed by the at least one processor, cause the at least one processor to operate with the at least one display device and the at least one input device to, for a play of a collection game:

(a) display a field including a plurality of different obstacles and a plurality of award symbols, each award symbol being associated with an award;

(b) provide a collector;

(c) receive a selection of one of a plurality of different items and associate the selected item with the collector, wherein each of the items, when associated with the collector, enables the collector to overcome at least one of the obstacles;

(d) receive an input associated with a position within the field and display the collector at said position;

(e) display at least one move of the displayed collector within the field; and (f) for each move:

(i) if the displayed collector intersects one of the award symbols, accumulate the award associated with said award symbol and remove said award symbol from the field; and (ii) if the displayed collector intersects one of the obstacles, and if the item associated with the displayed collector does not enable the displayed collector to overcome said obstacle, end said play of the collection game with respect to the displayed collector.

2. The gaming system of claim 1, wherein the plurality of instructions, when executed by the at least one processor, cause the at least one processor to operate with the at least one display device to display the obstacles and the award symbols before receiving the selection of the item.

3. The gaming system of claim 1, wherein the plurality of instructions, when executed by the at least one processor, cause the at least one processor to:

(A) provide a plurality of collectors;

(B) associate the selected item with each of the collectors; and (C) perform (d) to (f) for each of the collectors.

4. The gaming system of claim 1, wherein the plurality of instructions, when executed by the at least one processor, cause the at least one processor to, if the displayed collector intersects one of the award symbols, determine whether a designated quantity of the awards has been accumulated and, if the designated quantity of awards has been accumulated, end said play of the collection game with respect to the displayed collector.

5. The gaming system of claim 1, wherein the plurality of instructions, when executed by the at least one processor, cause the at least one processor to randomly determine each move of the displayed collector.

6. The gaming system of claim 1, wherein the plurality of instructions, when executed by the at least one processor, cause the at least one processor to operate with the at least one input device to, after said play of the collection game is complete with respect to the displayed collector:

(A) enable a player to initiate a secondary award determination;

(B) if the player initiates the secondary award determination, perform the secondary award determination to obtain a secondary award; and (C) if a value of the secondary award is greater than a value of any accumulated awards, provide the secondary award and do not provide the accumulated awards.

7. The gaming system of claim 1, wherein the plurality of instructions, when executed by the at least one processor, cause the at least one processor to operate with the at least one display device and the at least one input device to, before said play of the collection game:

(A) enable a player to initiate a secondary award determination;

(B) if the player initiates the secondary award determination, perform the secondary award determination to obtain a secondary award and display the secondary award;

(C) provide the secondary award to the player and not provide the play of the collection game if the player inputs that the player desires to keep the secondary award; and (D) not provide the secondary award to the player and provide the play of the collection game if the player inputs that the player does not desire to keep the secondary award.

8. The gaming system of claim 1, wherein each of the items is associated with a price of a quantity of collection game credits, and wherein the plurality of instructions, when executed by the at least one processor, cause the at least one processor to receive a quantity of collection game credits equal to the quantity of collection game credits associated with the selected item.

9. The gaming system of claim 1, wherein the plurality of instructions, when executed by the at least one processor, cause the at least one processor to cause at least one movement of at least one of the obstacles.

10. A method of operating a gaming system, said method comprising, for a play of a collection game:

(a) causing at least one processor to execute a plurality of instructions stored in at least one memory device to operate with at least one display device to display a field including a plurality of different obstacles and a plurality of award symbols, each award symbol being associated with an award;

(b) providing a collector;

(c) receiving a selection of one of a plurality of different items and associating the selected item with the collector, wherein each of the items, when associated with the collector, enables the collector to overcome at least one of the obstacles;

(d) receiving an input associated with a position within the field and causing the at least one processor to execute the plurality of instructions to operate with the at least one display device to display the collector at said position;

(e) causing the at least one processor to execute the plurality of instructions to operate with the at least one display device to display at least one move of the displayed collector within the field; and (f) for each move, causing the at least one processor to execute the plurality of instructions to operate with the at least one display device to:

(i) if the displayed collector intersects one of the award symbols, accumulate the award associated with said award symbol and remove said award symbol from the field; and (ii) if the displayed collector intersects one of the obstacles, and if the item associated with the displayed collector does not enable the displayed collector to overcome said obstacle, end said play of the collection game with respect to the displayed collector.

11. The method of claim 1, which includes causing the at least one processor to execute the plurality of instructions to operate with the at least one display device to display the obstacles and the award symbols before receiving the selection of the item.

12. The method of claim 10, which includes:

(A) providing a plurality of collectors;

(B) causing the at least one processor to execute the plurality of instructions to associate the selected item with each of the collectors; and (C) performing (d) to (f) for each of the collectors.

13. The method of claim 10, which includes causing the at least one processor to execute the plurality of instructions to, if the displayed collector intersects one of the award symbols, determine whether a designated quantity of the awards has been accumulated and, if the designated quantity of awards has been accumulated, end said play of the collection game with respect to the displayed collector.

14. The method of claim 10, which includes causing the at least one processor to execute the plurality of instructions to randomly determine each move of the displayed collector.

15. The method of claim 10, which includes, after said play of the collection game is complete with respect to the displayed collector:

(A) enabling a player to initiate a secondary award determination;

(B) if the player initiates the secondary award determination, causing the at least one processor to execute the plurality of instructions to perform the secondary award determination to obtain a secondary award; and (C) if a value of the secondary award is greater than a value of any accumulated awards, providing the secondary award and not providing the accumulated awards.

16. The method of claim 10, which includes, before said play of the collection game:

(A) enabling a player to initiate a secondary award determination;

(B) if the player initiates the secondary award determination, causing the at least one processor to execute the plurality of instructions to perform the secondary award determination to obtain a secondary award and display the secondary award;

(C) providing the secondary award to the player and not providing the play of the collection game if the player inputs that the player desires to keep the secondary award; and (D) not providing the secondary award to the player and providing the play of the collection game if the player inputs that the player does not desire to keep the secondary award.

17. The method of claim 10, wherein each of the items is associated with a price of a quantity of collection game credits, and which includes receiving a quantity of collection game credits equal to the quantity of collection game credits associated with the selected item.

18. The method of claim 10, which includes causing the at least one processor to execute the plurality of instructions to cause at least one movement of at least one of the obstacles.

19. The method of claim 10, which is provided through a data network.

20. The method of claim 19, wherein the data network is an internet.

21. A gaming system comprising:

at least one processor;

at least one display device;

at least one input device; and at least one memory device storing a plurality of instructions which, when executed by the at least one processor, cause the at least one processor to operate with the at least one display device and the at least one input device to, for a play of a collection game:

(a) display a field including a plurality of different obstacles and a plurality of award symbols, each award symbol being associated with an award;

(b) provide a plurality of collectors and display a plurality of items, wherein each of the items, when associated with one of the collectors, enables the collector to overcome at least one of the obstacles;

(c) for each of the collectors, receive a selection of one of the items and associate the selected item with said collector;

(d) receive an input associated with a position within the field and display one of the collectors at said position;

(e) display a move of said displayed collector within the field and for said move:

(i) if said displayed collector intersects one of the award symbols as a result of said move, accumulate the award associated with said award symbol and repeat (e); and (ii) if said displayed collector intersects one of the obstacles as a result of said move:

(A) if the item associated with said displayed collector does not enable said displayed collector to overcome said obstacle, end said play of the collection game with respect to said displayed collector; and (B) if the item associated with said displayed collector enables said displayed collector to overcome said obstacle, repeat (e);

(f) determine whether said play of the collection game has been ended with respect to at least one of the collectors;

(g) if said play of the collection game has not been ended with respect to at least one of the collectors, repeat (d) to (g) for one of the remaining collectors; and (h) if said play of the collection game has been ended with respect to each of the collectors, provide any accumulated awards.

22. The gaming system of claim 21, wherein the plurality of instructions, when executed by the at least one processor, cause the at least one processor to operate with the at least one display device to display the obstacles and the award symbols before receiving the selection of the item.

23. The gaming system of claim 21, wherein the plurality of instructions, when executed by the at least one processor, cause the at least one processor to, if the displayed collector intersects one of the award symbols, determine whether a designated quantity of the awards has been accumulated and, if the designated quantity of awards has been accumulated, end said play of the collection game with respect to each of the collectors.

24. The gaming system of claim 21, wherein the plurality of instructions, when executed by the at least one processor, cause the at least one processor to randomly determine each move of each of the collectors.

25. The gaming system of claim 21, wherein the plurality of instructions, when executed by the at least one processor, cause the at least one processor to operate with the at least one input device to, after said play of the collection game is complete with respect to each of the collectors:

(A) enable a player to initiate a secondary award determination;

(B) if the player initiates the secondary award determination, perform the secondary award determination to obtain a secondary award; and (C) if a value of the secondary award is greater than a value of any accumulated awards, provide the secondary award and do not provide the accumulated awards.

26. The gaming system of claim 21, wherein the plurality of instructions, when executed by the at least one processor, cause the at least one processor to operate with the at least one display device and the at least one input device to, before said play of the collection game:

(A) enable a player to initiate a secondary award determination;

(B) if the player initiates the secondary award determination, perform the secondary award determination to obtain a secondary award and display the secondary award;

(C) provide the secondary award to the player and not provide the play of the collection game if the player inputs that the player desires to keep the secondary award; and (D) not provide the secondary award to the player and provide the play of the collection game if the player inputs that the player does not desire to keep the secondary award.

27. The gaming system of claim 21, wherein each of the items is associated with a price of a quantity of collection game credits, and wherein the plurality of instructions, when executed by the at least one processor, cause the at least one processor to receive a quantity of collection game credits equal to the quantity of collection game credits associated with each selected item.

28. The gaming system of claim 21, wherein the plurality of instructions, when executed by the at least one processor, cause the at least one processor to remove any intersected award symbols from the field.

29. The gaming system of claim 21, wherein the plurality of instructions, when executed by the at least one processor, cause the at least one processor to cause at least one movement of at least one of the obstacles.

30. A method of operating a gaming system, said method comprising:

for a play of a collection game, causing at least one processor to execute a plurality of instructions stored in at least one memory device to operate with at least one display device and at least one input device to:

(a) display a field including a plurality of different obstacles and a plurality of award symbols, each award symbol being associated with an award;

(b) provide a plurality of collectors and display a plurality of items, wherein each of the items, when associated with one of the collectors, enables the collector to overcome at least one of the obstacles;

(c) for each of the collectors, receive a selection of one of the items and associate the selected item with said collector;

(d) receive an input associated with a position within the field and display one of the collectors at said position;

(e) display a move of said displayed collector within the field and for said move:

(i) if said displayed collector intersects one of the award symbols as a result of said move, accumulate the award associated with said award symbol and repeat (e); and (ii) if said displayed collector intersects one of the obstacles as a result of said move:

(A) if the item associated with said displayed collector does not enable said displayed collector to overcome said obstacle, end said play of the collection game with respect to said displayed collector; and (B) if the item associated with said displayed collector enables said displayed collector to overcome said obstacle, repeat (e);

(f) determine whether said play of the collection game has been ended with respect to at least one of the collectors;

(g) if said play of the collection game has not been ended with respect to at least one of the collectors, repeat (d) to (g) for one of the remaining collectors; and (h) if said play of the collection game has been ended with respect to each of the collectors, provide any accumulated awards.

31. The method of claim 30, which includes causing the at least one processor to execute the plurality of instructions to operate with the at least one display device to display the obstacles and the award symbols before receiving the selection of the item.

32. The method of claim 30, which includes causing the at least one processor to execute the plurality of instructions to, if the displayed collector intersects one of the award symbols, determine whether a designated quantity of the awards has been accumulated and, if the designated quantity of awards has been accumulated, end said play of the collection game with respect to each of the collectors.

33. The method of claim 30, which includes causing the at least one processor to execute the plurality of instructions to randomly determine each move of each of the collectors.

34. The method of claim 30, which includes causing the at least one processor to execute the plurality of instructions to operate with the at least one input device to, after said play of the collection game is complete with respect to each of the collectors:

(A) enable a player to initiate a secondary award determination;

(B) if the player initiates the secondary award determination, perform the secondary award determination to obtain a secondary award; and (C) if a value of the secondary award is greater than a value of any accumulated awards, provide the secondary award and do not provide the accumulated awards.

35. The method of claim 30, which includes causing the at least one processor to execute the plurality of instructions to operate with the at least one display device and the at least one input device to, before said play of the collection game:

(A) enable a player to initiate a secondary award determination;

(B) if the player initiates the secondary award determination, perform the secondary award determination to obtain a secondary award and display the secondary award;

(C) provide the secondary award to the player and not provide the play of the collection game if the player inputs that the player desires to keep the secondary award; and (D) not provide the secondary award to the player and provide the play of the collection game if the player inputs that the player does not desire to keep the secondary award.

36. The method of claim 30, wherein each of the items is associated with a price of a quantity of collection game credits, and which includes causing the at least one processor to execute the plurality of instructions to receive a quantity of collection game credits equal to the quantity of collection game credits associated with each selected item.

37. The method of claim 30, which includes causing the at least one processor to execute the plurality of instructions to remove any intersected award symbols from the field.

38. The method of claim 30, which includes causing the at least one processor to execute the plurality of instructions to cause at least one movement of at least one of the obstacles.

39. The method of claim 30, which is provided through a data network.

40. The method of claim 39, wherein the data network is an internet.

41. A gaming system comprising:

at least one processor;

at least one display device;

at least one input device; and at least one memory device storing a plurality of instructions which, when executed by the at least one processor, cause the at least one processor to operate with the at least one display device and the at least one input device to, for a play of a collection game:

(a) display a field including a plurality of different obstacles and a plurality of award symbols, each award symbol being associated with an award;

(b) provide a plurality of collectors;

(c) receive a selection of one of a plurality of different items and associate the selected item with each of the collectors, wherein each of the items, when associated with one of the collectors, enables said collector to overcome at least one of the obstacles; and (d) for each of the collectors:

(i) receive an input associated with a position within the field and display said collector at said position;

(ii) display at least one move of the displayed collector within the field; and (iii) for each move:

(A) if the displayed collector intersects one of the award symbols, accumulate the award associated with said award symbol; and (B) if the displayed collector intersects one of the obstacles, and if the item associated with the displayed collector does not enable the displayed collector to overcome said obstacle, end said play of the collection game with respect to the displayed collector.

42. A gaming system comprising:

at least one processor;

at least one display device;

at least one input device; and at least one memory device storing a plurality of instructions which, when executed by the at least one processor, cause the at least one processor to operate with the at least one display device and the at least one input device to, for a play of a collection game:

(a) display a field including a plurality of different obstacles and a plurality of award symbols, each award symbol being associated with an award;

(b) provide a collector;

(c) receive a selection of one of a plurality of different items and associate the selected item with the collector, wherein each of the items, when associated with the collector, enables the collector to overcome at least one of the obstacles;

(d) receive an input associated with a position within the field and display the collector at said position;

(e) display at least one move of the displayed collector within the field; and (f) for each move:

(i) if the displayed collector intersects one of the award symbols:

(A) accumulate the award associated with said award symbol; and (B) if a designated quantity of the awards has been accumulated, end said play of the collection game with respect to the displayed collector; and (ii) if the displayed collector intersects one of the obstacles, and if the item associated with the displayed collector does not enable the displayed collector to overcome said obstacle, end said play of the collection game with respect to the displayed collector.

43. A gaming system comprising:

at least one processor;

at least one display device;

at least one input device; and at least one memory device storing a plurality of instructions which, when executed by the at least one processor, cause the at least one processor to operate with the at least one display device and the at least one input device to, for a play of a collection game:

(a) display a field including a plurality of different obstacles and a plurality of award symbols, each award symbol being associated with an award;

(b) provide a collector;

(c) receive a selection of one of a plurality of different items and associate the selected item with the collector, wherein each of the items, when associated with the collector, enables the collector to overcome at least one of the obstacles;

(d) receive an input associated with a position within the field and display the collector at said position;

(e) display at least one move of the displayed collector within the field;

(f) for each move:

(i) if the displayed collector intersects one of the award symbols, accumulate the award associated with said award symbol; and (ii) if the displayed collector intersects one of the obstacles, and if the item associated with the displayed collector does not enable the displayed collector to overcome said obstacle, end said play of the collection game with respect to the displayed collector; and (g) after said play of the collection game is complete with respect to the displayed collector:

(i) enable a player to initiate a secondary award determination;

(ii) if the player initiates the secondary award determination, perform the secondary award determination to obtain a secondary award; and (iii) if a value of the secondary award is greater than a value of any accumulated awards, provide the secondary award and do not provide the accumulated awards.

44. A gaming system comprising:

at least one processor;

at least one display device;

at least one input device; and at least one memory device storing a plurality of instructions which, when executed by the at least one processor, cause the at least one processor to operate with the at least one display device and the at least one input device to:

(a) enable a player to initiate a secondary award determination;

(b) if the player initiates the secondary award determination, perform the secondary award determination to obtain a secondary award and display the secondary award;

(c) provide the secondary award to the player and not provide a play of a collection game if an input that the player desires to keep the secondary award is received; and (d) if an input that the player does not desire to keep the secondary award is received:

(i) not provide the secondary award to the player;

(ii) provide the play of the collection game; and (iii) for said play of the collection game:

(A) display a field including a plurality of different obstacles and a plurality of award symbols, each award symbol being associated with an award;

(B) provide a collector;

(C) receive a selection of one of a plurality of different items and associate the selected item with the collector, wherein each of the items, when associated with the collector, enables the collector to overcome at least one of the obstacles;

(D) receive an input associated with a position within the field and display the collector at said position;

(E) display at least one move of the displayed collector within the field; and (F) for each move:

(1) if the displayed collector intersects one of the award symbols, accumulate the award associated with said award symbol; and (2) if the displayed collector intersects one of the obstacles, and if the item associated with the displayed collector does not enable the displayed collector to overcome said obstacle, end said play of the collection game with respect to the displayed collector.

45. A method of operating a gaming system, said method comprising, for a play of a collection game:

(a) causing at least one processor to execute a plurality of instructions stored in at least one memory device to operate with at least one display device to display a field including a plurality of different obstacles and a plurality of award symbols, each award symbol being associated with an award;

(b) providing a plurality of collectors;

(c) receiving a selection of one of a plurality of different items and associating the selected item with each of the collectors, wherein each of the items, when associated with one of the collectors, enables said collector to overcome at least one of the obstacles; and (d) for each of the collectors:

(i) receiving an input associated with a position within the field and causing the at least one processor to execute the plurality of instructions to operate with the at least one display device to display said collector at said position;

(ii) causing the at least one processor to execute the plurality of instructions to operate with the at least one display device to display at least one move of the displayed collector within the field; and (iii) for each move, causing the at least one processor to execute the plurality of instructions to:

(A) if the displayed collector intersects one of the award symbols, accumulate the award associated with said award symbol; and (B) if the displayed collector intersects one of the obstacles, and if the item associated with the displayed collector does not enable the displayed collector to overcome said obstacle, end said play of the collection game with respect to the displayed collector.

46. The method of claim 45, which is provided through a data network.

47. The method of claim 46, wherein the data network is an internet.

48. A method of operating a gaming system, said method comprising, for a play of a collection game:

(a) causing at least one processor to execute a plurality of instructions stored in at least one memory device to operate with at least one display device to display a field including a plurality of different obstacles and a plurality of award symbols, each award symbol being associated with an award;

(b) providing a collector;

(c) receiving a selection of one of a plurality of different items and associating the selected item with the collector, wherein each of the items, when associated with the collector, enables the collector to overcome at least one of the obstacles;

(d) receiving an input associated with a position within the field and causing the at least one processor to execute the plurality of instructions to operate with the at least one display device to display the collector at said position;

(e) causing the at least one processor to execute the plurality of instructions to operate with the at least one display device to display at least one move of the displayed collector within the field; and (f) for each move, causing the at least one processor to execute the plurality of instructions to:

(i) if the displayed collector intersects one of the award symbols:

(A) accumulate the award associated with said award symbol; and (B) if a designated quantity of the awards has been accumulated, end said play of the collection game with respect to the displayed collector; and (ii) if the displayed collector intersects one of the obstacles, and if the item associated with the displayed collector does not enable the displayed collector to overcome said obstacle, end said play of the collection game with respect to the displayed collector.

49. The method of claim 48, which is provided through a data network.

50. The method of claim 49, wherein the data network is an internet.

51. A method of operating a gaming system, said method comprising, for a play of a collection game:

(a) causing at least one processor to execute a plurality of instructions stored in at least one memory device to operate with at least one display device to display a field including a plurality of different obstacles and a plurality of award symbols, each award symbol being associated with an award;

(b) providing a collector;

(c) receiving a selection of one of a plurality of different items and associating the selected item with the collector, wherein each of the items, when associated with the collector, enables the collector to overcome at least one of the obstacles;

(d) receiving an input associated with a position within the field and causing the at least one processor to execute the plurality of instructions to operate with the at least one display device to display the collector at said position;

(e) causing the at least one processor to execute the plurality of instructions to operate with the at least one display device to display at least one move of the displayed collector within the field;

(f) for each move, causing the at least one processor to execute the plurality of instructions to:

(i) if the displayed collector intersects one of the award symbols, accumulate the award associated with said award symbol; and (ii) if the displayed collector intersects one of the obstacles, and if the item associated with the displayed collector does not enable the displayed collector to overcome said obstacle, end said play of the collection game with respect to the displayed collector; and (g) after said play of the collection game is complete with respect to the displayed collector:

(i) enabling a player to initiate a secondary award determination;

(ii) if the player initiates the secondary award determination, causing the at least one processor to execute the plurality of instructions to perform the secondary award determination to obtain a secondary award; and (iii) if a value of the secondary award is greater than a value of any accumulated awards, providing the secondary award and not providing the accumulated awards.

52. The method of claim 51, which is provided through a data network.

53. The method of claim 52, wherein the data network is an internet.

54. A method of operating a gaming system, said method comprising:

(a) enabling a player to initiate a secondary award determination;

(b) if the player initiates the secondary award determination, causing at least one processor to execute a plurality of instructions stored in at least one memory device to perform the secondary award determination to obtain a secondary award and display the secondary award;

(c) providing the secondary award to the player and not providing the play of the collection game if an input that the player desires to keep the secondary award is received; and (d) if an input that the player does not desire to keep the secondary award is received:
(a) not providing the secondary award to the player;
(b) providing the play of the collection game; and
(c) for said play of the collection game:
(i) causing the at least one processor to execute the plurality of instructions to operate with at least one display device to display a field including a plurality of different obstacles and a plurality of award symbols, each award symbol being associated with an award;
(ii) providing a collector;
(iii) receiving a selection of one of a plurality of different items and associating the selected item with the collector, wherein each of the items, when associated with the collector, enables the collector to overcome at least one of the obstacles;
(iv) receiving an input associated with a position within the field and causing the at least one processor to execute the plurality of instructions to operate with the at least one display device to display the collector at said position;
(v) causing the at least one processor to execute the plurality of instructions to operate with the at least one display device to display at least one move of the displayed collector within the field; and
(vi) for each move, causing the at least one processor to execute the plurality of instructions to:
(A) if the displayed collector intersects one of the award symbols, accumulate the award associated with said award symbol; and
(B) if the displayed collector intersects one of the obstacles, and if the item associated with the displayed collector does not enable the displayed collector to overcome said obstacle, end said play of the collection game with respect to the displayed collector.

55. The method of claim 54, which is provided through a data network.

56. The method of claim 55, wherein the data network is an internet.

* * * * *